United States Patent
Schoen et al.

(10) Patent No.: US 6,235,176 B1
(45) Date of Patent: May 22, 2001

(54) COMPUTER APPARATUS AND METHOD FOR DEFINED CONTRIBUTION AND PROFIT SHARING PENSION AND DISABILITY PLAN

(75) Inventors: Matthew Bernard Schoen, Stamford; Jean-Philippe Khodara, Greenwich, both of CT (US)

(73) Assignee: MB Schoen & Associates, Stamford, CT (US)

( * ) Notice: Subject to any disclaimer, the term of this patent is extended or adjusted under 35 U.S.C. 154(b) by 0 days.

(21) Appl. No.: 08/936,037

(22) Filed: Sep. 23, 1997

(51) Int. Cl.[7] .................................................. G06F 17/60
(52) U.S. Cl. ........................................................... 205/4
(58) Field of Search ............................ 705/3, 4, 26, 30, 705/31, 34, 35, 36; 701/101

(56) References Cited

U.S. PATENT DOCUMENTS

| | | |
|---|---|---|
| 4,642,768 | 2/1987 | Roberts . |
| 4,648,037 | 3/1987 | Valentino . |
| 4,700,297 | 10/1987 | Hagel, Sr. et al. . |

(List continued on next page.)

FOREIGN PATENT DOCUMENTS

| | | | |
|---|---|---|---|
| WO 200014664 | * 3/2000 | (WO) | .............................. G06F/17/60 |

OTHER PUBLICATIONS

Pfleeger; Machine Organization; pp. 3–9; Copyright 1982 by John Wiley & Sons, Inc.*
Koco; "UNUM Insures Retirement Savings"; National Underwriter Life & Health–Financial Services Edition; n37; p792); Sep. 13, 1993; Dialog: File 148, Acc# 06711302.*
Microsfot Press Computer Dictionary Second Edition; pp. 87 and 335; Copyright 1994 by Microsoft Press.*
Crosson; "Nest Egg Plans Raise Thorny Tax Issues"; National Underwriter; v99 n8; pp. 7, 15; Feb. 20, 1995; Dialog: File 15, Acc# 00984092.*
Koco, Linda, "CIGNA LTD add–on fund 401(k)s during disability, (long term care)", National Underwriter Life and Health–Financial Services Edition, No. 39, p. 9. Sep. 1990.*

(List continued on next page.)

Primary Examiner—Edward R. Cosimano
Assistant Examiner—Alexander Kalinowski
(74) Attorney, Agent, or Firm—Peter K. Trzyna

(57) ABSTRACT

Device and method includes providing a digital electrical computer system receiving the input information at an input device, the input information including amounts of contribution for employees in a defined contribution plan; processing the input electrical signals from a first format such that for each of the employees, a respective coverage amount is computed by using the contributions to the defined contribution plan; processing the input electrical signals such that for each of the coverage amounts, a corresponding insurance premium is calculated; generating a billing statement at the printer from output electrical signals, the output electrical signals corresponding to billing statement data including the employees coverage amounts and the insurance premiums; and storing the billing statement data; recalling the stored billing statement data, and for each of the employees in the defined contribution plan terminated prior to an end of a year for the defined contribution plan, using the stored billing statement data to compute an amount of consideration to be given the employee terminated; and generating a record at the printer from further output electrical signals corresponding to a confirmation of the consideration.

44 Claims, 50 Drawing Sheets

Microfiche Appendix Included
(3 Microfiche, 224 Pages)

U.S. PATENT DOCUMENTS

| | | |
|---|---|---|
| 4,722,055 | 1/1988 | Roberts . |
| 4,750,119 | 6/1988 | Cohen et al. . |
| 4,750,121 | 6/1988 | Halley et al. . |
| 4,752,877 | 6/1988 | Roberts et al. . |
| 4,837,693 | 6/1989 | Scotz . |
| 4,839,804 | 6/1989 | Roberts et al. . |
| 4,876,648 | 10/1989 | Lloyd . |
| 4,951,196 * | 8/1990 | Jackson .................................... 705/37 |
| 4,969,094 | 11/1990 | Halley et al. . |
| 4,975,840 | 12/1990 | DeTore et al. . |
| 5,083,270 | 1/1992 | Gross et al. . |
| 5,136,502 | 8/1992 | Van Remortel et al. . |
| 5,191,522 | 3/1993 | Bosco et al. . |
| 5,202,827 | 4/1993 | Sober . |
| 5,206,803 | 4/1993 | Vitagliano et al. . |
| 5,212,787 * | 5/1993 | Baker et al. .......................... 707/101 |
| 5,291,398 | 3/1994 | Hagan . |
| 5,429,506 | 7/1995 | Brophy et al. . |
| 5,446,653 | 8/1995 | Miller . |
| 5,479,344 | 12/1995 | Keziah . |
| 5,523,942 | 6/1996 | Tyler et al. . |
| 5,613,072 | 3/1997 | Hammond et al. . |
| 5,631,828 | 5/1997 | Hagan . |
| 5,636,117 | 6/1997 | Rothstein . |
| 5,655,085 | 8/1997 | Ryan et al. . |
| 5,673,402 | 9/1997 | Ryan et al. . |
| 5,913,198 * | 6/1999 | Banks ........................................ 705/4 |
| 5,999,917 * | 12/1999 | Facciani et al. ........................ 705/36 |

OTHER PUBLICATIONS

"State of New York Insurance Department" Letter dated Nov. 20, 1994, written b y Fredric L. Bodner.

"Group Insurance Policy Non–Participating".

Best's Review, *Gap in LTD Programs Can Disable Retirement*, by Philip T. Davis, Nov., 1994.

*Disability Insurance for Your 401(k)*, by Carol Marie Cooper.

UNUM: Long Term Disability—Lifelong Disability, *UNUM'S Savings Supplement Option (SSO)*, updated Jun. 13, 1997.

Defined Contribution News, *NYC Firm Introduces 401(k)Disability Coverage*, Nov. 11, 1996.

Pension & Benefits Week, Practitioner to Practitioner, *Small Business Act Provides Inadequate Solution for Long Term Disability Plans*, by Hugh Forcier and Doug Heffernan, Nov. 4, 1996.

Employee Benefits Survey, *Employee Benefits in Medium and Large Private Establishments*, 1995 new release text.

401(k) articles, Nov. 6, 1997.

*Simple Retirement Solutions for Small Business*, Dec. 5, 1997.

\* cited by examiner

FIG. 38

Prepared for ABC Corporation

9/14/97 4:52:36 PM

| Last Name | First Name | Status | SSN | DOB | Employee Data ||| Employer Data ||| As of (*) |
|---|---|---|---|---|---|---|---|---|---|---|---|
| | | | | | Premium | Coverage | Unearned | Premium | Coverage | Unearned | |
| ABBOTT | JOHN | Active | 000-78-4005 | 12/5/69 | $75.15 | $3,951.50 | $30.68 | $79.49 | $4,188.80 | $32.45 | 8/5/97 |
| ABBOTT | KATHLEEN | Active | 000-66-7487 | 3/15/67 | $75.35 | $3,962.00 | $30.76 | $79.66 | $4,198.40 | $32.52 | 8/5/97 |
| TULL | J. GREGORY | Active | 000-62-2509 | 11/16/68 | $75.54 | $3,972.50 | $30.84 | $79.84 | $4,208.00 | $32.59 | 8/5/97 |
| TUMA | MARY | Active | 000-37-0606 | 6/23/69 | $75.73 | $3,983.00 | $30.91 | $80.01 | $4,217.60 | $32.66 | 8/5/97 |
| TUNG | TERESA | Active | 000-62-5623 | 5/6/56 | $75.92 | $3,993.50 | $30.99 | $80.19 | $4,227.20 | $32.73 | 8/5/97 |
| TUNIS MILLER | ANDREA | Active | 000-38-2189 | 9/20/55 | $76.11 | $4,004.00 | $31.07 | $80.36 | $4,236.80 | $32.81 | 8/5/97 |
| TURKINGTON | ROBERT | Active | 000-48-3333 | 6/2/67 | $76.30 | $4,014.50 | $31.15 | $80.54 | $4,246.40 | $32.88 | 8/5/97 |
| TURNER | STEPHANIE | Active | 000-70-7581 | 4/27/67 | $76.50 | $4,025.00 | $31.23 | $80.71 | $4,256.00 | $32.95 | 8/5/97 |
| TURSE | THERESA | Active | 000-46-2421 | 1/15/57 | $76.69 | $4,035.50 | $31.31 | $80.89 | $4,265.60 | $33.02 | 8/5/97 |
| TWOMLEY | LORRAINE | Active | 000-58-5497 | 1/6/61 | $76.88 | $4,046.00 | $31.38 | $81.07 | $4,275.20 | $33.09 | 8/5/97 |
| TYSZKOWSKI | JANET | Active | 000-40-8275 | 4/28/59 | $77.07 | $4,056.50 | $31.46 | $81.24 | $4,284.80 | $33.16 | 8/5/97 |
| UNGERLEIDER | DAVID | Active | 000-48-4167 | 4/3/69 | $77.26 | $4,067.00 | $31.54 | $81.42 | $4,294.40 | $33.24 | 8/5/97 |
| UNVALA | MARYBETH | Active | 000-52-0939 | 6/2/61 | $77.46 | $4,077.50 | $31.62 | $81.59 | $4,304.00 | $33.31 | 8/5/97 |
| URCIUOLI | JOSEPH | Active | 000-40-9696 | 1/19/50 | $77.65 | $4,088.00 | $31.70 | $81.77 | $4,313.60 | $33.38 | 8/5/97 |
| UTTER | DEREK | Active | 000-57-0737 | 4/25/66 | $77.84 | $4,098.50 | $31.78 | $81.94 | $4,323.20 | $33.45 | 8/5/97 |
| VACCA | FRANK | Active | 000-30-9484 | 5/29/38 | $78.03 | $4,109.00 | $31.85 | $82.12 | $4,332.80 | $33.52 | 8/5/97 |
| VAGNIER | PATRICK | Active | 000-54-8280 | 7/17/59 | $78.22 | $4,119.50 | $31.93 | $82.29 | $4,342.40 | $33.59 | 8/5/97 |
| VAGRA | LINDA | Active | 000-64-7335 | 10/23/68 | $78.41 | $4,130.00 | $32.01 | $82.47 | $4,352.00 | $33.66 | 8/5/97 |
| VAHOS | CARLOS | Active | 000-50-0976 | 2/18/57 | $78.61 | $4,140.50 | $32.09 | $82.64 | $4,361.60 | $33.74 | 8/5/97 |
| VALENTI | RICHARD | Active | 000-40-1924 | 1/14/50 | $78.80 | $4,151.00 | $32.17 | $82.82 | $4,371.20 | $33.81 | 8/5/97 |
| VALENZA | THOMAS | Active | 000-62-4144 | 3/18/62 | $78.99 | $4,161.50 | $32.24 | $82.99 | $4,380.80 | $33.88 | 8/5/97 |
| VALLI | K. LOUISE | Active | 000-60-1537 | 3/15/69 | $79.18 | $4,172.00 | $32.32 | $83.17 | $4,390.40 | $33.95 | 8/5/97 |

(*) Date as of which unearned premiums were calculated

Page 1 of 13

COMPUTER APPARATUS AND METHOD FOR DEFINED CONTRIBUTION AND PROFIT SHARING PENSION AND DISABILITY PLAN

This application includes a non-printed computer program listing which is disclosed in the form of a microfiche appendix as provided for in 37 CFR 1.96 consisting of 3 microfiches having 224 frames.

FIELD OF THE INVENTION

The present invention is in the field of digital electrical apparatus and method for making and using the same, as well as data structures and necessary intermediates created thereby. More particularly, the present invention is directed to technical effects of such invention in signal processing for administrating disability insurance covering employee and/or employer contributions to defined contribution qualified and non-qualified pension plans and profit sharing plans.

BACKGROUND OF THE INVENTION

Until the early 1980s, the dominant form of retirement income plans sponsored by corporations for their employees within the United States were defined benefit plans. Under defined benefit plans (DB plans), the employee's retirement benefits are amounts guaranteed to the departing employee and are insured by the PBGC. The employer's ongoing contribution to the plan is determined actuarially. Since 1974 and the enactment of ERISA, there have been at least fifteen legislative acts impacting qualified pension and profit sharing plans. Much of this legislation has made defined benefit plans less and less attractive for employers to sponsor and have made defined contribution plans more and more attractive. By far the most popular type of non-defined benefit qualified retirement plan to emerge during the past fifteen years is the 401(k) plan. These plans can be structured several ways and can optionally be either a profit sharing plan or an ESOP (employer stock ownership plan) plan. They allow employees to contribute an allowable percentage of pretax income into the plan, making them a very attractive long-term savings vehicle for retirement. Further enhancing the appeal of 401(k) plans for employees, is the ability for employers to make an optional matching contribution. Most 401(k) plans provide an employer matching contribution of some kind and allow employees to be pro-active in selecting the investment direction of their accounts. Employers are particularly pleased with the heightened awareness employees tend to have about the value of the 401(k) benefit plan. Employees often pay less attention to and appreciate less defined benefit plans—despite the fact that they may cost the employer more and prove more valuable to the employee. In addition to the above, employers have become aware of the costly nature of all employee benefits (i.e., due to the impact of medical inflation on medial benefits and the accounting rule changes impacting retiree medical and life plans—FASB statement 106). Consequently, employers are becoming increasingly cost conscious about all benefit offerings.

One of the effects of the recent trends in employee benefits described above, is that there are currently over 30 million employees participating in 401(k) plans—in 1974 there were none. Additionally, there has been an enormous increase in the number of highly compensated employees participating in non-qualified retirement plans due to benefit restrictions in qualified plans.

A common feature in defined benefit pension plans is a disability completion benefit. If the plan participant becomes disabled prior to retirement, the employer is obligated to continue funding on the employee's behalf until retirement. The employee is entitled to approximately the same level of retirement income as they would have received absent the disability (small differences are possible since salary increases between the date of disability and retirement must be estimated). The point is under defined benefit plans there is an established practice of providing an undiminished level of retirement income to employees who become disabled during active employment years.

In contrast, employers offering defined contribution pension and profit sharing plans have not historically provided an undiminished retirement benefit in the event of disability. Because of the recent shift from a pre-dominate reliance on defined benefit plans to more and more reliance upon defined contribution plans, millions of American employees are at risk of losing a significant portion of their retirement benefits in the event of disability (spouses and dependents are also at risk).

There are many ways to protect employees from this risk. For example, employers may be able to continue making contributions on behalf of a disabled employee. However, there are several legal hurdles that make this difficult to accomplish. IRC Code Section 415(c)(3)(c) includes a definition of disability that prevents employers from providing adequate benefits for the majority of disabled employees. If the employer does provide a disability benefit, they can either self insure the risk or insure it.

There are many different ways that insurance can be structured to cover the risk of losing defined contribution plan retirement benefits. For example: (1) the employer can pay for coverage either within the defined contribution plan or outside of it; (2) the employee can voluntarily purchase coverage either within the defined contribution plan or outside of it; or (3) the employer and employee can share the expense for coverage either within the defined contribution plan or outside of it.

In addition, the policy of coverage can be provided under either a group or individual contract. Coverage can provide either immediate benefit payments (payments made at the time of disability), or deferred benefit payments. If immediate, the benefit payments can be made internal or external to the defined contribution plan in a number of ways. In the final analysis such coverage will be structured according to the particular needs and desires of each sponsoring employer and the specific (legal and other) requirements of their existing benefit plans.

Given that this represents a huge existing marketplace for insurance companies in the disability insurance market, it is interesting to note that none have successfully entered it on a significant scale. There are no serious underwriting risks blocking entry into the market. The concern for "over-insuring" is easily offset by restrictions on the disabled person's ability to access funds prior to retirement. Some carriers have, on a very limited basis, provided coverage to highly compensated employees external to defined contribution plans. While coverage is underwritten with the intent to protect defined contribution plan retirement benefits, the policies used thus far have been policy forms that were originally designed and priced to cover other loss of income risks.

To date, disability policies have not been made available to the entire employee population of a defined contribution plan—either within the defined contribution plan or external to the plan. To date, disability policies have not been made available to participants (either to all plan participants or even a sub-grouping of plan participants) within a defined contribution plan.

Historically, disability policies offered to protect participant contributions (employer and or employee paid) to defined contribution plans, have been made available only on a very limited basis (i.e., never offered to more than ⅓ of a plan's participants). Additionally, they have only been offered external to the defined contribution plan. Less than 100 of these limited, external employer sponsored plans have been underwritten during the past five years. Only two or three carriers have been willing to offer polices to defined contribution participants. This coverage has been offered on a guaranteed issue basis. Other carriers are not prepared to offer individual policies on a guaranteed issue basis.

One major insurance carrier, a leader in offering administrative services for 401(k) plans, attempted to make a disability policy available to 401(k) plan participants. They were forced to withdraw the product from the market shortly after introduction. Their outside legal counsel discovered that the way they structured the policy offering within the 401(k) plan caused the 401(k) plan to be in violation of ERISA rules—thus subjecting the sponsoring employer to potential fines or plan disqualification.

Another leading disability carrier attempted to market a rider to their existing group long term disability (LTD) plans. The rider would be purchased voluntarily by persons covered under the employer sponsored LTD plan who were also participants of a 401(k) plan. The rider was designed to protect 401(k) contributions. Thus far, interest in offering the rider to employees has been minimal. In the few situations where employers have consented to allow the carrier to offer the rider to their employees, participation has been extremely low. The carrier considers the entire initiative a failure and is seeking other ways of making coverage available so that participation reaches more successful levels.

Most defined benefit plan disability protection offered by employers is self-insured. Annual plan contribution levels are determined actuarially. The amount needed to fund for current and future disabled participants is included in the actuarial formulas. Therefore, disability insurers have not developed computer systems to cover all employee participants of defined benefit pension plans.

In most of the established disability markets (both group and individual) the policy is sold to the covered person directly or is sold to them indirectly through some form of sponsorship—an employer makes coverage available to employees or an association makes coverage available to members. Employers also provide coverage on a non-contributory basis to employees. In all of these situations, the insurance carrier usually has to deal with only one, two, or three parties at most:

1. The covered individual if coverage is sold to them directly;
2. The covered individual and employer (or association) if coverage is sold through employer (or association) sponsorship—whether contributory or non-contributory; or
3. The employer if coverage is provided on a non-contributory guaranteed issue basis.

In addition to the above, the insurance carrier may work with a trustee of a welfare benefit trust established by the employer or association. Insurance companies may also use third party administrators to perform some or all of the administration associated with offering traditional disability coverage. Historically, the computer systems used to provide disability coverage and administer it on an ongoing basis has been limited by needs attendant to the scenarios described above.

Although several carriers have attempted expand from these traditional markets into the defined contribution plan market by offering some form of protection to participants, thus far they have been largely unsuccessful. There are over 30 million 401(k) plan participants alone—less than 20 thousand have coverage protecting 401(k) retirement benefits from disability (either employee paid or employer paid). None of these existing policies are provided within the 401(k) plans.

None of the carriers trying to enter into the disability coverage for defined contribution plan market have figured out what is required to offer coverage in the plan. None have figured out what it takes to offer disability coverage to all participants of defined contribution plans—either in the plan or external to the plan. None have identified what is required to efficiently deal with a all of the additional laws pertaining to the ongoing tax law and labor law qualifications of each type of qualified defined contribution plan.

Because a full knowledge of the rules is required in order to assure ongoing defined contribution plan compliance and qualification, none have been able to offer a disability product (either group or individual) to employers or employees other than on a basis where the rules can not be violated (i.e., outside of the plans to a small group of participants).

SUMMARY OF THE INVENTION

It is an object of the present invention to provide a method, apparatus, article of manufacture, data structures, and inherent intermediates for a computer system to incorporate the additional features and processing functions to allow for the disability coverage to be offered within the plan while assuring ongoing plan compliance on an automated basis.

It is an other object of the present invention to enable disability issuing insurance carriers to rely upon a single digital system to perform all the data processing, coverage, premium and benefit calculations, record keeping and other requisite functions attendant to offering and administering group or individual disability insurance protecting retirement benefits under defined contribution plans (both qualified and non-qualified) to all plan participants (both internal and external to the plan).

It is an other object of the present invention to provide fully automated digital importing and exporting capabilities, allowing data to be quickly imported, processed and exported in any system format.

It is an other object of the present invention to provide an automated means of calculating individual coverage and premium amounts according to the differing criteria and methodology of any issuing carrier.

It is an other object of the present invention to provide an automated means of tracking initial and ongoing compliance of the disability coverage under applicable state and federal law.

It is an other object of the present invention to provide an automated means for tracking initial and ongoing compliance of qualified defined contribution plans when disability insurance is either purchased within the QDCP trust or disability benefits are made payable to it.

It is an other object of the present invention to provide disability issuing insurance carriers a single digital system capable of performing all functions attendant to offering an administering the coverage—irrespective of whether all plan participants are offered coverage or only selected participants (whether internal or external to the plan).

It is an other object of the present invention to provide disability issuing insurance carriers a single digital system capable of performing all functions attendant to offering an administering the coverage irrespective of whether coverage is paid for by employee, employer, or shared by both trustee on behalf of either employee or employer or both.

It is an other object of the present invention to provide automated premium calculation based upon disability payments being made payable at the time of disability or at a later time (i.e., early or normal retirement or another specified time).

It is an other object of the present invention to provide automated premium and coverage calculations at both the beginning of the 401(k) plan year and then again after final allowable contributions are calculated under the 401(k)(m) rules.

It is an other object of the present invention to provide an automated means of tracking and reporting morbidity, mortality and termination experience based upon any combination of in force business desired by carrier, sponsoring employer, record keeper or other interested parties.

It is an other object of the present invention to provide an automated means of providing coverage on a portable or non-portable basis.

It is an other object of the present invention to provide an automated method of creating a paid-up (pre-paid) certificate or policy to terminating employees who end employment prior to the defined contribution plan year.

It is an other object of the present invention to provide automated tracking on a daily basis of unused premiums and to provide automated reporting of any premium refunds due to participants who terminate employment on any day prior to the defined contribution plan year.

It is yet another object of the present invention to provide a method, apparatus, article of manufacture, and data structures for a disability insurance computer system designed to receive data on an automated basis from parties that normally do defined contribution plan record keeping for sponsoring employers.

It is yet another object of the present invention to provide a method, apparatus, article of manufacture, and data structures for a disability insurance computer system to deliver data to the defined contribution record keepers on an automated basis.

It is yet another object of the present invention to provide a method, apparatus, article of manufacture, and data structures for a disability insurance computer system to perform unused premium calculations on a daily basis for each covered defined contribution plan participant and calculates applicable premium refunds for an employee who terminates employment prior to the last day of the DC plan year.

It is yet another object of the present invention to provide a method, apparatus, article of manufacture, and data structures for a disability insurance computer system to interact with the computer system of an insurance company providing deferred variable annuity contracts to hold disability proceeds until retirement age of the disabled defined contribution plan participant (on an automated basis).

It is yet another object of the present invention to provide a method, apparatus, article of manufacture, and data structures for a disability insurance computer system to calculate disability amounts due in the event of the disability of a covered participant and provide amount to the insurer and the 401(k) record keeper on an automated basis.

It is yet another object of the present invention to provide a method, apparatus, article of manufacture, and data structures for a disability insurance computer system to automatically create a pre-paid certificate or policy (either printed hard copy or digital extracts) for each defined contribution plan participant who terminates employment prior to the final day of the plan year.

It is still another object of the present invention to provide a method, apparatus, article of manufacture, and data structures for a disability insurance computer system to automatically import a employee census in any type of digital extract from another computer system, and convert into any type of digital extract required by a different party (i.e., receive an ASCII fixed width file from a 401(k) record keeper and convert it into an ASCII delimited file for the insurance carrier providing insurance).

It is yet another object of the present invention to provide a method, apparatus, article of manufacture, and data structures for a disability insurance computer system to calculate premium rates to insure against lost retirement benefits under defined contribution plans irrespective of whether coverage is provided under a group policy or an individual policy.

It is yet another object of the present invention to provide a method, apparatus, article of manufacture, and data structures for a disability insurance computer system to calculate premium rates to insure against lost retirement benefits under defined contribution plans irrespective of whether coverage is portable or not portable by an employee when terminating employment.

It is still a further object of the present invention to provide a method, apparatus, article of manufacture, and data structures for a disability insurance computer system to calculate premium rates to insure against lost retirement benefits under defined contribution plans irrespective of whether benefits are payable at the time of disability or deferred to a pre-determined date (i.e., normal or early retirement).

It is still a further object of the present invention to provide a method, apparatus, article of manufacture, and data structures for a disability insurance computer system to calculate premium rates to insure against lost retirement benefits under 401(k) defined contribution plans on an interim basis while final contributions are pending confirmation under 401(k)(m) rules.

It is still a further object of the present invention to provide a method, apparatus, article of manufacture, and data structures for a disability insurance computer system to automatically provide morbidity, termination and mortality experience reports to plan sponsors and insurers based upon any combination of defined contribution population.

These and other objects of the present invention are carried out by a digital system performing the digital signal processing for generating output useful in administrating disability coverage to employee participants of all types of retirement income plans and to perform every aspect of ongoing administration of such coverage.

The computer system used to enable issuing insurance carriers to offer disability coverage to the participants of any type of defined contribution pension or profit sharing plan. We have invented our computer system as an extremely robust environment and with the features and automated capabilities to allow any combination of premium payment sources and any combination of benefit payment timing and recipients. Our computer system allows an issuing insurance carrier to offer disability products to the majority of Americans dependent upon qualified defined contribution plans for part of their retirement benefits.

All qualified defined contribution plans must meet complex rules and regulations for maintaining tax qualification under ERISA (as amended). None of the existing disability insurance computer system takes these rules and regulations into consideration. Our computer system does.

For example, 401(k) plans have extremely precise and complicated non-discrimination testing (the 401(k)/(m) rules). Premiums for disability insurance coverage will almost always be related to the level of contribution being made or the retirement benefit likely to be accumulated as a result of contributions being made. An employee's initial yearly contribution commitment to the 401(k) plan is not a reliable source for calculating either the amount of disability coverage or the premium cost thereof because final allowable yearly contribution amounts must be confirmed by testing under the 401(k)/(m) rules.

The computer system utilized to calculate individual disability coverage amounts for 401(k) plan participants must be capable of receiving participant census and contribution data from the 401(k) plan record keeper (who will perform the 401(k)/m testing and have the final contribution amounts for each participant). If the computer system can not effectively interface with the 401(k) record keeper's systems, the employer is required to act as an intermediary—necessitating extra work, expense and inconvenience on behalf of the employer.

Another example of a defined contribution rule impacting the capability of a computer system is what may be required when an employee terminates employment during a 401(k) plan year. The employee must be 100% vested in all voluntary contributions to 401(k) plans. They may also be partially vested or fully vested in employer contributions dependent upon years of participation in the plan at the time of termination. This may entitle a terminating employee to a partial refund of the disability insurance premium (the unused premium) if they terminate employment from the sponsoring employer during the 401(k) plan year (any day prior to the final day of the plan year). The system must be capable of tracking the unused premium to determine if and how much a refund is due. No such refund must be tracked by conventional disability computer systems.

There is also usually a difference between employees participating in conventional employer sponsored disability coverage and those participating in defined contribution plans. This is because the employer can define a different minimum employment periods for eligibility under each plan. In addition if participation in the defined contribution is voluntary, employees choosing not to participate must not be covered under the disability plan. So even the census data must usually be prepared by the defined contribution plan record keeper for the initial disability plan to be set up and updated yearly. This information must be put into the computer program in a way acceptable to the record keeper and the employer. Our system was invented to allow any method preferred by them (automated import of any type of file form any type of media, scanned hard copy or manual input).

One final example of the inadequacy of prior computer systems revolves around the defined contribution plan record keeper's ability or inability to track pre-disability assets separately from post-disability assets. Many disability carriers will require that disability benefits be inaccessible to disabled employees until retirement. Many defined contribution plans allow disabled employees to access their plan benefits early in the event of certain qualifying hardships (this usually includes disability). If benefits are paid into the defined contribution plan at the time of disability and the record keeper can not account for them (along with investment earnings) separately from the pre-disability asset and subsequent earnings, than some means of separation must be provided. One solution is to direct disability payments into an annuity either within or external to the defined contribution plan, Conventional disability insurance computer programs were not designed to interact with annuity providers on an automated basis. Our system was invented taking this need into consideration.

There are several additional features that prior disability insurance computer systems did not take into consideration because of they were not designed with the special needs and requirements of defined contribution plans in mind. Our system was specifically designed to accommodate the special needs of offering disability protection against defined contribution plan benefits. A comprehensive description of these features and capabilities is included in system description.

More particularly, the invention includes method for using a digital electrical apparatus for signal processing, the method including: providing a digital electrical computer apparatus comprising a first digital electrical computer having a processor, the processor electrically connected to store and receive electrical signals at a memory device, to receive electrical signals representing the input information from an input device, to convert output electrical signals into printed documentation at a printer, wherein the processor is programmed to control the first digital electrical computer to receive the input electrical signals and to process the input electrical signals to produce the output electrical signals, including: receiving the input information at the input device, the input information including amounts of contribution for employees in a defined contribution plan; processing the input electrical signals from a first format such that for each of the employees, a respective coverage amount is computed by using the contributions to the defined contribution plan; processing the input electrical signals such that for each of the coverage amounts, a corresponding insurance premium is calculated; generating a billing statement at the printer from the output electrical signals, the output electrical signals representing billing statement data including the employees coverage amounts and the insurance premiums; storing the billing statement data; recalling the stored billing statement data, and for each of the employees in the defined contribution plan terminated prior to an end of a year for the defined contribution plan, using the stored billing statement data to compute an amount of consideration to be given the employee terminated; and generating a record at the printer from further output electrical signals representing a confirmation of the consideration. Further, the invention includes a multi-computer system incorporating the foregoing. A second digital electrical computer is for storing the electrical signals in a second memory, the electrical signals representing the input information in a second format exported to the input device connected to the first digital electrical computer; the method further comprising the steps of converting the second format into the first format to enable the step of receiving the input information to be carried out by reading the exported electrical signals from the second digital electrical computer; and, wherein the step of storing is carried out by converting the first format into the second format for exporting the billing statement data to the second digital electrical computer for storage at a second memory electrically connected to the second digital electrical computer.

The invention can thus be viewed as a digital system capable of performing calculations required to illustrate and offer disability coverage to employee participants of all types of retirement income plans and to perform every aspect of ongoing administration of such coverage. The system is capable of performing calculations, illustrations and ongoing administrative functions regardless of whether coverage is provided through a group insurance contract or through individual policies. The system performs these functions irrespective of whether coverage is paid for by the employee, paid for by the employer (directly or indirectly) or premium cost is shared by employer and employee. The timing of benefits paid in the event of the disability of a covered participant may either occur at the time of disability or may be deferred until normal or early retirement or until some other specified date. The system manages all requisite records irrespective of the timing of benefit payments. The system performs comprehensive functions attendant to various mechanical and or structural approaches for providing coverage, including:

1. Premiums are paid within a qualified pension or profit sharing plan (ERISA trust) with disability benefits payable to the qualified pension or profit sharing plan (including to an annuity contract within the trust).
2. Premiums are paid within a qualified pension or profit sharing plan (ERISA trust) with disability benefits payable to the plan participant who is disabled.
3. Premiums are paid within a qualified pension or profit sharing plan (ERISA trust) with disability benefits payable to a group or individual annuity outside of the qualified pension or profit sharing trust.
4. Premiums are paid within a qualified pension or profit sharing plan (ERISA trust) with disability benefits payable to a non-qualified trust which may hold funds in various investments including group or individual annuities.
5. Premiums are paid outside a qualified pension or profit sharing plan (ERISA trust) with disability benefits payable to the qualified pension or profit sharing plan (including to an annuity contract within the trust).
6. Premiums are paid outside a qualified pension or profit sharing plan (ERISA trust) with disability benefits payable to the plan participant who is disabled.
7. Premiums are paid outside a qualified pension or profit sharing plan (ERISA trust) with disability benefits payable to a group or individual annuity outside of the qualified pension or profit sharing plan trust.
8. Premiums are paid outside a qualified pension or profit sharing plan (ERISA trust) with disability benefits payable to a non-qualified trust which may hold funds in various investments including group or individual annuities.
9. Premiums are paid in a qualified Section 125 Welfare Benefit Plan trust with disability benefits payable to the qualified pension or profit sharing plan (including to an annuity contract within the trust).
10. Premiums are paid in a qualified Section 125 Welfare Benefit Plan trust with disability benefits payable to the plan participant who is disabled.
11. Premiums are paid in a qualified Section 125 Welfare Benefit Plan trust with disability benefits payable to a group or individual annuity outside of the qualified pension or profit sharing plan trust.
12. Premiums are paid in a qualified Section 125 Welfare Benefit Plan trust with disability benefits payable to a non-qualified trust which may hold funds in various investments including group or individual annuities.
13. Premiums are paid in a qualified IRC Section 501(c)(9) Welfare Benefit Plan or VEBA Trust (Voluntary Employee Beneficiary Association) with disability benefits payable to the qualified pension or profit sharing plan (including to an annuity contract within the trust).
14. Premiums are paid in a qualified IRC Section 501(c)(9) Welfare Benefit Plan or VEBA Trust (Voluntary Employee Beneficiary Association) with disability benefits payable to the plan participant who is disabled.
15. Premiums are paid in a qualified IRC Section 501(c)(9) Welfare Benefit Plan or VEBA Trust (Voluntary Employee Beneficiary Association) with disability benefits payable to a group or individual annuity outside of the qualified trust.
16. Premiums are paid in a qualified IRC Section 501(c)(9) Welfare Benefit Plan or VEBA Trust (Voluntary Employee Beneficiary Association) with disability benefits payable to a non-qualified trust which may hold funds in various investments including group or individual annuities.
17. Premiums are paid in a qualified IRC Section 419 (e) Welfare Benefit Plan with disability benefits payable to the qualified pension or profit sharing plan (including to an annuity contract within the trust).
18. Premiums are paid in a qualified IRC Section 419 (e) Welfare Benefit Plan or VEBA Trust (Voluntary Employee Beneficiary Association) with disability benefits payable to the plan participant who is disabled.
19. Premiums are paid in a qualified IRC Section 419 (e) Welfare Benefit Plan or VEBA Trust (Voluntary Employee Beneficiary Association) with disability benefits payable to a group or individual annuity outside of the qualified pension or profit sharing plan trust.
20. Premiums are paid in a qualified IRC Section 419 (e) Welfare Benefit Plan or VEBA Trust (Voluntary Employee Beneficiary Association) with disability benefits payable to a non-qualified trust which may hold funds in various investments including group or individual annuities.

When premiums are paid within the qualified pension or profit sharing plan, the system is capable of performing certain tasks and calculations that otherwise may not be required—including calculating imputed income for each plan participant. Imputed income is calculated according to net premiums paid (taking into consideration any refunds or other adjustments during the calendar year) and when applicable will include any employer bonus to cover all or a portion of the tax expense for imputed income. Additionally, the system is able to automatically create IRS 1099 Forms to report imputed income to each participant yearly. Alteratively, the system can provide digital extracts in multiple system formats or hardcopy to allow another party to prepare the 1099 Forms (i.e., employer, pension plan record keeper, payroll service, insurance company, disability plan TPA, or other authorized party).

In the event the policy is portable (the employee can optionally continue to pay premiums and retain coverage after terminating employment with the original sponsoring employer), the system will automatically create the billing documents to be mailed to each terminated employee electing to continue coverage. The system can generate the actual hard copy billing statement for direct mailing or provide digital extracts in multiple system formats allow another party to prepare and or forward the bill (i.e., insurance company, disability plan TPA, or other authorized party).

The system creates the plan level billing statement for all plan participants to include the total plan premium cost on any billing cycle required for a given plan (i.e., annually, semi-annually, quarterly, monthly, bi-monthly, weekly or other billing cycle). The system automatically provides digital extracts in multiple system formats or hard copy to allow another party (i.e., employer, pension plan record keeper, payroll service, insurance company, disability plan TPA, or other authorized party) to prepare and deliver the billing to the appropriate party (i.e., employer, plan trustee, payroll service or participant).

BRIEF DESCRIPTION OF THE DRAWINGS

FIG. 38 is a representation of a screen produced on a visual output device in accordance with the present invention, the screen including output for incorporating into printed output at a hard copy output device.

DETAILED DESCRIPTION OF A PREFERRED EMBODIMENT

Figure 1:
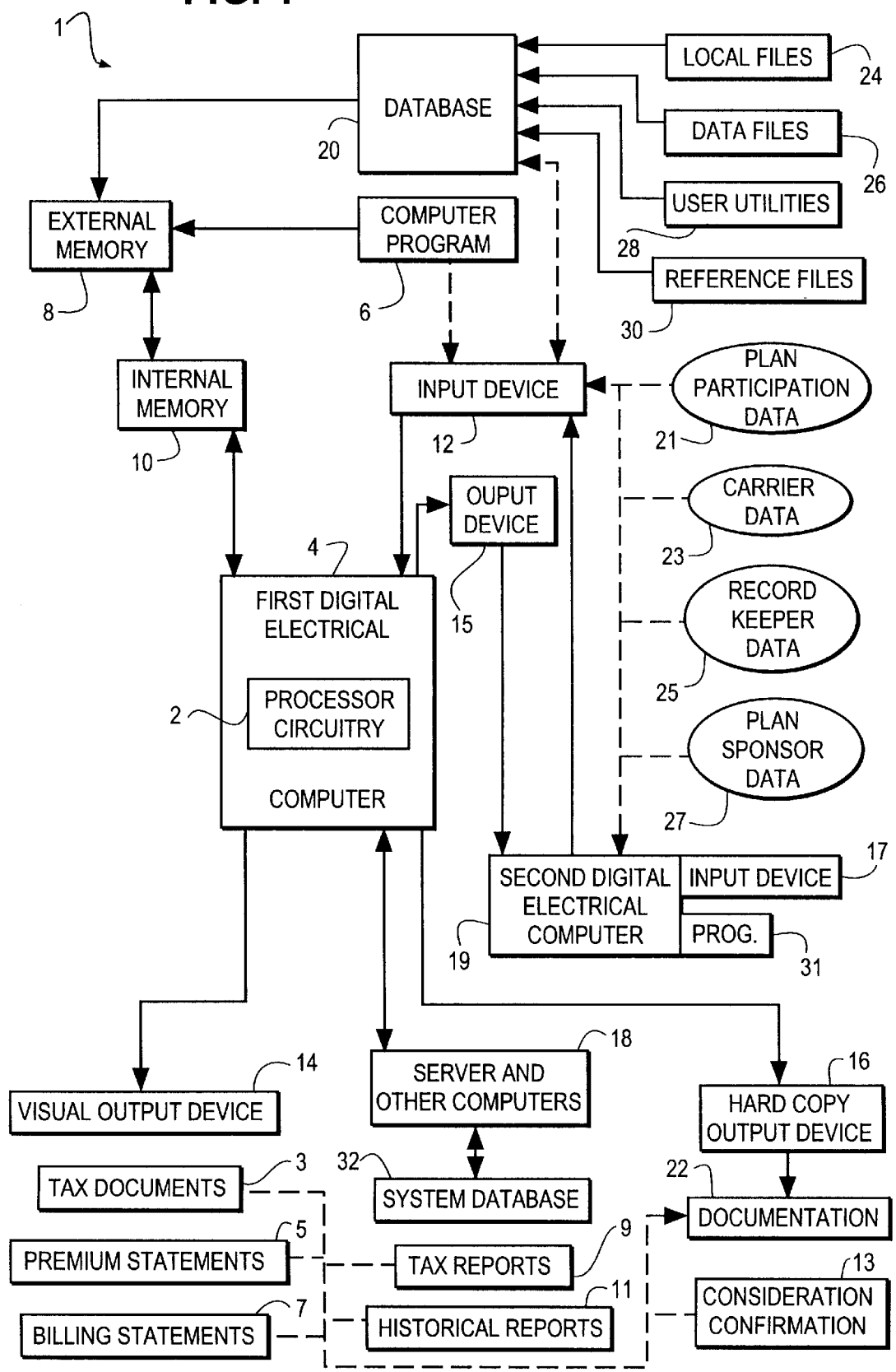
FIG. 1 is a representation of an apparatus in accordance with the present invention.

FIG. 1 shows, in block diagram form, the computer-based elements which can be utilized to implement the present invention. The present invention involves computer apparatus system 1, which includes processor circuitry 2 in a first digital electrical computer 2, which can for example be at a workstation. For flexibility, it is preferable to have the processor circuitry 2 formed by means of a computer program programming programmable circuitry, i.e., programming the computer (processor) logic circuitry. The programming can be carried out with a computer program (or programs) 6, which for flexibility should be in the form of software stored in an external memory 8, such as a diskette, hard disk, virtual disk, or the like. (The virtual disk is actually an extended internal memory 10 which may assist in speeding up computing.) A diskette approach is optional, but it does provide a useful article of manufacture for inputting or storing data structures or the host software. Of course storing the computer program 8 in a software device is optional because it is well known in the art that the same result can be obtained by storing the computer program in a hardware storage device, e.g., by burning the computer program 8 into a ROM.

An embodiment could also be carried out in hardware, though this is not recommended as it is an inflexible approach. Accordingly, a hardware implementation is described here for exemplary purposes. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and in fact with equivalent circuitry to that formed by programming programmable computer circuitry. It is all just digital electrical circuitry processing digital electrical signals, transforming them to output different electrical signals.

An internal memory 10 works in cooperation with the external memory 8. An input device 12 could be a keyboard, scanner, modem, disk drive, mouse, or equivalent means for a user to input the data discussed below (which can alternatively be input indirectly via another computer 18 or 19 linked by modem or network and server computer 4—or data can alternatively be read from a disk or other memory media having data produced thereon by such a digital electrical computer). A visual display unit 14 can be employed for a visual representation, and a hard copy output device 16, such as a laser printer, bubble jet printer, dot matrix printer or the like, can be employed for producing hard copy output documentation 22. The documentation can include, for example, tax documents 3, premium statements 5, billing statements 7, tax reports 9, historical reports 11, and consideration confirmations 13 (discussed further below). Note that output electrical data can also be stored to memory 8 in database 20, moved to the server and other computers 18, or conveyed to an output device 15, such as a modem (which could be the same modem as the input device 12).

Local files 24, data files 26, user utilities 28, and reference files 30 are shown in FIG. 1 as located in database 20, though these are mostly system files available to the System Database 32.

Note too how there are two routs for certain data to be conveyed into the computer 4. The first way is to take such information as plan participation data 21, carrier data 23, record keeper data 25, and plan sponsor data 27 and input the information at the input device 12, e.g., scan hard copy, type in at keyboard, etc. In this case, input device 12 receives input information and, in response, changes the information into (input) electrical signals corresponding to the input information. A second way is to do the same at an input device 17 connected to some second digital electrical computer having a programmed processor 31.

The present invention can be carried out by using a Client Server 18 running in Microsoft Windows 95 and Microsoft Windows NT. Presently, there are two separate versions of the system: (1) a development version; and (2) an production version.

A development version of program 6 is used for system development, bug fixes, additions and enhancements. There is a front end (user interface) designed with Microsoft Access 97 and a back-end (database area) is also designed with Microsoft Access 97. Using Microsoft Access 97 as a back-end for development purposes enables a programmer to take full advantage of the flexibility offered by Microsoft Access 97 to make changes easily at the back-end level.

A production version of program 6 is for administration of disability policies. As above, the front-end (user interface) in designed with Microsoft Access 97 and the back-end (database area) is designed with Microsoft SQL Server version 6.5. In order to incorporate changes made in the development version to the production version, we use Microsofts upsizing wizard that will convert the Microsoft Access 97 back-end into Microsoft SQL Server version 6.5.

Figure 2:
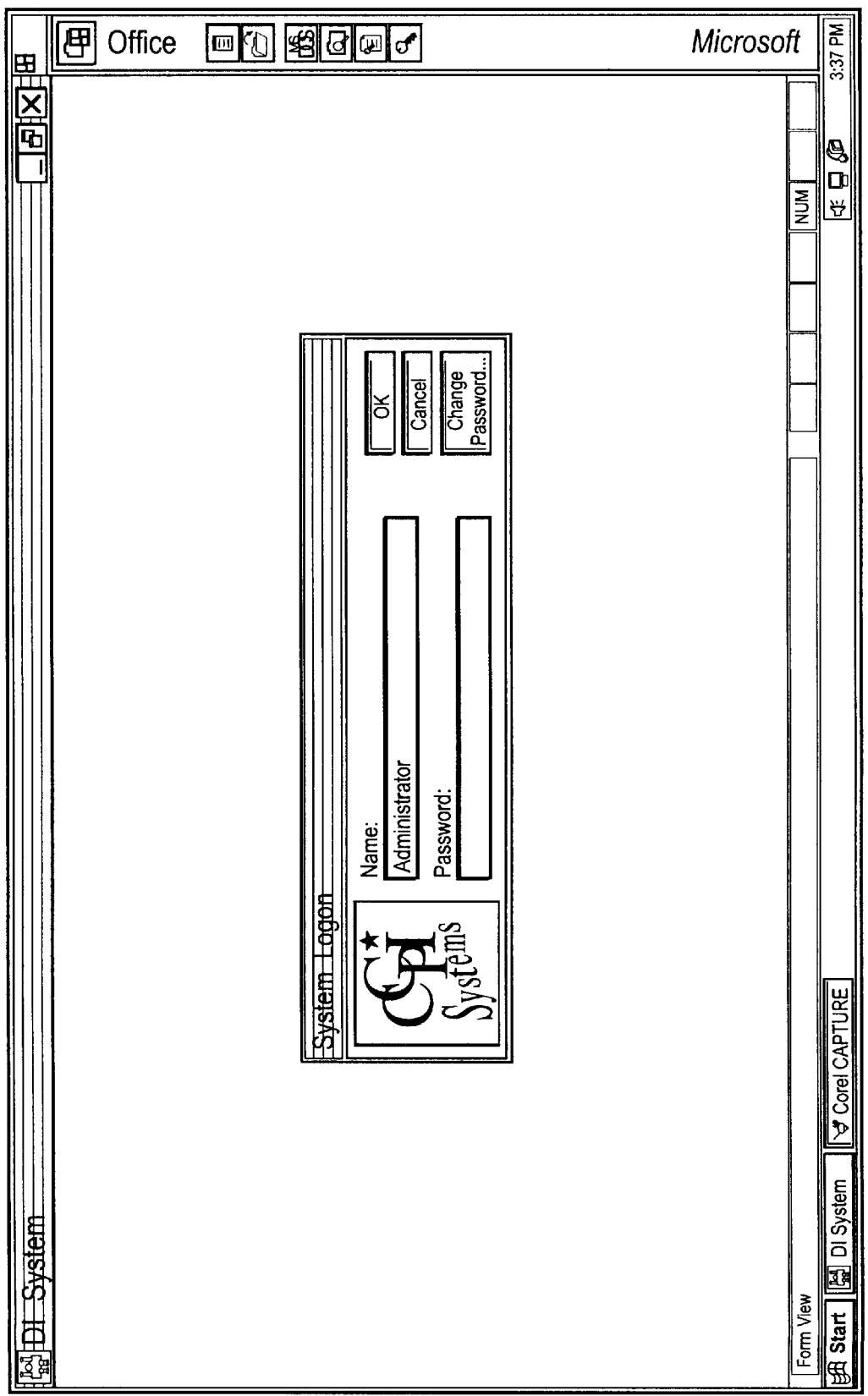
FIG. 2 is a representation of a screen produced on a visual output device in accordance with the present invention.

Consider now the administrative process of the present invention, commencing with a User Log On Screen in FIG. 2. The user logs onto the system 1 by entering a USER-NAME and a PASSWORD to Screen in FIG. 2. User names and passwords are necessary to introduce several levels of security in the system. Each level of security corresponds to a user group and each user belongs to a user group. Therefore each user group has its own level of security. One of the groups may be called <USERS>, system administrators may not want members of the USERS group to be able to access certain screens or modify specific information. This is very helpful to prevent USERS to modify data created by the members of another group. The user also has the option to EXIT the System 1 or to change his/her password. The user dicks on an OK button to get to the Main Menu (Screen in FIG. 3).

The user can create a new external system, which typically is the first step in using the System 1. In order to set up a new case, a listing of participating employees with all pertinent underwriting and administration-related information (a census file) must be entered into the System 1 via Input Device 12. This information can be input manually, scanned from hard copy or imported. Most frequently the information will be imported because it is more convenient, faster, and far more accurate than the other methods. In order to make importing data available as often as possible, the System 1 is designed to accept input data no matter what source, system, or format is being used by the census file provider. Further, the System 1 allows for the user to easily add unlimited automated census file formats to a list of set import alternatives.

Before importing a new census, the user needs to define an import layout that describes the composition of the census file so that the system can successfully import the new census. From the Main Menu Screen in FIG. 3, the user clicks on the LIBRARIES command button to open up LIBRARIES Screen in FIG. 4. This Screen in FIG. 4 contains all the libraries (or data categories) available to System 1. The user double clicks on a SYSTEM library button to open up a SYSTEM LIST Screen in FIG. 5.

The user then creates a new external system. The System 1 can interact with an unlimited number of external systems. Within the System 1, the user creates external systems with their own properties and conversion tables. A conversion table is a set of codes that an external system will use for a specific database field. For example: the user may want to import a census from external system XYZ. The fields in the census are as follows:

Social security number

Status.

Social security number is a universal field because it will not vary from external system to external system, whereas status is a system specific field. Each external system will use a different set of code for the status field. Therefore the System 1 needs to know what set of codes the external system is using so that it can convert them into its own code. Following the previous example, the external system may use <1> for active, <2> for terminated. The System 1 needs to know this codes so that it can convert them into its own code. The means by which the System 1 converts all those code is a conversion table that matches external system's codes with the codes of System 1.

The use of conversion tables is critical because no external system will ever be required to comply with the codes of System 1, and information that might be extraneous or cause system errors will automatically be removed prior to being imported.

To add a new external system, the user clicks on a command button with the blank page icon (Screen in FIG. 5) and a new screen (not shown in the Figures) opens up where the user enters a name for the new external system, as well as a brief description. The user clicks on an EXIT command button (has a door with arrow icon) to add and return to the SYSTEM LIST Screen in FIG. 5 where the new external system has been added. The user selects the new external system and clicks on the EDIT command button (with the magnifying glass icon) to open up the SYSTEM INFORMATION Screen in FIG. 6.

Figure 7:
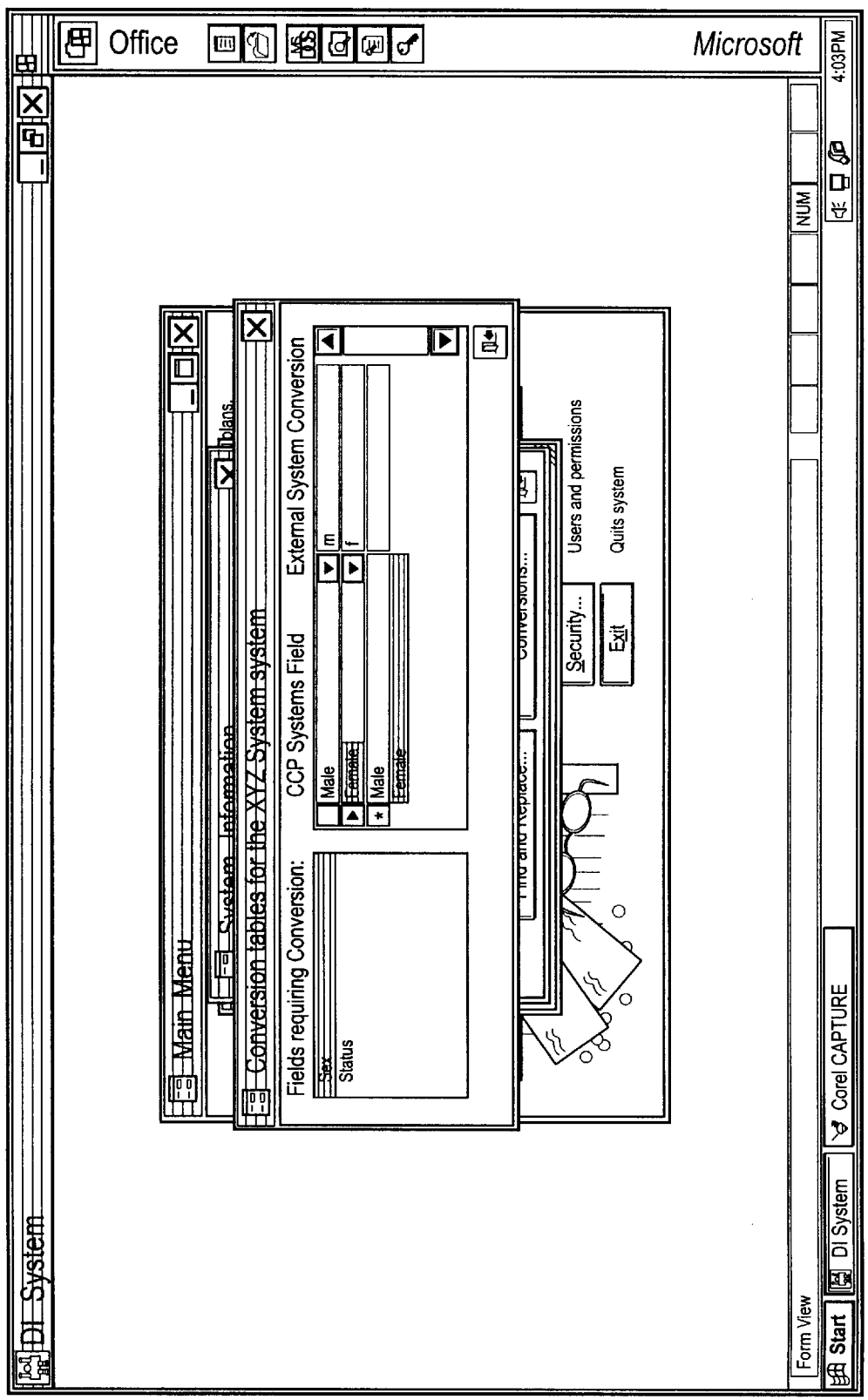
FIG. 7 is a representation of a screen produced on a visual output device in accordance with the present invention.

The user then needs to setup the conversion tables for the newly created external system. The user clicks on a CONVERSIONS command button and opens up a CONVERSION TABLES Screen in FIG. 7. The user selects a field requiring conversions on the left side of the Screen in FIG. 7 and enters the appropriate external system conversion on the right. Each selected field comes with a separate set of items requiring conversions. For example, the field SEX requires a conversion for <male> and <female>.

Figure 6:
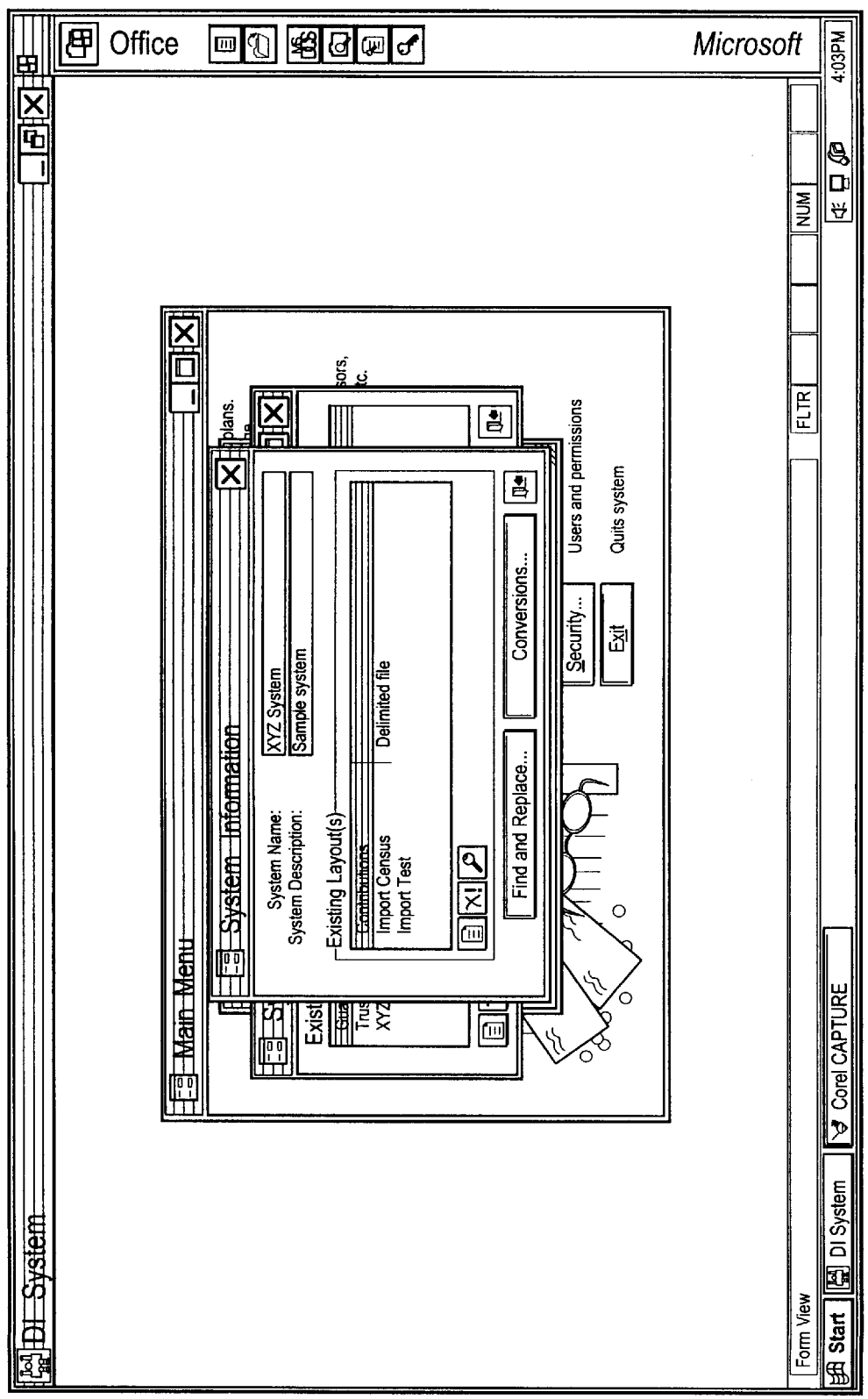
FIG. 6 is a representation of a screen produced on a visual output device in accordance with the present invention.

Once the conversions have been entered, the user clicks the EXIT button to return to the SYSTEM INFORMATION Screen in FIG. 6.

The user now clicks on a FIND AND REPLACE command button to replace certain unwanted strings in the file by other strings; for example, some when a date of retirement is expected for an insured but the insured has not retired yet, some external systems will indicate 00/00/0000 as a retirement date. By using the FIND AND REPLACE feature, the user can select to replace all <00/00/0000> strings by spaces. An unlimited number of FIND AND REPLACE activities can be programmed into the System 1.

Figure 8:
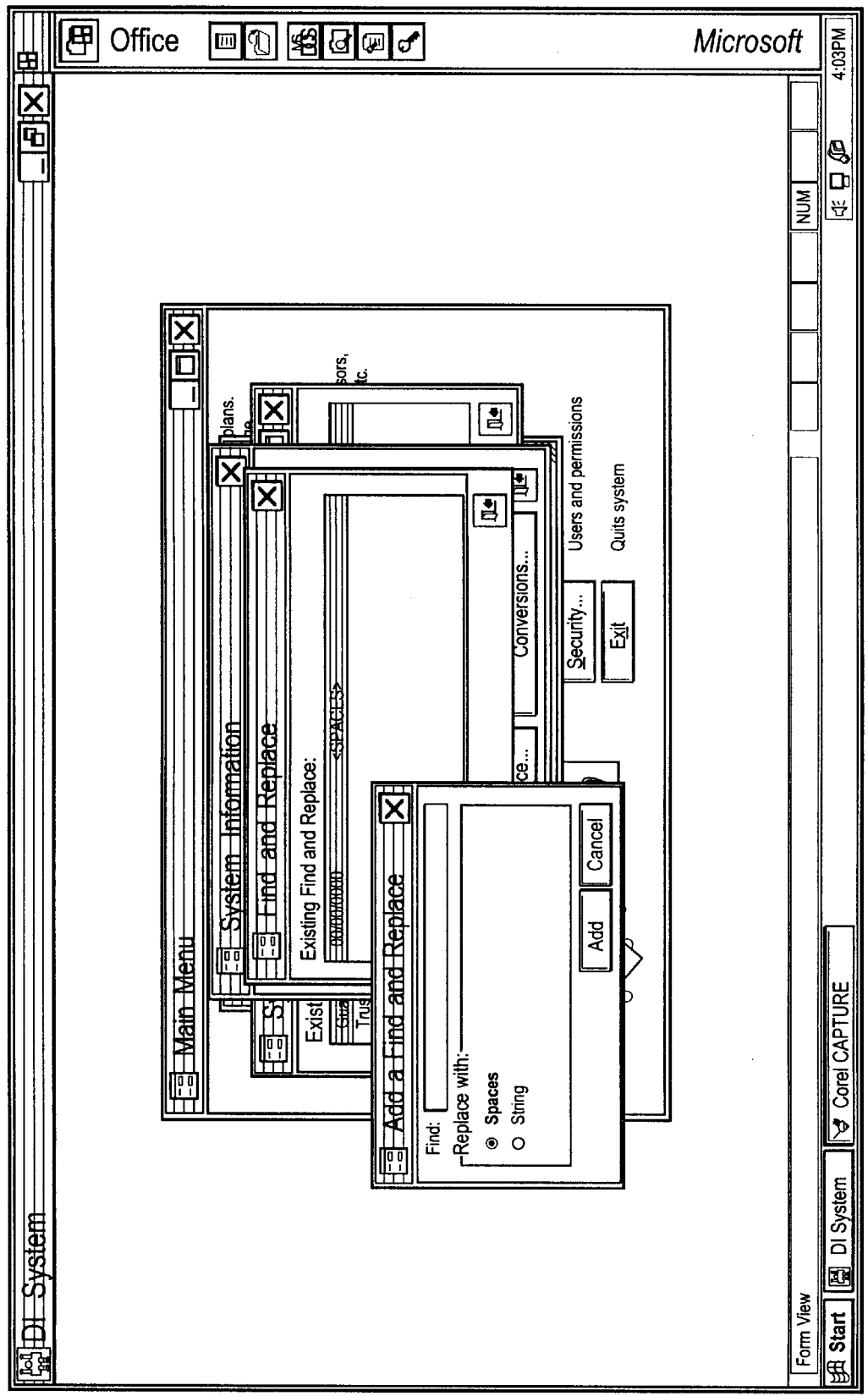
FIG. 8 is a representation of a screen produced on a visual output device in accordance with the present invention.

The FIND AND REPLACE Screen in FIG. 8 opens up and the user enters the string to be searched, indicates whether he/she wants the string to be searched replaced by spaces or by a specific string. The user clicks on the EXIT command button and returns to the SYSTEM INFORMATION Screen in FIG. 6.

The user then creates a new import layout. Import layouts are custom definitions of the format and layout of a census file to be imported from an external system. Import layouts contain the footprints of the census file. When using import layouts, the user never has to require data in a specific layout from the external system. The user adds a new IMPORT LAYOUT by clicking on the command button with the blank page icon (Screen in FIG. 6) and a new screen (not shown in the figures) opens up where the user enters a name for the new IMPORT LAYOUT as well as a brief description. The user then clicks on the ADD button and the new IMPORT LAYOUT is automatically added to the EXISTING LAYOUTS list box on the SYSTEM INFORMATION Screen in FIG. 6.

The user then dicks on the EDIT command button (with the magnifying glass icon). The LAYOUT DETAIL Screen in FIG. 9 opens up. In the FILE TYPE frame, the user can chose what type of file he/she is importing.

One of the key features of the System 1 is its ability to import ASCII delimited files and ASCII fixed width files. Generally, the user chooses the file format (delimited or fixed width) and then creates a layout that mirrors the file's layout. Instead of requiring specific layouts from external systems, the System 1 is taught how to read the import file regardless of its layout. Consider the following, example: the user may have just received the following file and need to import it into the system:

| John Doe | 000-000000 | 11 Park Avenue | New York | NY | 10034 | 4000 | 3A21 |
| Al Facet | 999-09-0000 | 2 Place des Moulins | Albur | NJ | 06789 | 3000 | 23DEA |

The user will use LAYOUT DETAIL Screen in FIG. 9 or 10 to create a layout as follows:

| First Name | 5 |
|---|---|
| Last Name | 7 |
| Social Security Number | 11 |
| Address | 20 |
| City | 8 |
| State | 2 |
| Zip | 5 |
| Plan contribution | 4 |
| FILLER | 6 |

Using the above layout, the System 1 will be able to read and import the file perfectly without ever requiring the external system to abide by any layout rules. Note that the last field is labeled <FILLER>, which tells the System 1 that this field is unwanted data.

Figure 9:
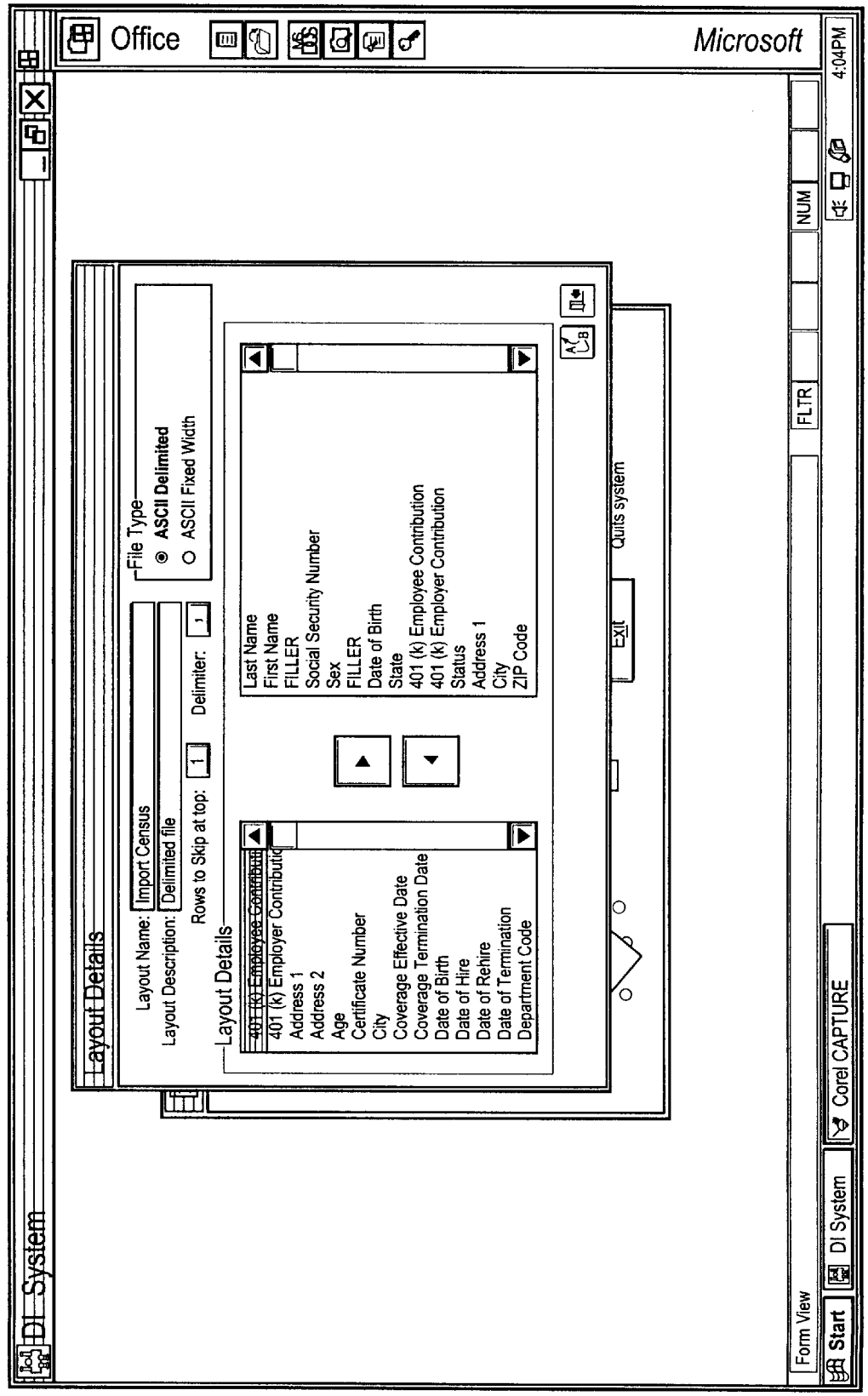
FIG. 9 is a representation of a screen produced on a visual output device in accordance with the present invention.
Figure 10:
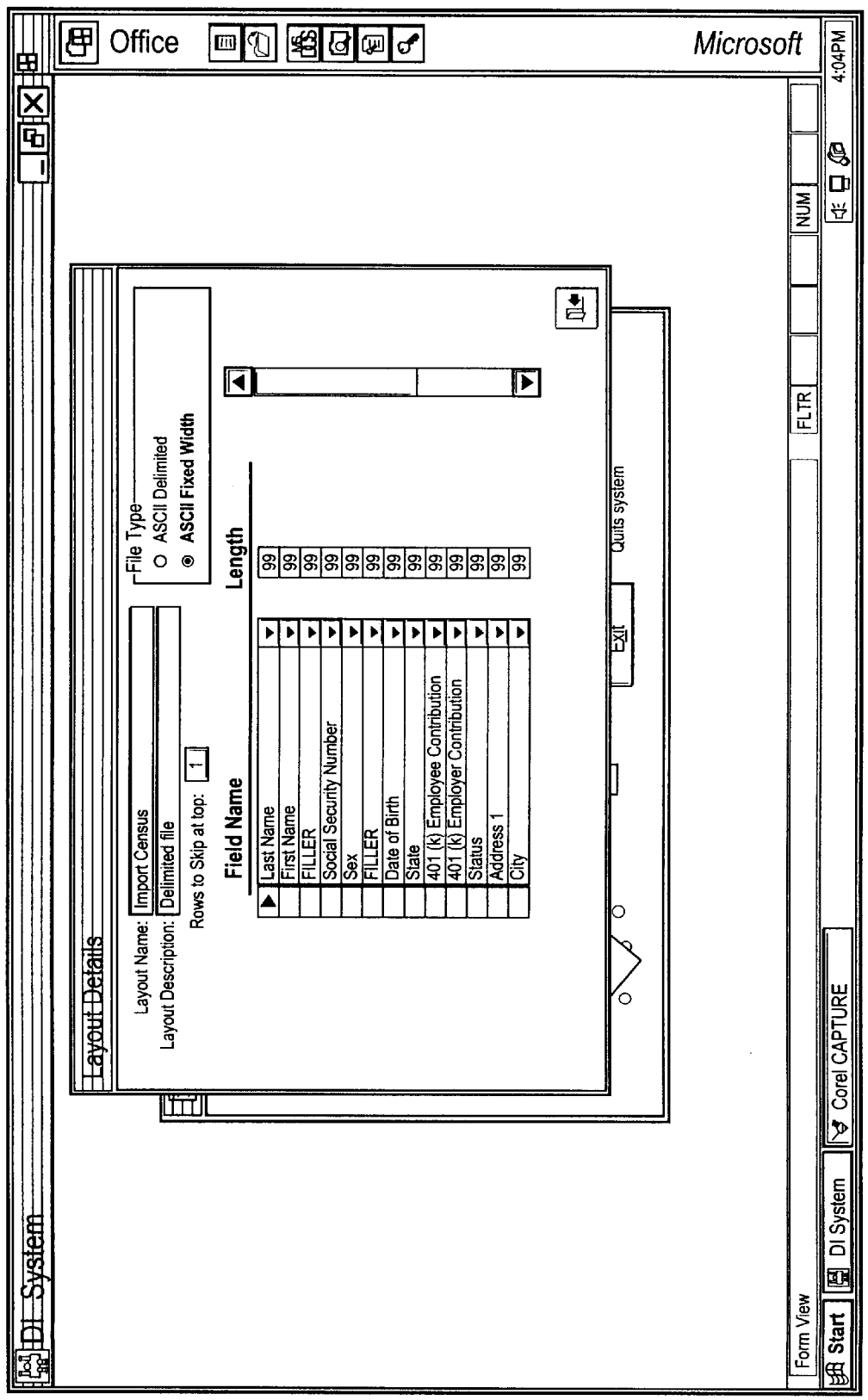
FIG. 10 is a representation of a screen produced on a visual output device in accordance with the present invention.

Note that the users choice of the FILE TYPE determines which of LAYOUT DETAIL Screen in FIGS. 9 or 10 is displayed. If the user chooses the ASCII delimited FILE TYPE, the LAYOUT DETAIL Screen in FIG. 9 will display two list boxes: a field list library on a left containing all possible fields the user may import, and selected fields to import on the right. To add a field to the selected fields list box, the user selects the field he/she wants to add from the field list library on the left and then clicks on the ADD command button (with the arrow pointing to the right icon).

When clicking on the ADD command button, the System 1 will make sure that a field has the selected field to add has not already been selected. Because the user has selected an ASCII delimited file, the user will then enter a delimiter in a DELIMITER text box. The user also needs to specify whether he/she wants the System 1 to skip the first X rows when importing the file because sometime external systems include field names at the top of an ASCII file. The System 1 will then skip the first row (for example) and start importing data beginning at the second row.

If the user chooses the ASCII fixed width FILE TYPE, the LAYOUT DETAILS Screen in FIG. 10 displays a combo box and a text box for each field to be imported. To add a field to the selected fields list box, the user selects the field he/she wants to add from the pull down combo box and since the user has selected a fixed width file type, the user must enter the length of the field. As soon as a new field is selected from the pull down combo box, a new pull down combo box appears right below for a new field to be selected. When adding fields, the system will make sure that a field has the selected field to add has not already been selected. The user also needs to specify whether he/she wants the System 1 to skip the first X rows when importing the file because sometimes external systems may include field names at the top of an ASCII file.

Once the chosen IMPORT LAYOUT has been defined, the user clicks on an EXIT command button to return to the SYSTEM INFORMATION Screen in FIG. 6. The user then clicks on the EXIT command button to return to the SYSTEM LIST Screen in FIG. 5. The user then dicks on the EXIT command button to return to the LIBRARIES Screen in FIG. 4. The user then clicks on the EXIT command button to return to the MAIN MENU Screen in FIG. 3.

The user can also imports a new census. In order to import the census, the user clicks on the IMPORT command button located on the MAIN MENU Screen in FIG. 3. By clicking on the IMPORT command button, the user triggers the IMPORT WIZARD process that consists of five screens that will help the user in the import process.

The census will contain plan participant information including but not limited to the following fields:
Last Name
First Name
Middle Name
Middle Initial
Status (active, terminated, disabled, Leave, Death, Retirement, Ineligible, suspended, not participating)
Date of Birth
Date of Hire
Date of Rehire
Date of Termination
Coverage Effective Date
Coverage Termination Date
Disability Date
Age
Sex
Social Security Number
Employee Code
Department Code
Certificate Number
Employee Plan Contribution Amount
Employer Plan Contribution Amount
Certificate Number
Address 1
Address 2
State
City
Zip
Country If the census has already been imported but some information may have changed (e.g., about the existing plan participants or new participants were added), then the system 1 will update its database 20 with the information that has changed (archiving old information) on the existing participants and add the new participants to its database 20.

When importing an existing census, the system 1 performs all the above checks as well as monitoring very closely data that changes for the existing insureds. The system 1 abides by the following rules when replacing data:

| EXISTING DATA | NEW DATA | ACTION |
|---|---|---|
| NULL | NOT NULL | OVERWRITE |
| NOT NULL | NULL | DO NOT OVERWRITE |
| NOT NULL | NOT NULL | OVERWRITE, ARCHIVE EXISTING DATA AND PRINT REPORT |
| NULL | NULL | NO ACTION |

Please note that censuses can also be scanned then recognized using OCR (Optical Character Recognition) and finally saved to ASCII files for import.

Figure 11:
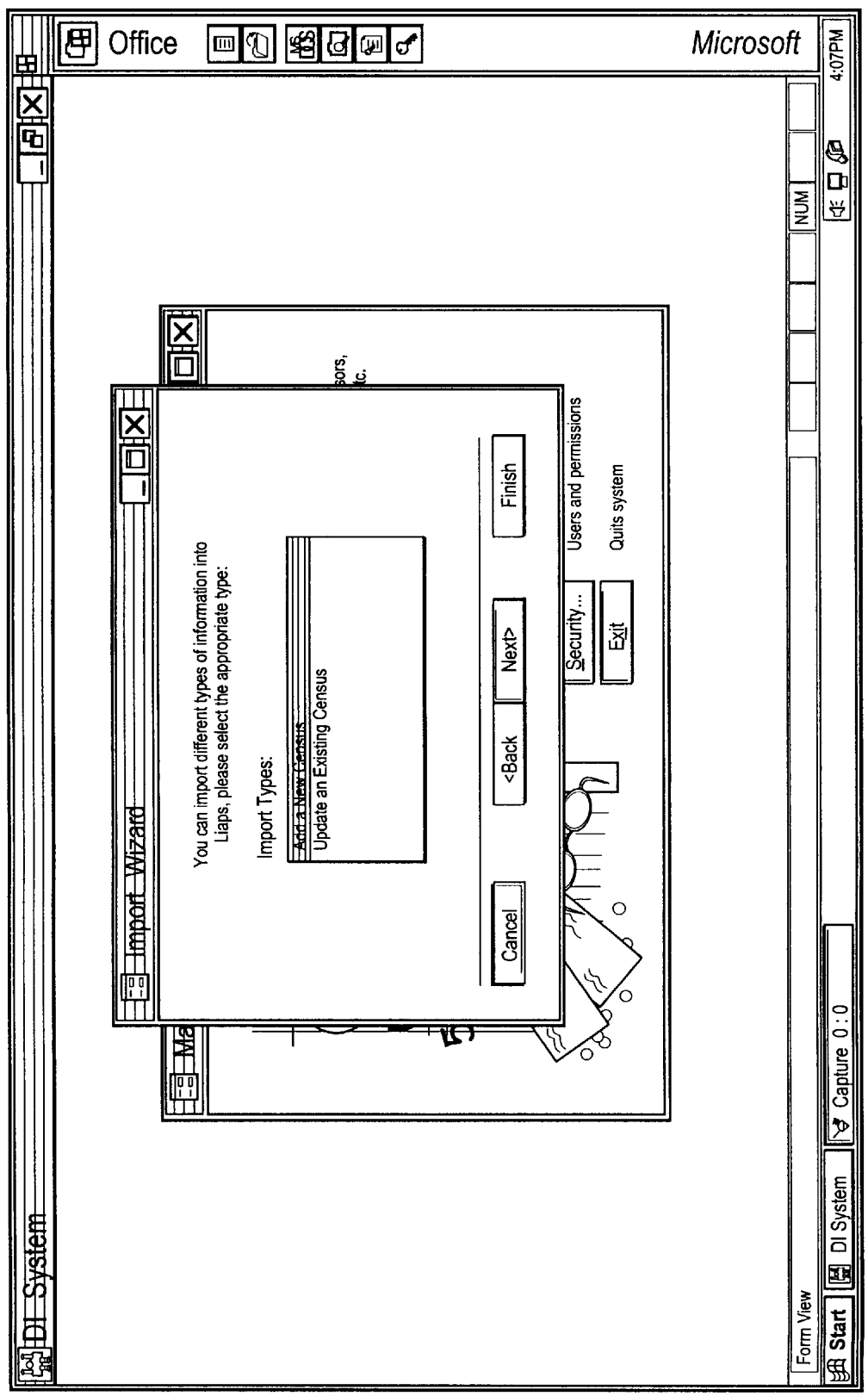
FIG. 11 is a representation of a screen produced on a visual output device in accordance with the present invention.

The user needs to select whether he/she is importing a new census in the System 1 or if he/she is updating data for an existing census. Using an IMPORT WIZARD Screen in FIG. 11, the user selects <ADD A NEW CENSUS> from the IMPORT TYPES list box. The user clicks on a NEXT button.

Figure 12:
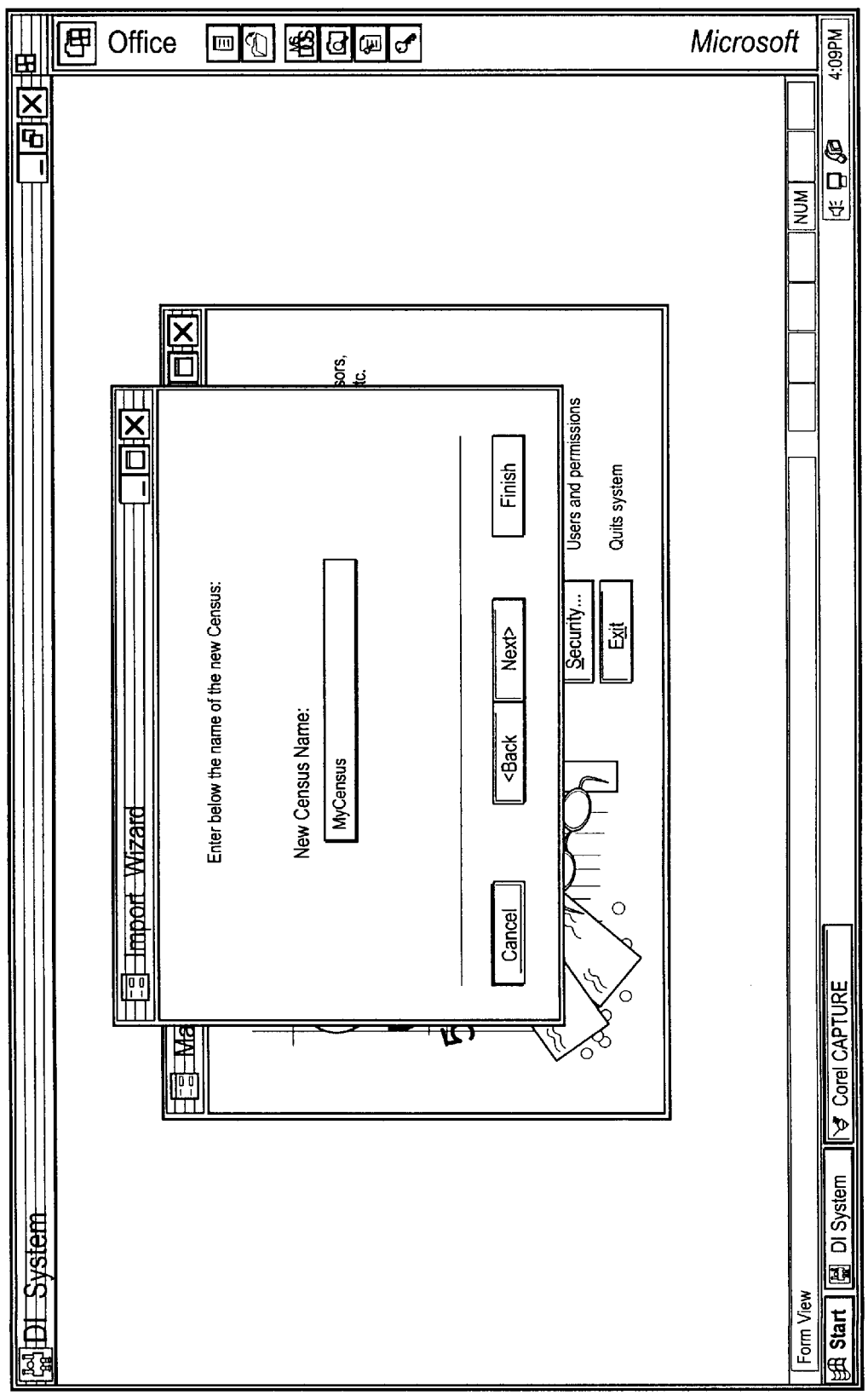
FIG. 12 is a representation of a screen produced on a visual output device in accordance with the present invention.
Figure 13:
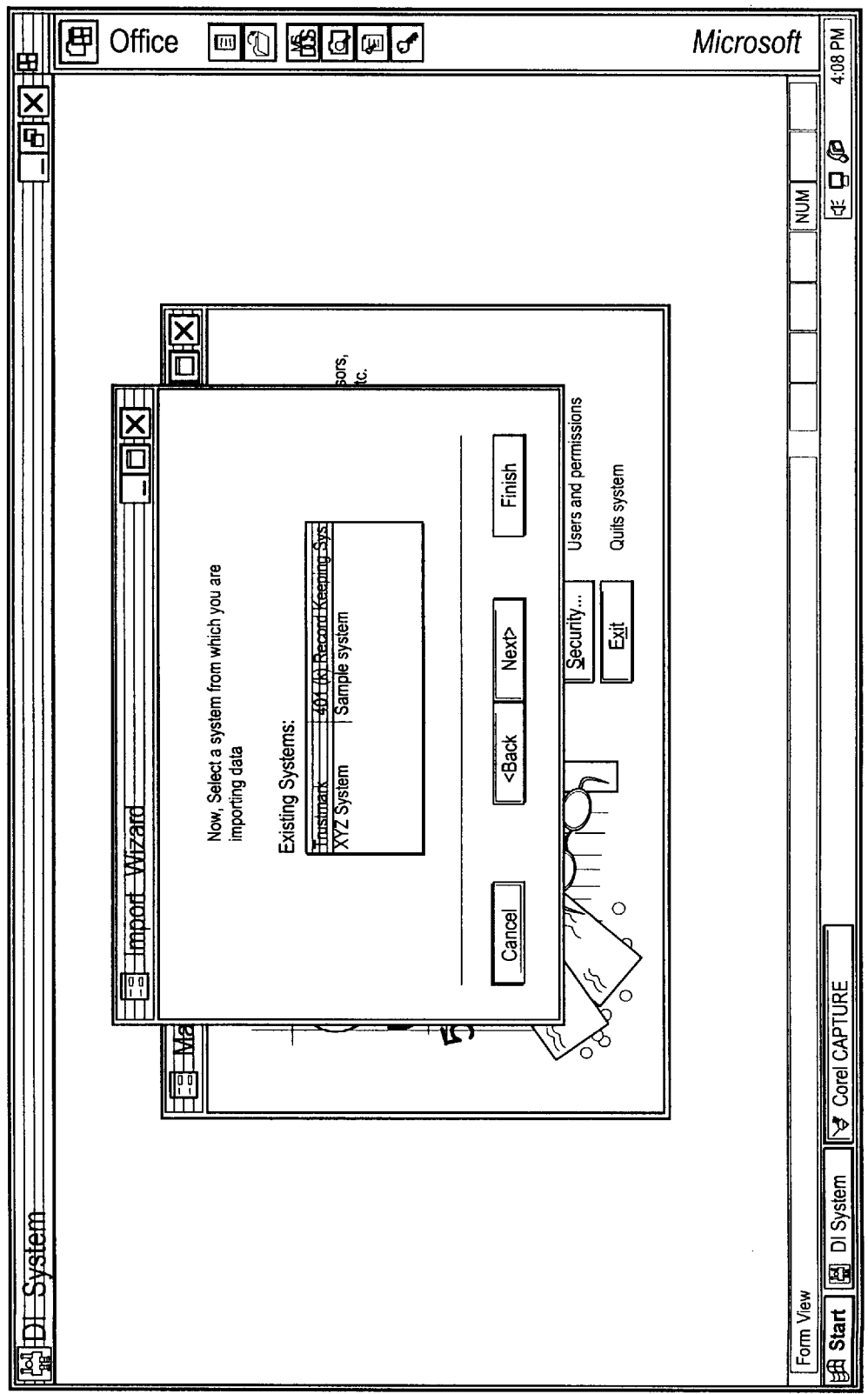
FIG. 13 is a representation of a screen produced on a visual output device in accordance with the present invention.
Figure 14:
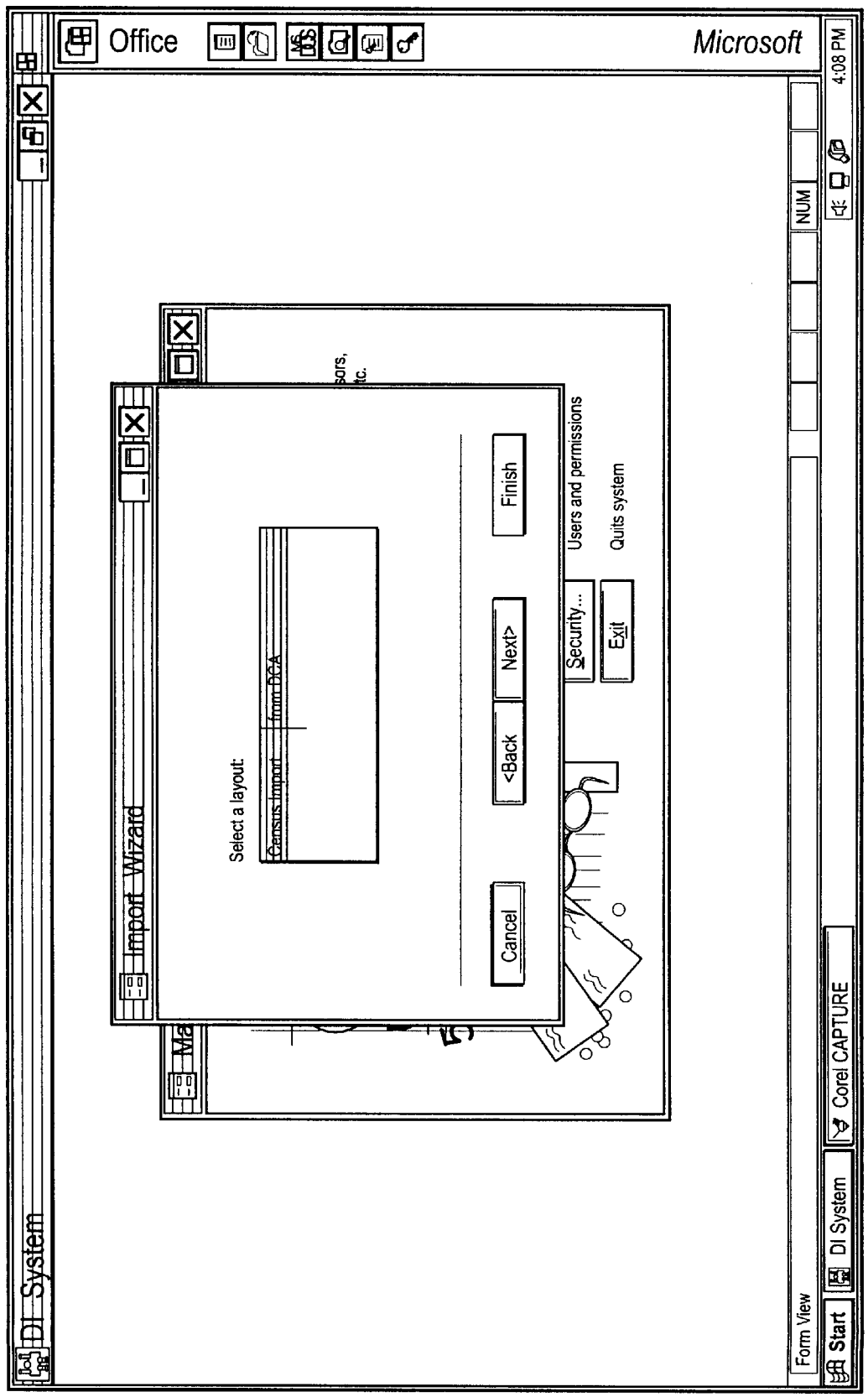
FIG. 14 is a representation of a screen produced on a visual output device in accordance with the present invention.
Figure 15:
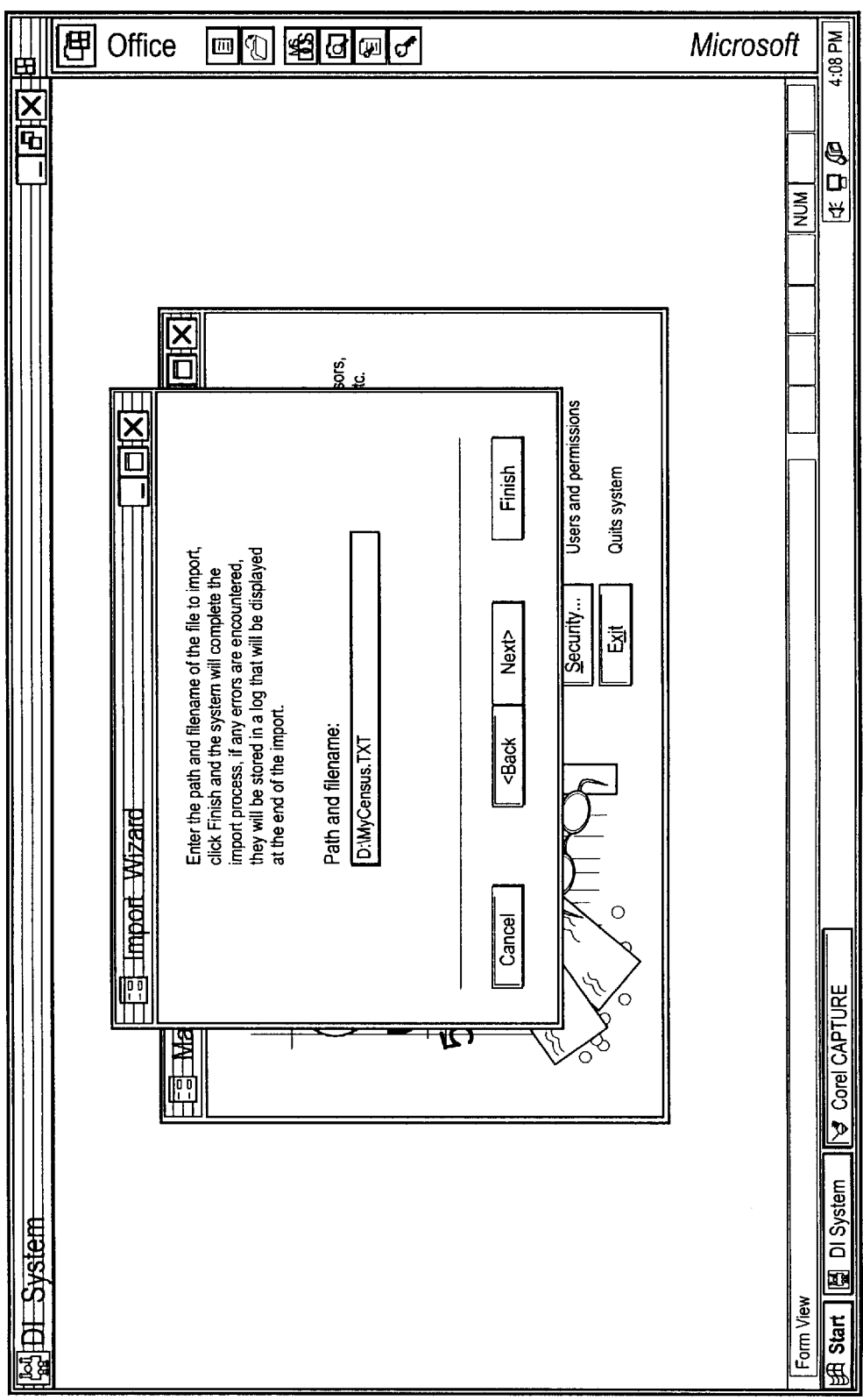
FIG. 15 is a representation of a screen produced on a visual output device in accordance with the present invention.

At the IMPORT WIZARD Screen in FIG. 12, the user enters the name of the new census for future reference. The user clicks on the NEXT button. At the IMPORT WIZARD Screen in FIG. 13, the user selects from the EXISTING SYSTEM list box from which external system he/she is importing the new census. The user clicks on a NEXT button. At the IMPORT WIZARD Screen in FIG. 14, the user selects which IMPORT LAYOUT he/she wants to use to import the new census. The user will select the IMPORT LAYOUT he/she just created. The user clicks on the NEXT button. At the IMPORT WIZARD Screen in FIG. 15, the user enters the path and filename of the file containing the new census to be imported. The user click on the FINISH button.

The System 1 will now perform the following tasks in order to successfully import the new census:

Task A—Check the file integrity. The System 1 makes sure that the number of fields contained in the file matches the number of fields specified in the import layout.

Task B—The System 1 will then perform a find and replace function that will replace any unwanted strings (succession of characters) with a more appropriate string. For example many external systems will print a null date to file (<0010010000>) which creates problems when importing, therefore the system finds and replace those null dates with an equal number of spaces.

Task C—The System 1 then scans the file field by fields looking for potential errors including but not limited to alphanumerical characters when numbers are expected and vice versa, wrong social security number, wrong state codes or data required that is not provided. In this case, a list of all errors will be printed to the screen containing an error message, the row number where the error occurred and the field name.

Task D—The System 1 imports data located on the file into its database. A message box will appear saying "THE CENSUS HAS BEEN IMPORTED SUCCESSFULLY". The user clicks on the OK command button and returns to the MAIN MENU Screen in FIG. 3.

Please note that the census can also be entered by hand, as discussed below.

In any case, the user also can calculate ages for the newly imported census. Ages may be imported within the census file. If this is not the case then the user can calculate ages internally on a age nearest birthday basis or age last birthday basis.

Figure 4:
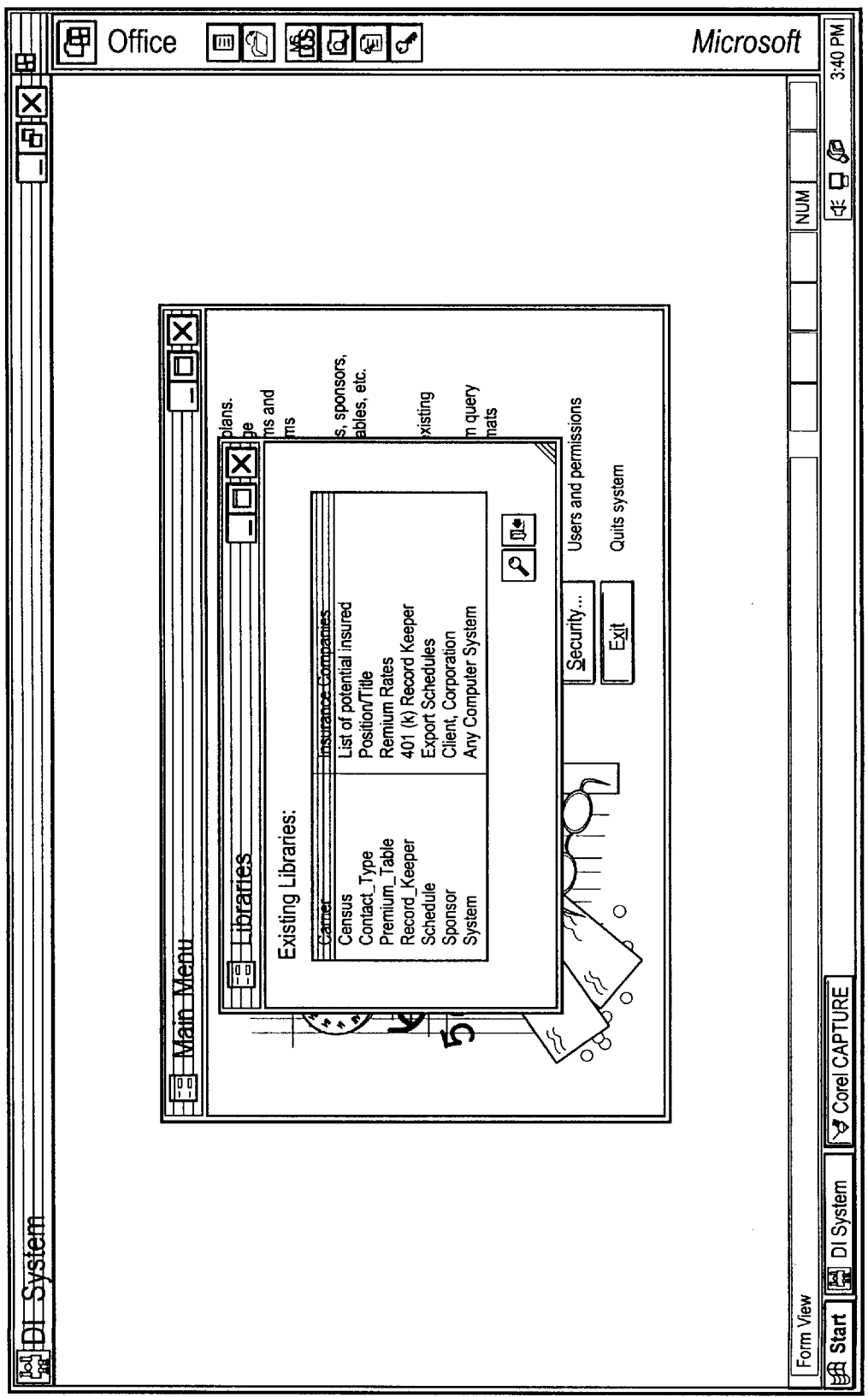
FIG. 4 is a representation of a screen produced on a visual output device in accordance with the present invention.
Figure 5:
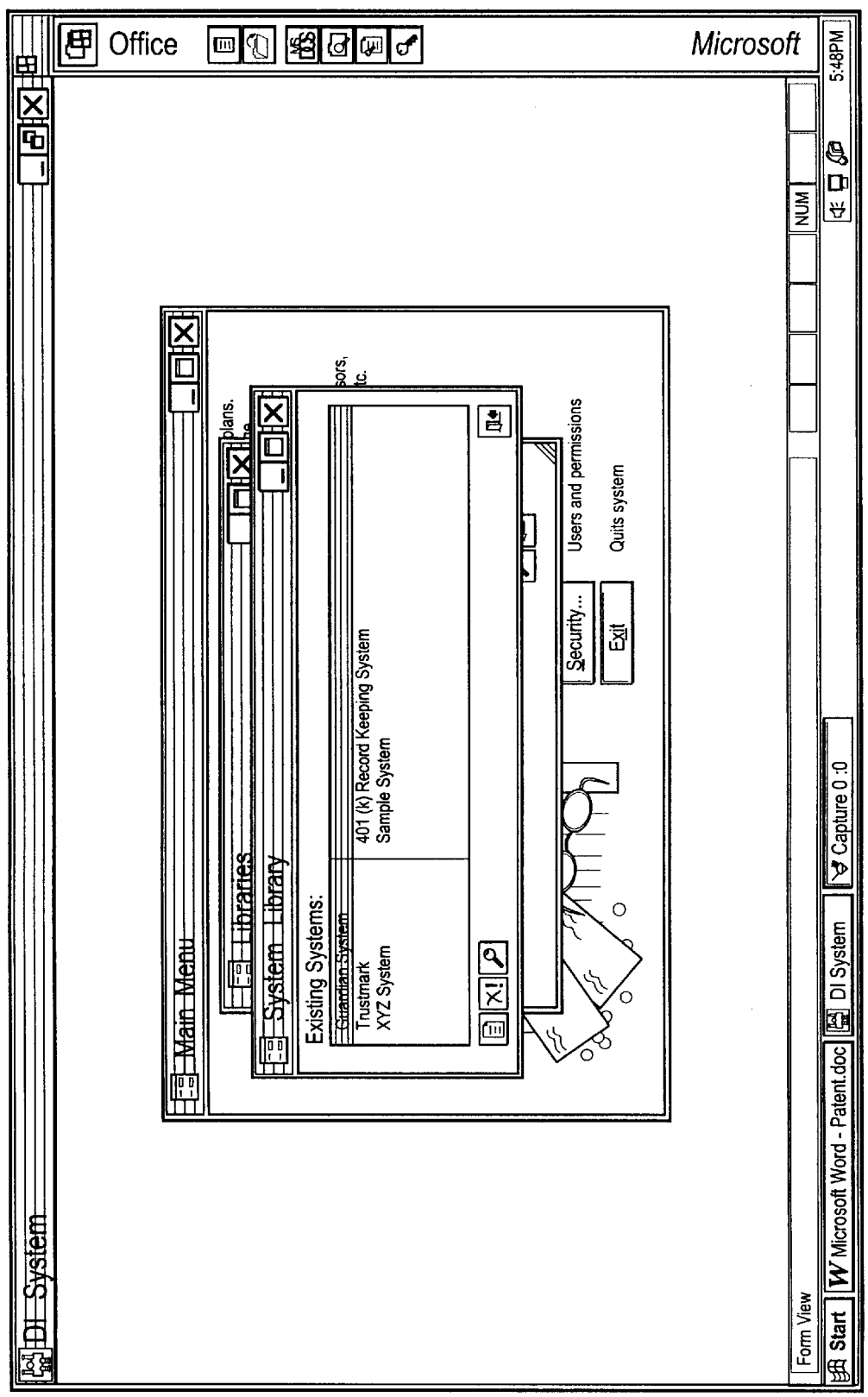
FIG. 5 is a representation of a screen produced on a visual output device in accordance with the present invention.

The user dicks on a LIBRARIES command button and opens up the LIBRARIES Screen in FIG. 4. The user double clicks on the CENSUS Library and brings up the CENSUS LIST Screen in FIG. 16. Next, the user double dicks on the new census he/she just imported to open up the CENSUS EDIT Screen in FIG. 17. In an AGE CALCULATION METHOD frame, the user selects which age calculation method he/she wants to use. The user can choose from AGE NEAREST BIRTHDAY or AGE LAST BIRTHDAY. The user then clicks on INSUREDS to access the INSURED LIST Screen in FIG. 18.

Figure 18:
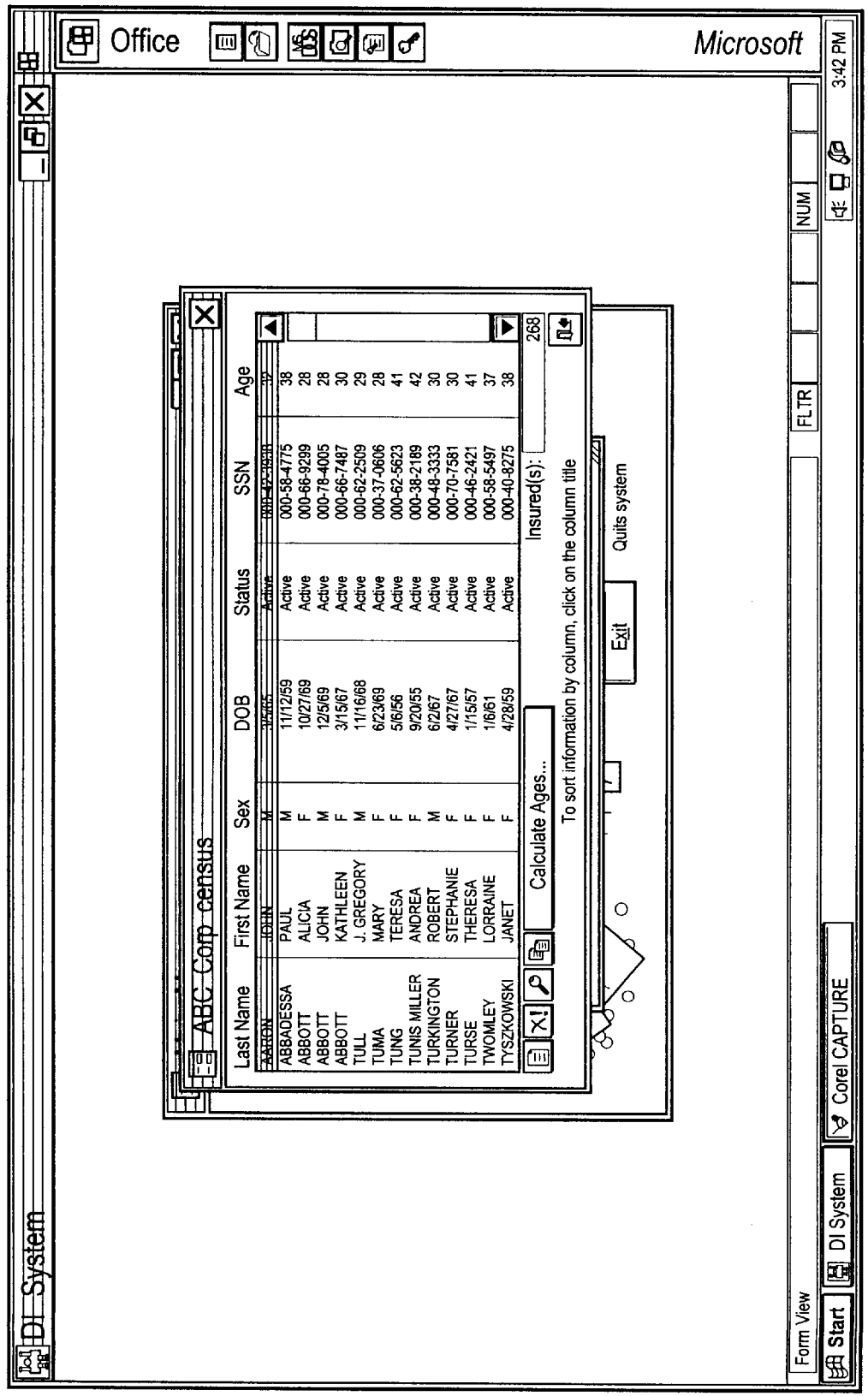
FIG. 18 is a representation of a screen produced on a visual output device in accordance with the present invention.

In order to calculate ages, the user needs to click on the CALCULATE AGES command button to open up the AGE CALC Screen in FIG. 18. The user enter the date as of which he/she elects to calculate ages and then dicks on the CALCULATE command button. The System 1 then check each insured's date of birth for its existence and validity.

The System 1 executes the following process to calculate ages as of last birthday:

```
Sub ALBCALC(Bday As Long, BMonth As Long, BYear As Long, pDay As Long,
pMonth As Long, pYear As Long, ALB_AGE As Long)
Dim D1 As Long
Dim E1 As Long
D1 = pMonth - BMonth
If D1 > 0 Then
   E1 = 0
End If
If D1 < 0 Then
   E1 = -1
End If
If D1 = 0 Then
   If pDay >= Bday Then
      E1 = 0
   Else
      E1 = -1
   End If
Else
   E1 = -1
End If
ALB_AGE = pYear - BYear + E1
End Sub
```

The System 1 executes the following process to calculate ages as of nearest birthday:

```
Sub ANBCALC(Bday As Long, BMonth As Long, BYear As Long, pDay As Long,
pMonth As Long, pYear As Long, ANB_AGE As Long)
Dim D1 As Long
Dim E1 As Long
D1 = pMonth - BMonth
```

-continued

```
If D1 > 5 Then
   If D1 = 6 Then
      If Bday >= pDay Then
         E1 = 0
      Else
         E1 = 1
      End if
   Else
      E1 = 1
   End If
Else
   If D1 < -5 Then
      If D1 = -6 Then
         If Bday >= pDay Then
            E1 = -1
         Else
            E1 = 0
         End If
      Else
         E1 = -1
      End If
   Else
      E1 = 0
   End If
End If
ANB_AGE = pYear - BYear + E1
End Sub
```

A message box then pops up informing the user that all ages were calculated successfully. The user clicks on OK and returns to the INSURED LIST Screen in FIG. 18. The AGE column on the INSURED LIST Screen in FIG. 18 is updated with the new ages.

Figure 16:
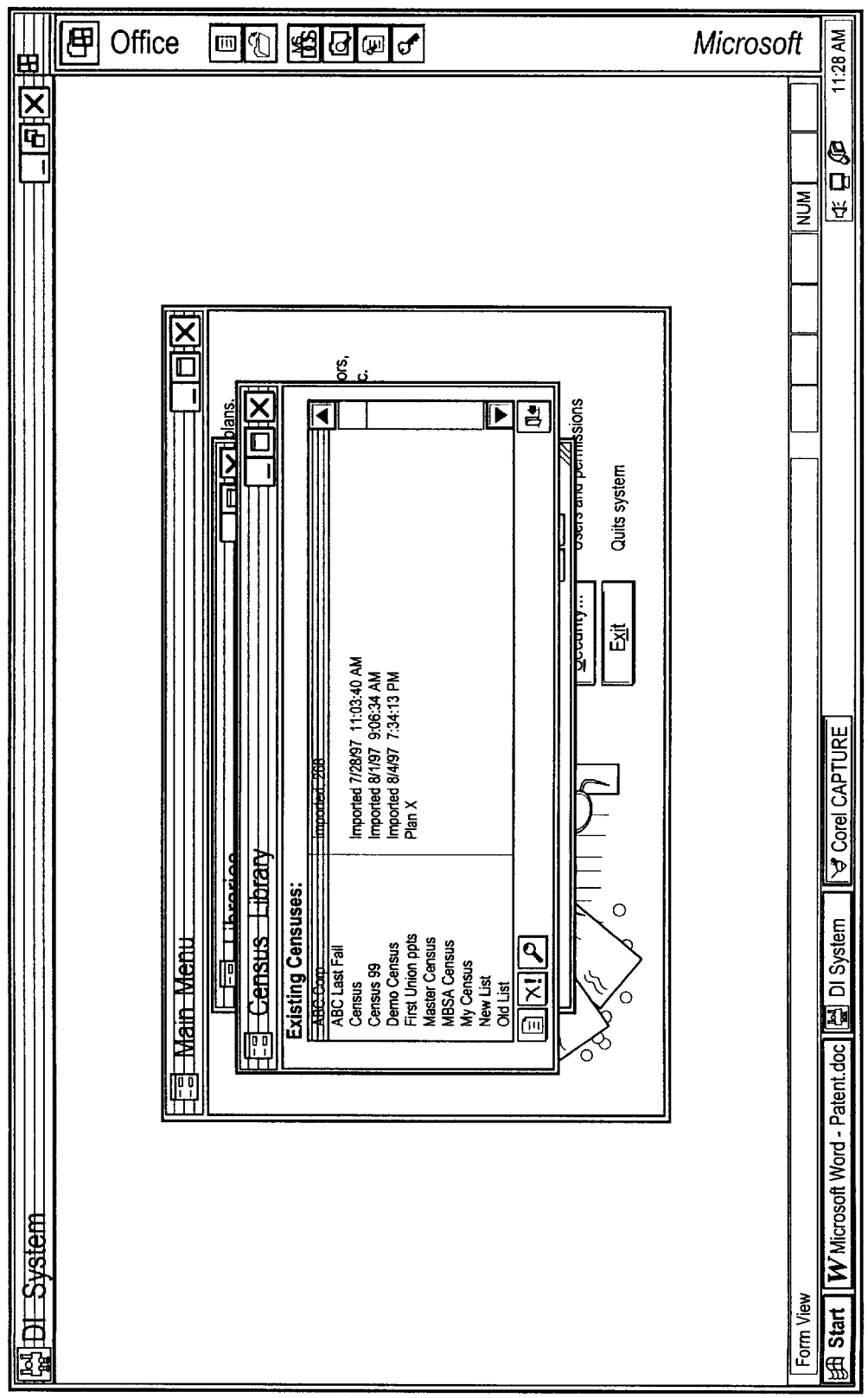
FIG. 16 is a representation of a screen produced on a visual output device in accordance with the present invention.
Figure 17:
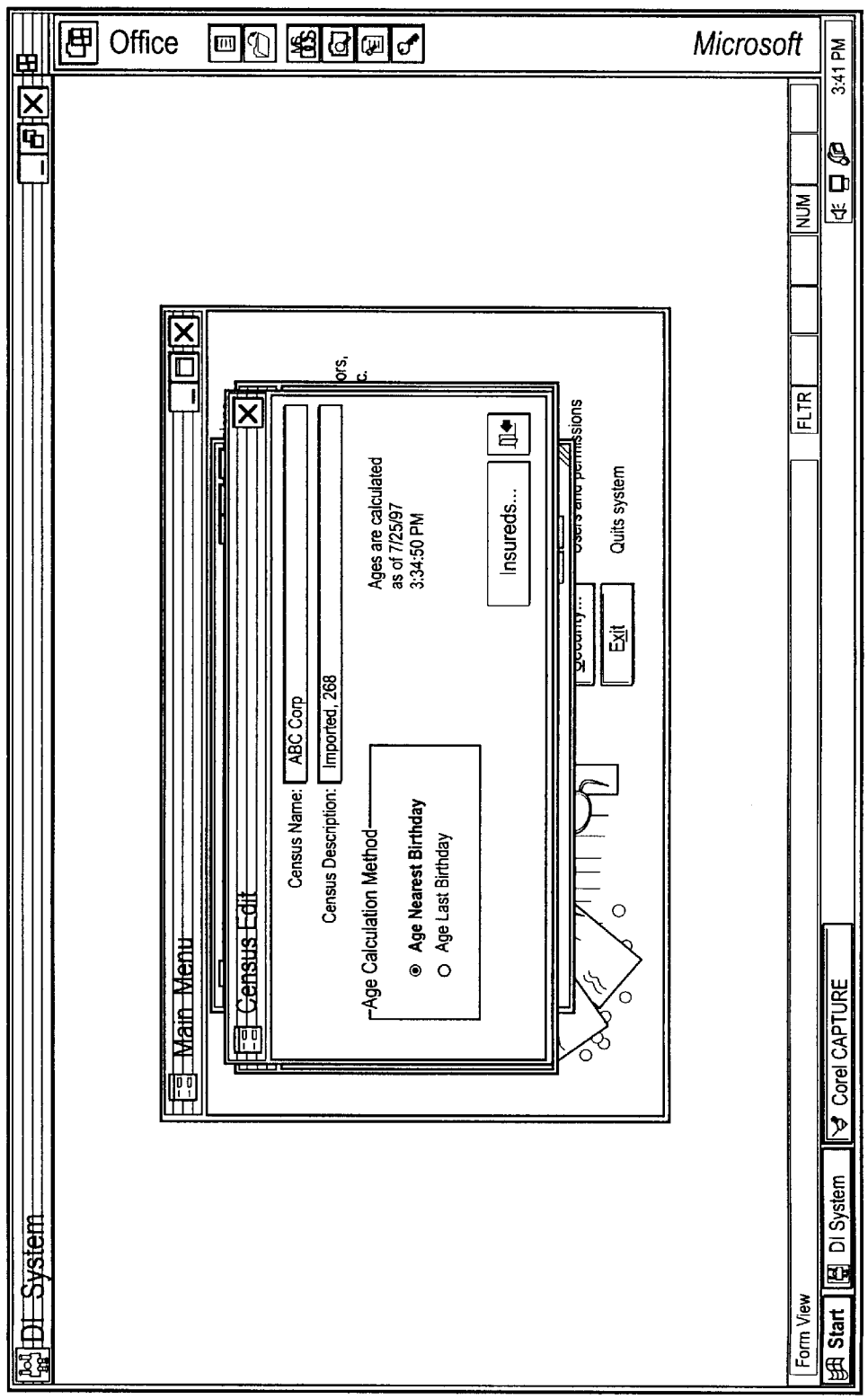
FIG. 17 is a representation of a screen produced on a visual output device in accordance with the present invention.

The user exits the INSURED LIST Screen in FIG. 18 by clicking on the EXIT command button and returns to the CENSUS EDIT Screen in FIG. 17. The user exits the CENSUS EDIT Screen in FIG. 17 by clicking on the EXIT command button and returns to the CENSUS LIST Screen in FIG. 16. The user exits the CENSUS LIST Screen in FIG. 16 by clicking on the EXIT command button and returns to the LIBRARIES Screen in FIG. 4.

The user can also create a new sponsor (i.e., the company that employs the insured). The System 1 needs to track all sponsors for reporting and communication purposes. It is possible that a single sponsor may set up multiple plans based upon different participation criteria. For example, highly compensated employees may be provided a separate plan from rank and file employees. The employer may want policy pricing to be based on the combined experience of all employees under multiple plans. The system must be capable of tracking each plan separately yet combine them for various purposes. Carriers may also want to customize reports based upon different combinations of plans or sponsors. The system must be capable of quickly generating customized reports, exports and extracts and automatically delivering them to all interested and pre-authorized parties.

Figure 20:
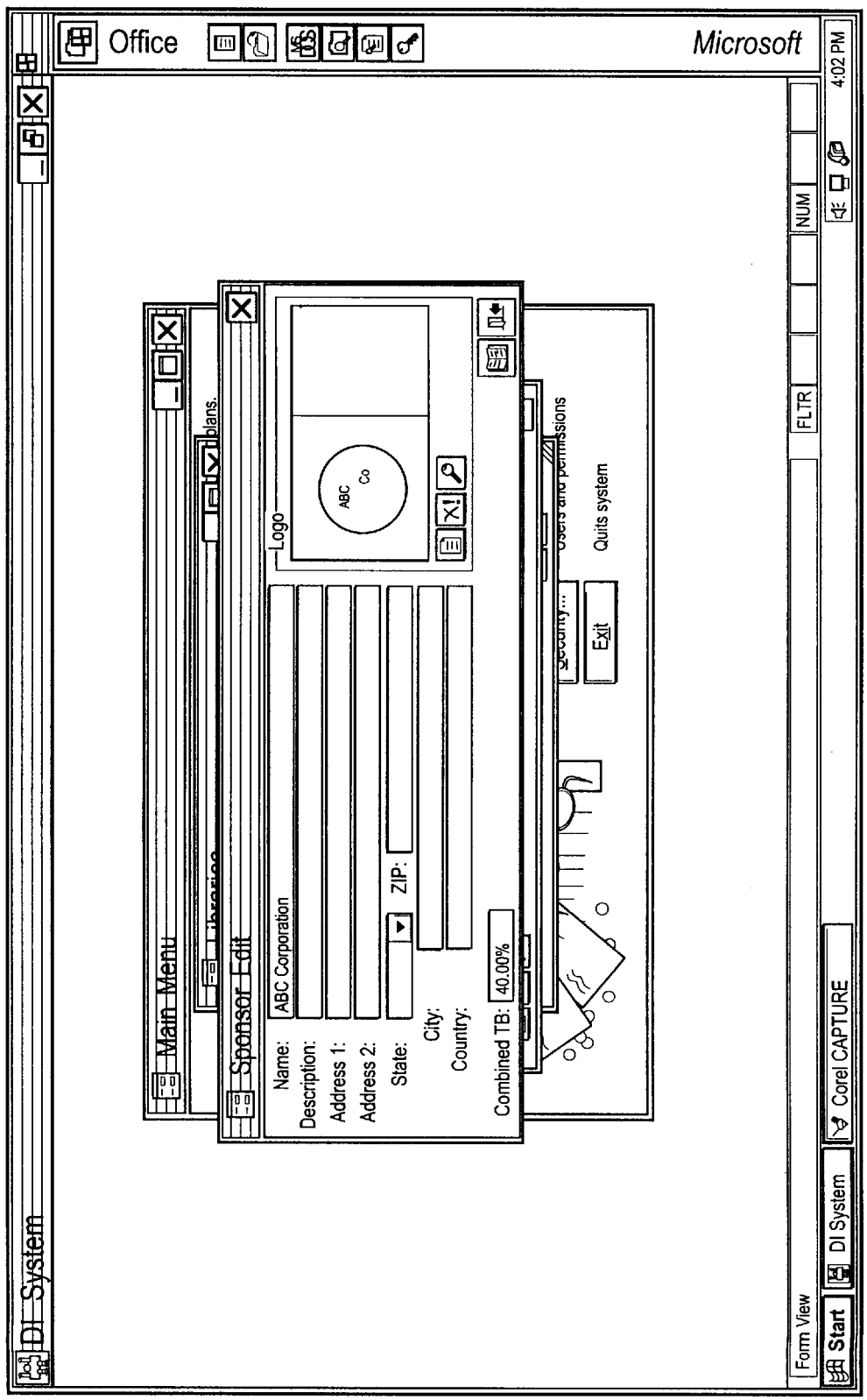
FIG. 20 is a representation of a screen produced on a visual output device in accordance with the present invention.

The user double clicks on the SPONSOR LIBRARY at Screen in FIG. 4 to open up the SPONSOR LIST Screen in Figure (not provided in the figures, but it is similar to the CENSUS LIST Screen in FIG. 16). The user adds a new SPONSOR by clicking on the command button with the blank page icon and a new SPONSOR EDIT Screen in Figure (not shown in figures) opens up where the user enters a name for the new SPONSOR as well as a brief description. The user then click on ADD button and the new SPONSOR is automatically added to the EXISTING SPONSORS list box on the SPONSOR LIST Screen in Figure. The user double clicks on the newly created SPONSOR to open up the SPONSOR EDIT Screen in FIG. 20. The user can now enter address, city, state, ZIP, country and a logo for the SPONSOR. By clicking on a CONTACTS button (opened booklet icon), the user can enter contact information for the specific sponsor (this process will be described later in this document with CARRIER information).

The user exits the SPONSOR EDIT Screen in Figure by clicking on the EXIT command button and returns to the SPONSOR LIST screen . The user exits the SPONSOR LIST screen by clicking on the EXIT command button and returns to the LIBRARIES Screen in FIG. 4.

The user can also create a new carrier or selects an existing carrier. The carrier is the insurance company that insures the insured. The System 1 needs to track also the carriers for report and communication purposes. The user double dicks on the CARRIER LIBRARY to open up the CARRIER LIST Screen in Figure (not provided, but similar to the CENSUS LIST screen).

The user adds a new CARRIER by clicking on a command button with the blank page icon and a new screen opens up where the user enters a name for the new CARRIER as well as a brief description. The user then click on ADD button and the new CARRIER is automatically added to the EXISTING CARRIERS list box on the CARRIER LIST screen. The user double clicks on the newly created SPONSOR to open up the CARRIER EDIT Screen in FIG. 21. The user can now enter address, city, state, ZIP, country and a logo for the CARRIER. By clicking on the CONTACTS button (opened booklet icon), the user opens up the CONTACT LIST Screen in FIG. 22. The user may add a new contact by clicking on the command button with the blank page icon and a new screen opens up where the user enters a name and a title. The user then dick on ADD button and the new CONTACT is automatically added to the EXISTING CONTACT list box on the CONTACT LIST Screen in FIG. 22. The user edit the new CONTACT by double clicking the new contact's name in the CONTACT list box. The CONTACT EDIT Screen in FIG. 23. The user may enter the following information for each contact:

Last Name

First Name

Figure 23:
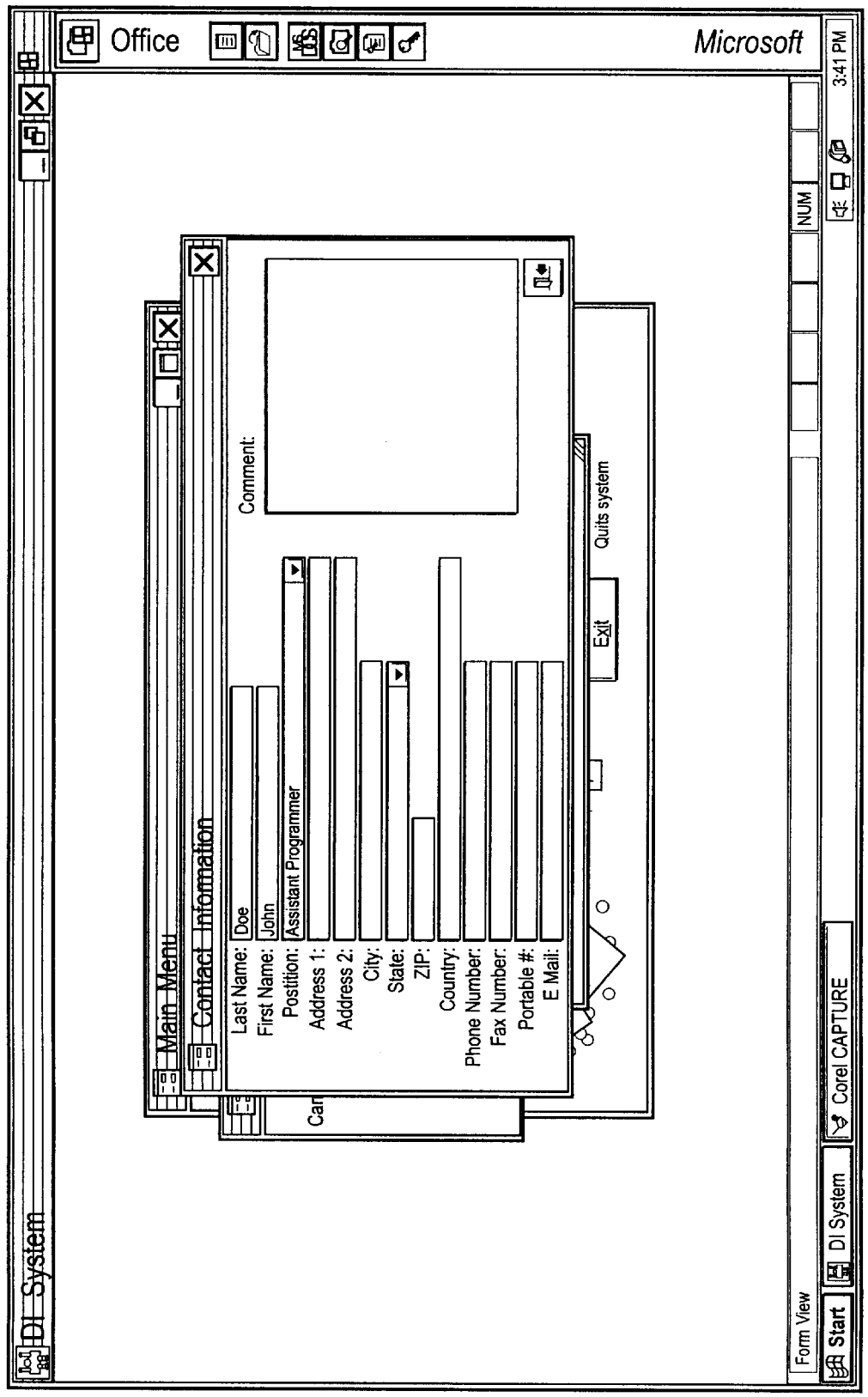
FIG. 23 is a representation of a screen produced on a visual output device in accordance with the present invention.

Position
Address
City
State
Zip
Country
Phone Number
Fax Number
Portable Number
E Mail The user exits the CONTACT EDIT Screen in FIG. 23 by clicking on the EXIT command button and returns to the CONTACT LIST Screen 22. The user exits the CONTACT LIST screen by clicking on the EXIT command button and returns to the CARRIER EDIT Screen in FIG. 21.

Figure 21:
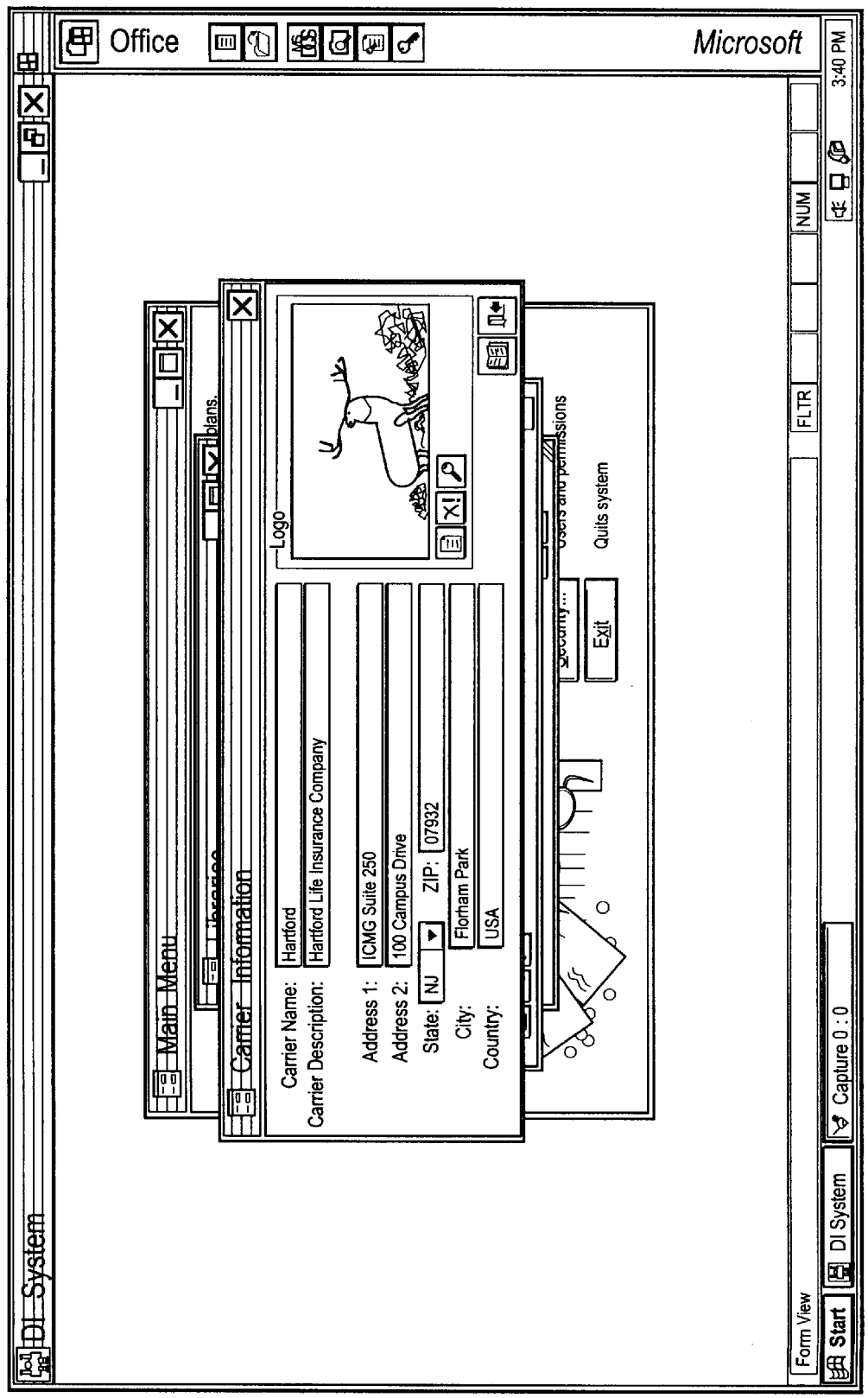
FIG. 21 is a representation of a screen produced on a visual output device in accordance with the present invention.

The user exits the CARRIER EDIT Screen in FIG. 21 by clicking on the EXIT command button and returns to the CARRIER LIST Screen in FIG. 21. The user exits the CARRIER LIST Screen in FIG. 21 by clicking on the EXIT command button and returns to the LIBRARIES Screen in FIG. 4.

The user can also creates a new record keeper or selects an existing record keeper. The record keeper administers the 401(k) plan. It keeps track of plan participants' contributions and status. The system needs to track record keepers for report and communication purposes. The user double clicks on the RECORD KEEPER library to open up the RECORD KEEPER LIST Screen in Figure (not provided, but similar to the CENSUS LIST Screen in FIG. 16.

The user adds a new RECORD KEEPER by clicking on the command button with the blank page icon and a new screen opens up where the user enters a name for the new RECORD KEEPER as well as a brief description. The user then click on ADD button and the new RECORD KEEPER is automatically added to the EXISTING RECORD KEEPERS list box on the RECORD KEEPER LIST screen. The user double clicks on the newly created RECORD KEEPER to open up the RECORD KEEPER EDIT Screen in FIG. 24. The user can now enter address, city, state, ZIP, country and a logo for the RECORD KEEPER. By clicking on the CONTACTS button (opened booklet icon), the user opens up the CONTACT LIST Screen in FIG. 24. The user may add a new contact by clicking on the command button with the blank page icon and a new screen opens up where the user enters a name and a title. The user then click on ADD button and the new CONTACT is automatically added to the EXISTING CONTACT list box on the CONTACT LIST Screen in FIG. 22. The user edits the new CONTACT by double clicking the new contact's name in the CONTACT list box. The CONTACT EDIT Screen in FIG. 23 opens up.

Figure 22:
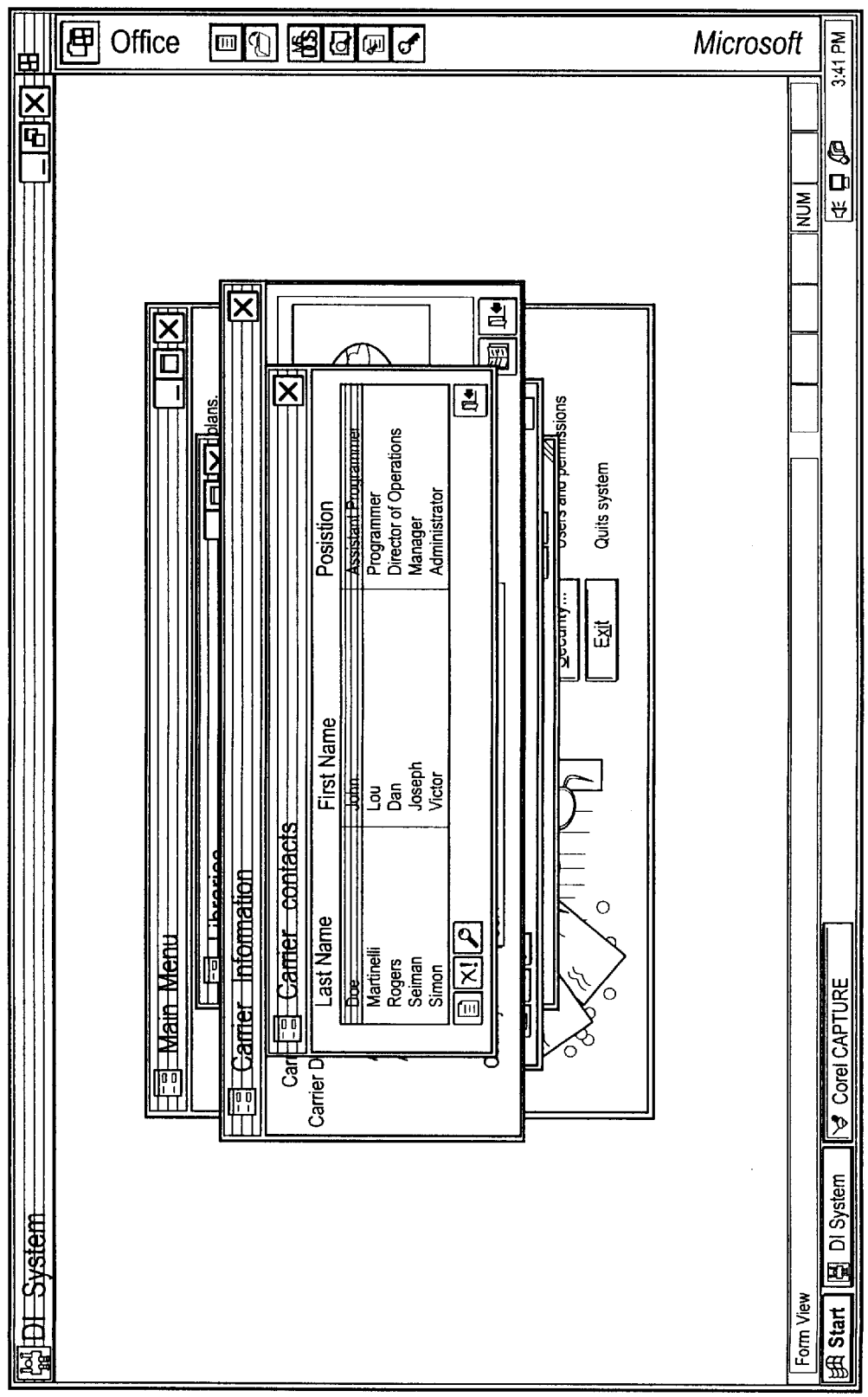
FIG. 22 is a representation of a screen produced on a visual output device in accordance with the present invention.

The user exits the CONTACT EDIT Screen in FIG. 23 by clicking on the EXIT command button and returns to the CONTACT LIST Screen in FIG. 22. The user exits the CONTACT LIST Screen in FIG. 22 by clicking on the EXIT command button and returns to the RECORD KEEPER EDIT Screen in FIG. 24.

Figure 24:
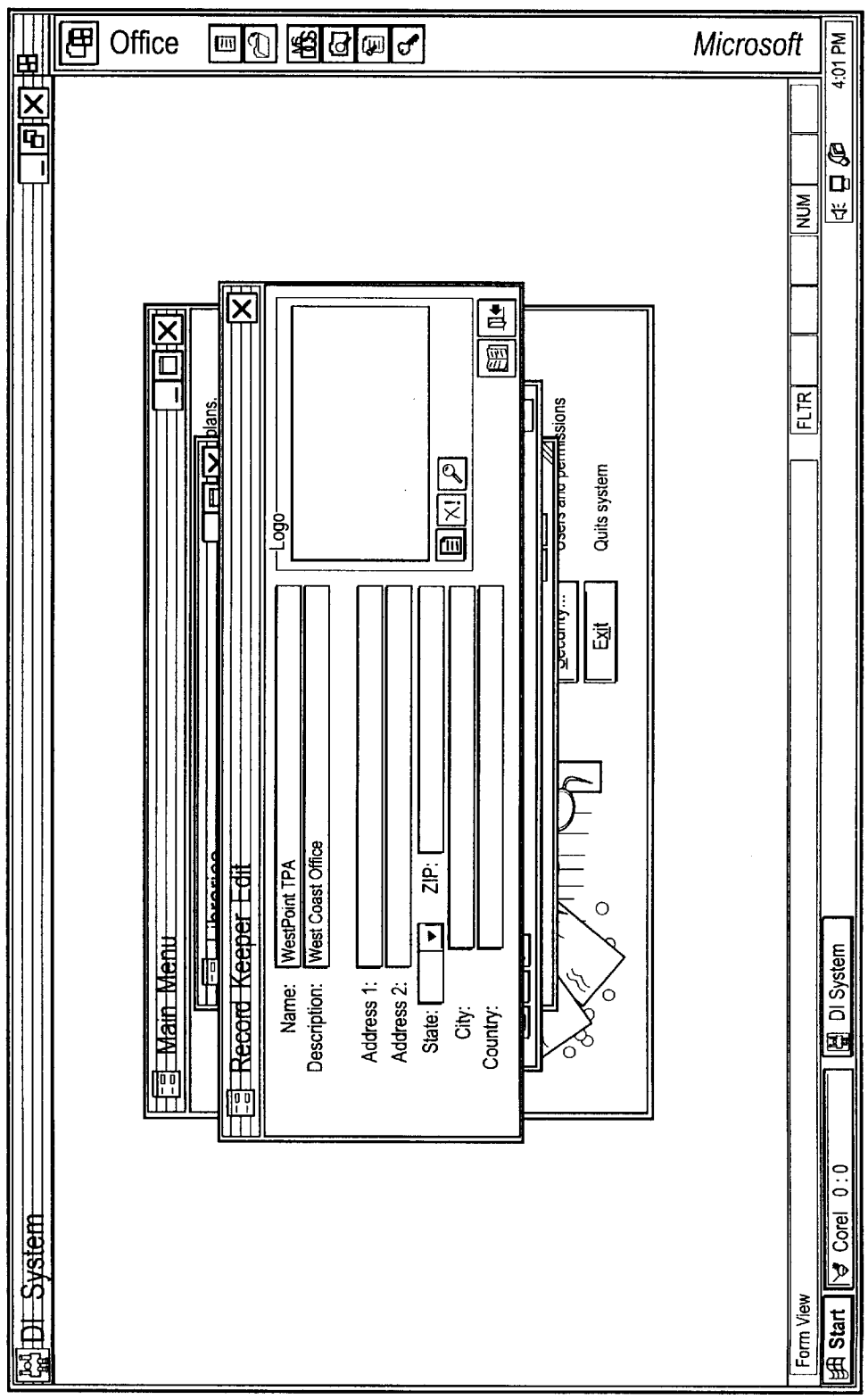
FIG. 24 is a representation of a screen produced on a visual output device in accordance with the present invention.

The user exits the RECORD KEEPER EDIT Screen in FIG. 24 by clicking on the EXIT command button and returns to the RECORD KEEPER LIST Screen in Figure. The user exits the RECORD KEEPER LIST Screen in Figure by clicking on the EXIT command button and returns to the LIBRARIES Screen in FIG. 3. The user exits the LIBRARIES screen by clicking on the EXIT command button and returns to the MAIN MENU Screen in FIG. 3.

The user can also creates a new plan or selects an existing plan. The user dicks on the PLANS command button to open up the PLAN LIST Screen in FIG. 25. A list of all the plans contained into the System 1 is displayed. The user adds a new PLAN by clicking on the command button with the blank page icon and PLAN ADD Screen in FIG. 26 opens up where the user enters information about the new plan.

The information about the new plan includes:

Plan name

Plan description

Plan carrier (the user would select the newly created carrier)

Plan sponsor (the user would select the newly created sponsor)

Plan census (the user would select the newly imported census)

Plan record keeper (the user would select the newly created record keeper)

Coverage of employee contribution: what percentage of the employee 401(k) contribution do you want to insure?

Coverage of employer contribution: what percentage of the employer 401(k) contribution do you want to insure?

Does the plan allow for refund of premium?

In the event that an employee terminates employment, the plan may or may not refund the unearned portion of the premium for the balance of the plan year. If no refund is provided, then a paid up policy, or some other consideration is provided.

Figure 27:
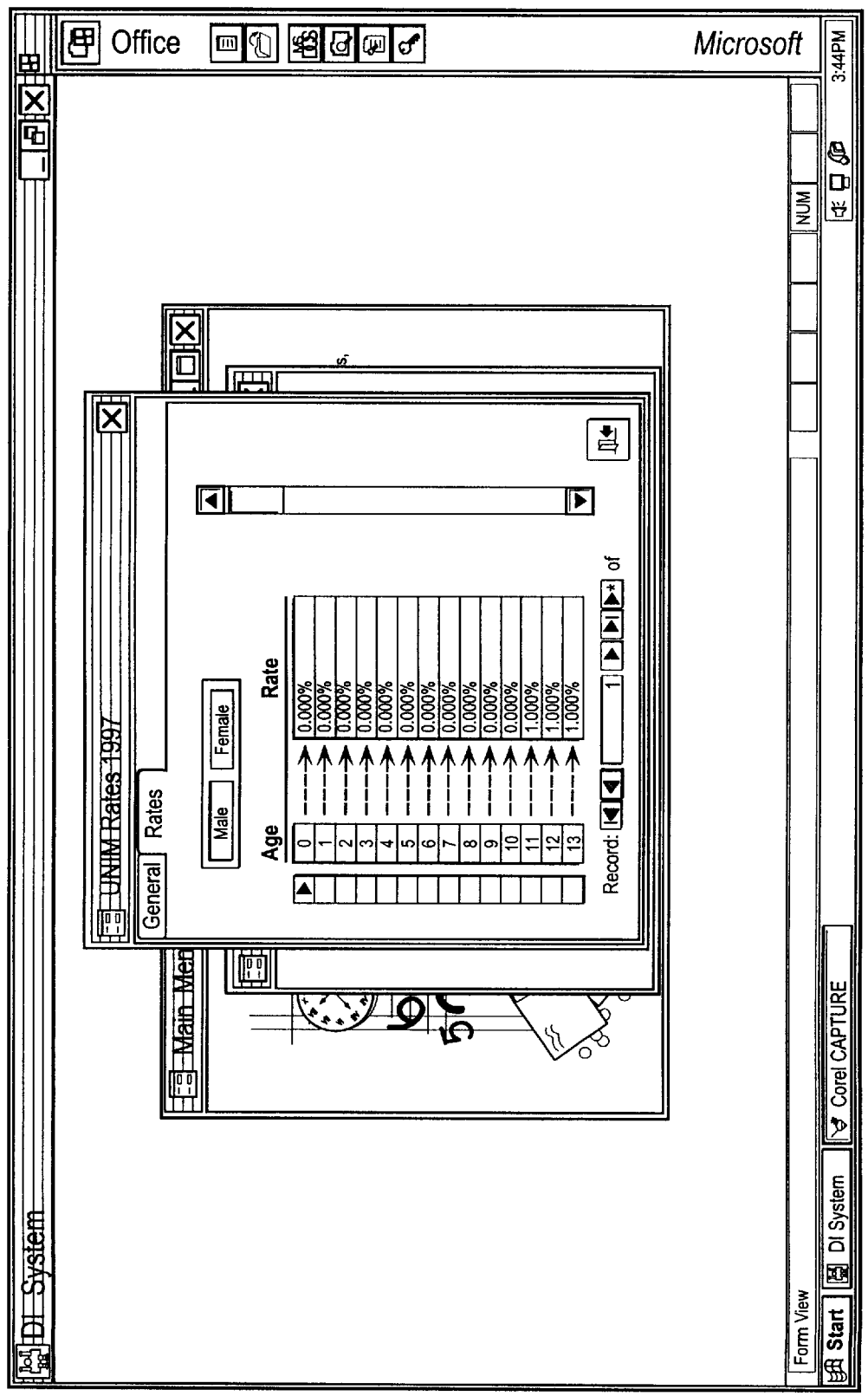
FIG. 27 is a representation of a screen produced on a visual output device in accordance with the present invention.

The premium calculation method will specify how premiums are calculated; there are two options: (1) the user either enters a premium rate that will be the same for all insureds regardless of age and sex; (2) the user selects TABLE RATE and a pull down combo box appears with a list of available premium tables by age and sex (for an example of premium table please see Screen in FIG. 27.

The user can then enter a plan issue date.

Figure 25:
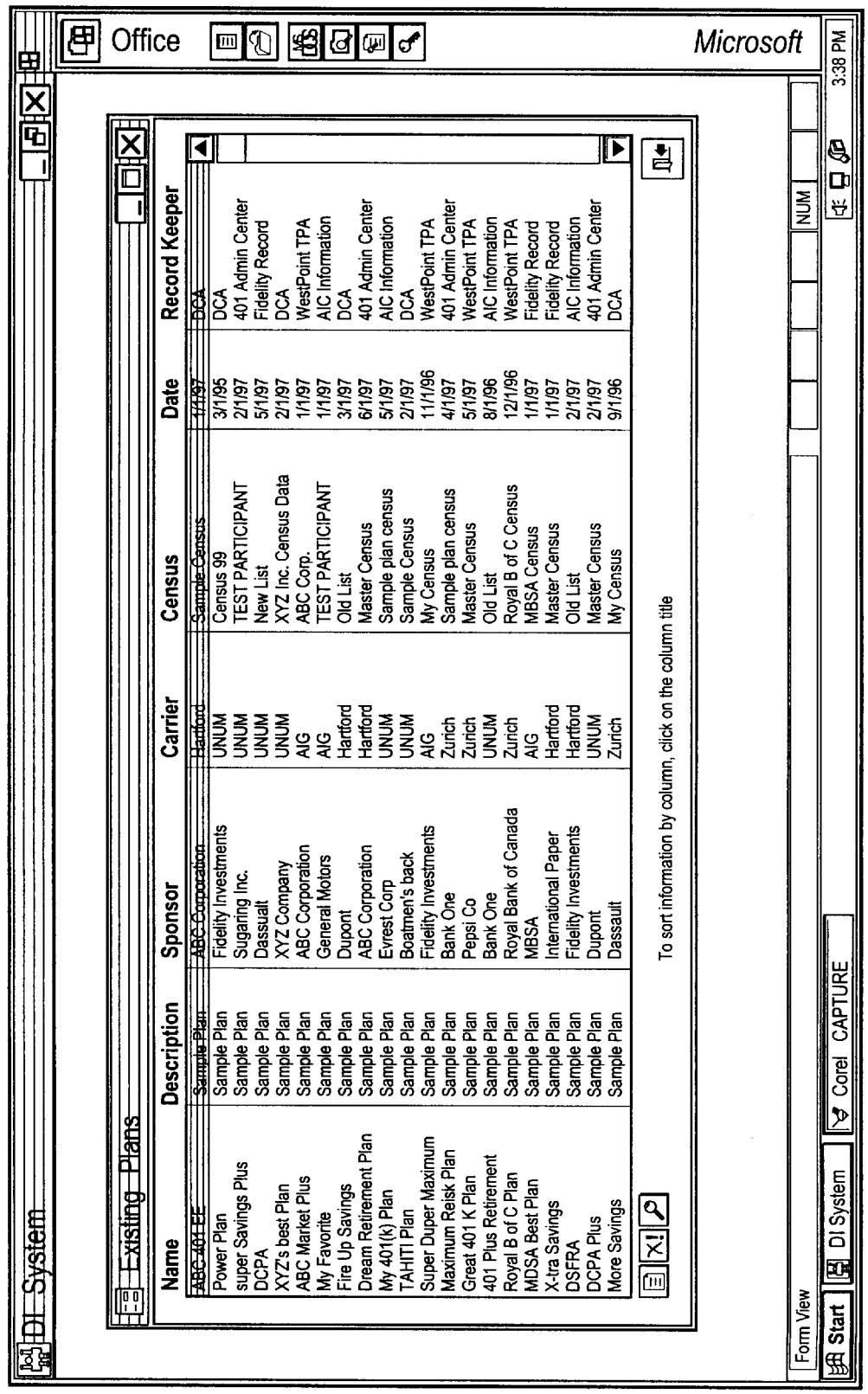
FIG. 25 is a representation of a screen produced on a visual output device in accordance with the present invention.
Figure 26:
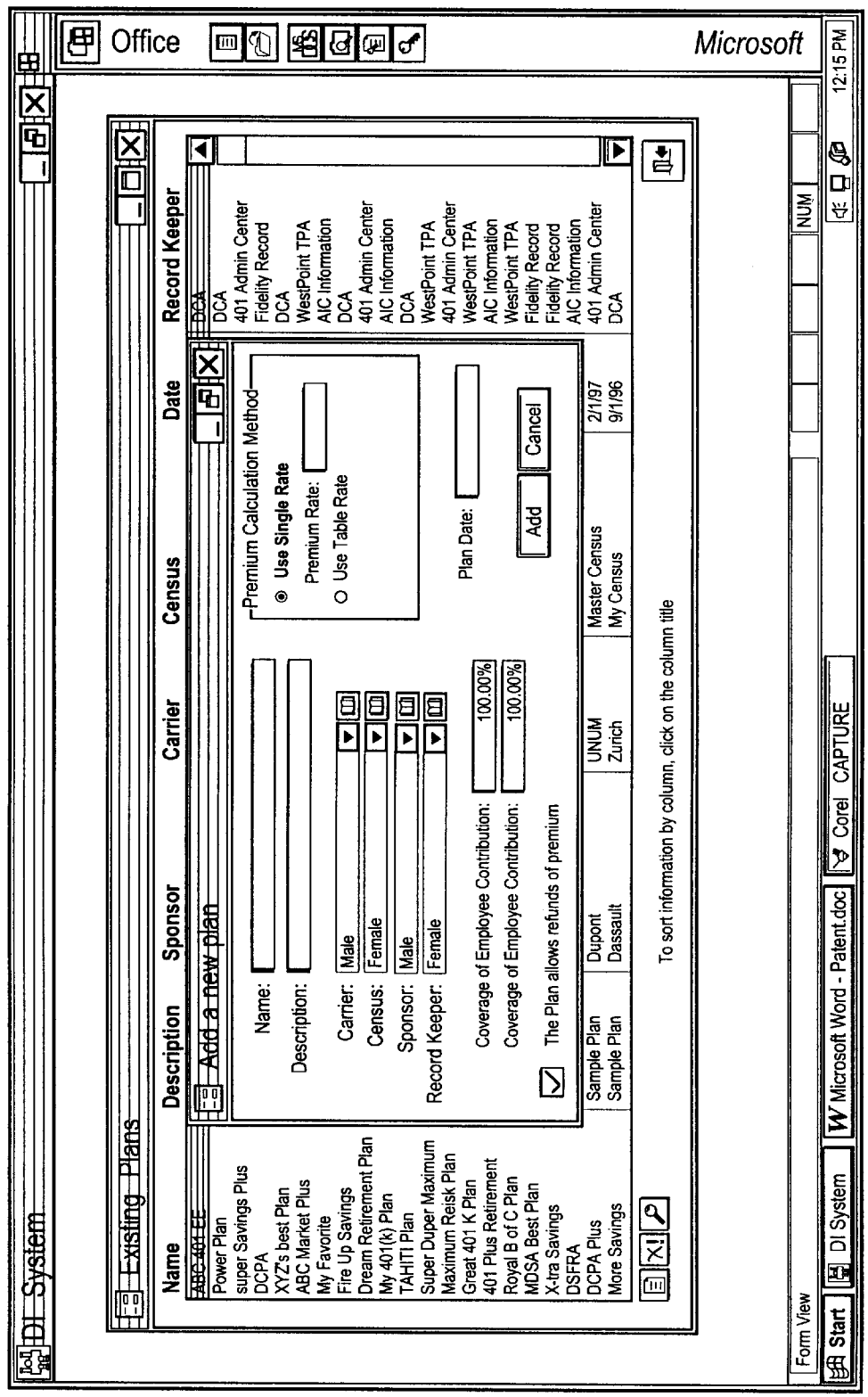
FIG. 26 is a representation of a screen produced on a visual output device in accordance with the present invention.
Figure 28:
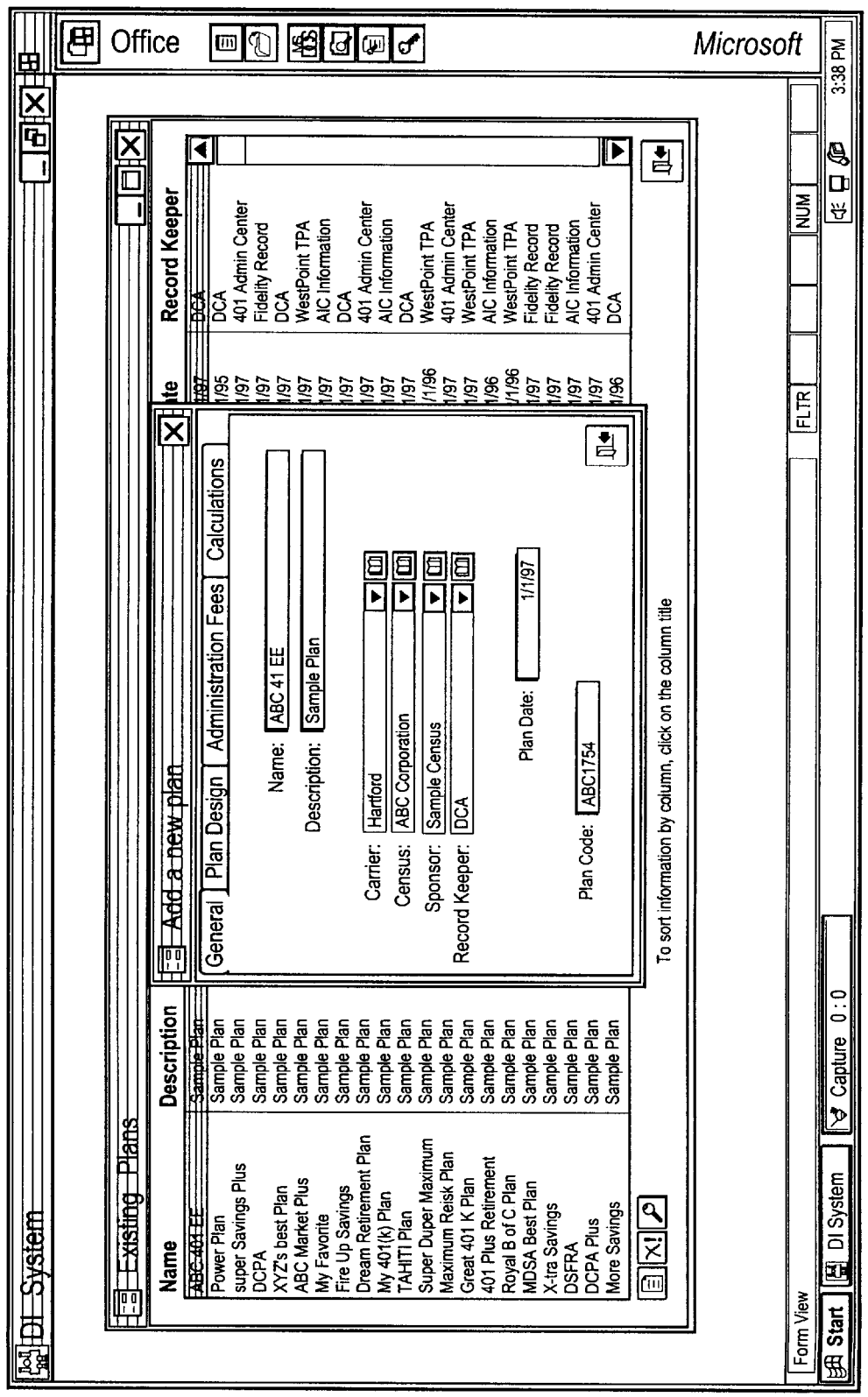
FIG. 28 is a representation of a screen produced on a visual output device in accordance with the present invention.

The user can then dick on the ADD button and the new PLAN is automatically added to PLANLIST list box on the PLAN LIST Screen in FIG. 25. The user double clicks on the newly created PLAN to open up the PLAN EDIT Screen in FIG. 28.

Figure 29:
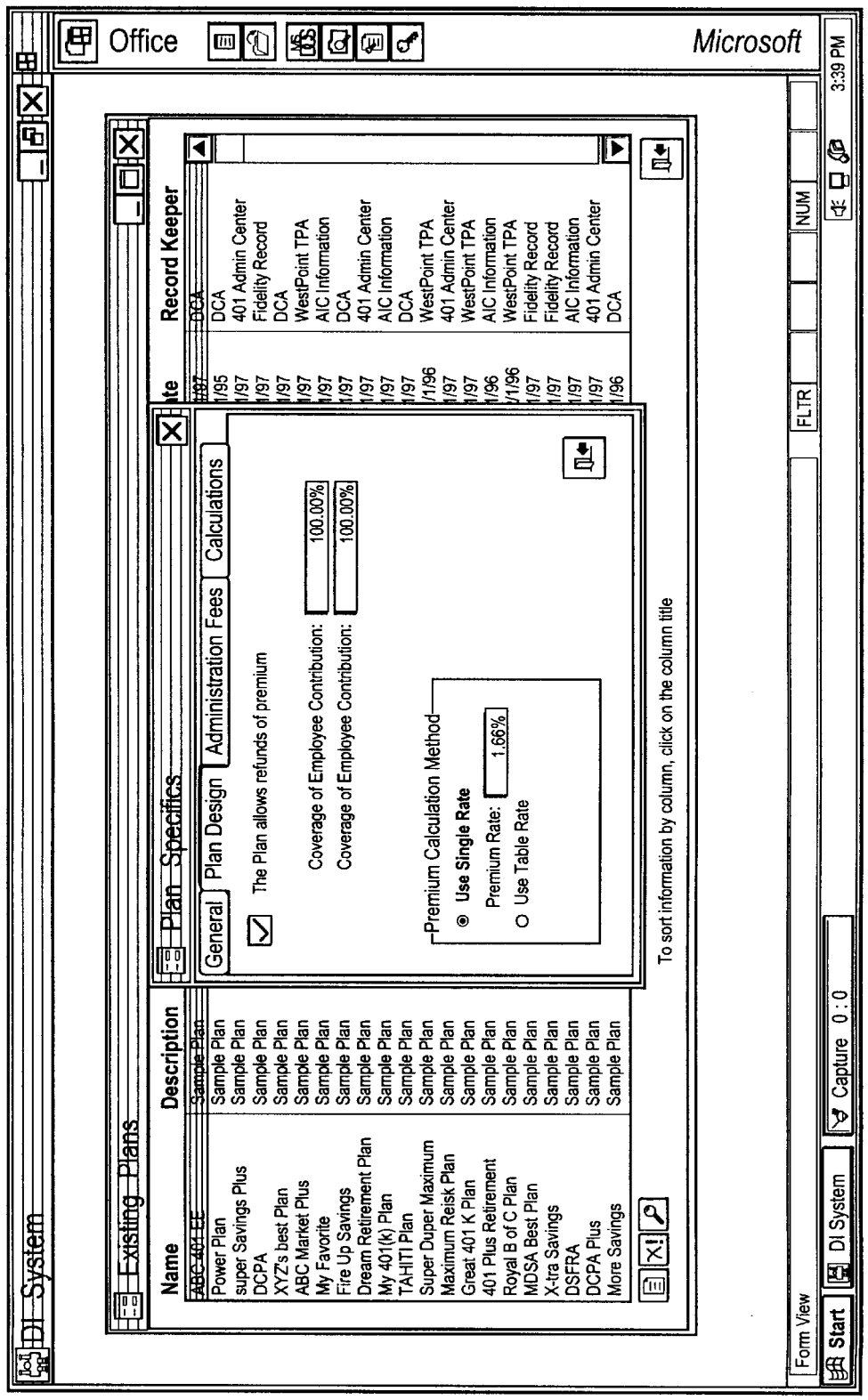
FIG. 29 is a representation of a screen produced on a visual output device in accordance with the present invention.
Figure 30:
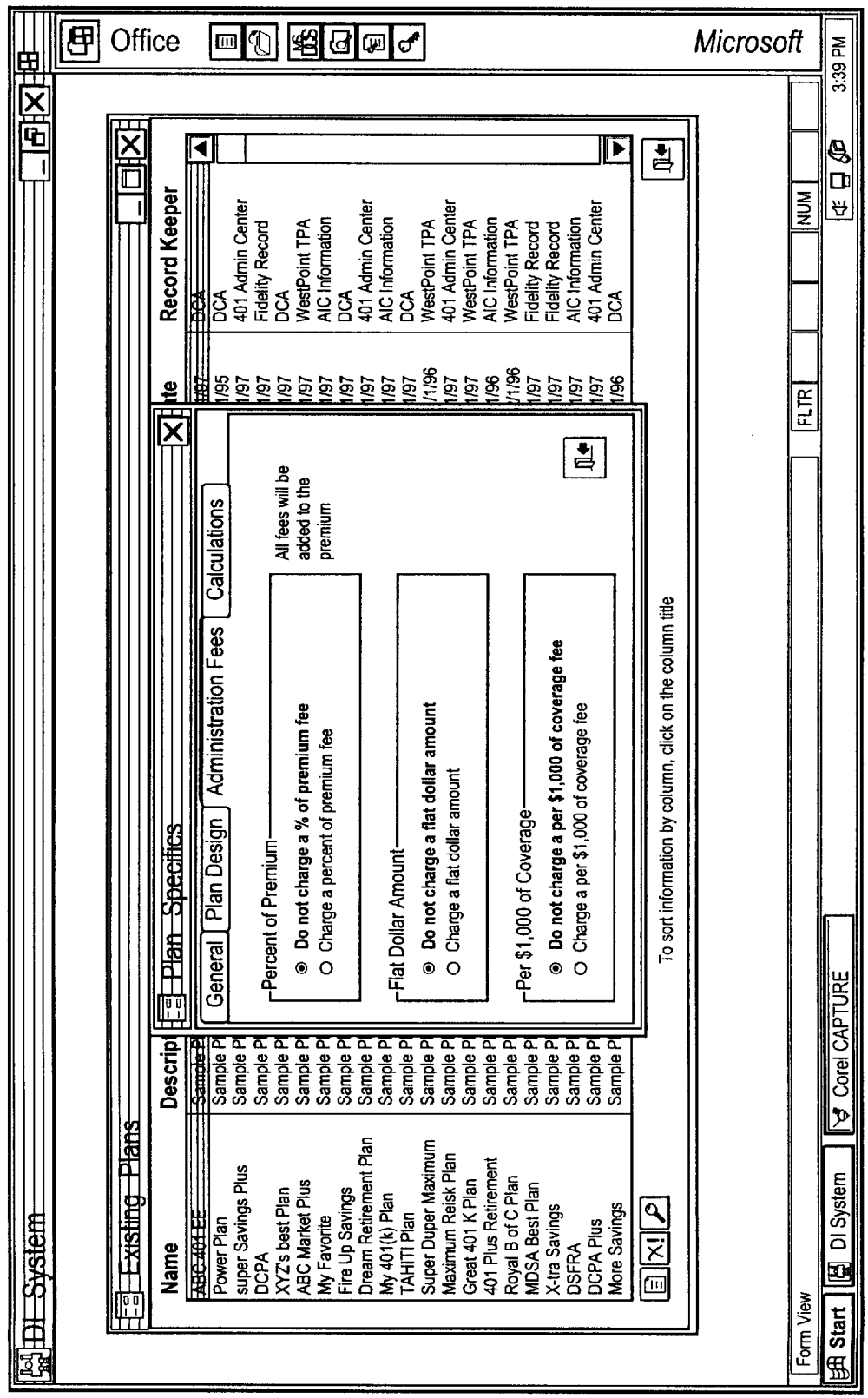
FIG. 30 is a representation of a screen produced on a visual output device in accordance with the present invention.

The PLAN EDIT screen contains 4 tabs. A first tab is the general tab, which contains all standard information about the plan including name, description, carrier, sponsor, census, record keeper, plan issue date and plan code. The second tab is the plan design tab (Screen in FIG. 29), which contains all plan design information including whether the plan allows for refunds of premium, the percentage of coverage of employee and employer contribution and the premium calculation method. The third tab is the administration fees tab (Screen in FIG. 30), which contains formulas to gross up the premium by an amount equal to the administration fee.

As to this third tab, there are 3 possible formula to create and administration fee: (1) charge a percent of premium fee where the administration fee is calculated as a percentage of premium; (2) charge a flat dollar amount; and (3) charge a per 1000 of coverage fee where the administration fee is calculated as a dollar amount for each $1,000 dollar of coverage.

The fourth tab is the calculations tab (Screen in FIG. 31), which provides three types of computing. The first type of computing is for updating the coverage for all insureds. The user clicks on the UPDATE command button and the System 1 calculates coverage amounts for all insureds. The System 1 loops through each insured and multiplies the coverage of employee contribution percentage by the 401(k) employee contribution amount and stores the result in the employee coverage amount field. While looping through each insured the System 1 also multiplies the coverage of employer contribution percentage by the 401(k) employer contribution amount and stores the result in the employer coverage amount field.

The second type of computing is for calculating the disability premiums. To calculate the disability premiums, the user clicks on the CALCULATE command button in the DISABILITY PREMIUMS frame. The System 1 will calculate two base premiums based on the newly calculated employee and employer coverage amount. The System 1 takes the rate provided in the plan design tab (Screen in FIG. 29) and multiplies it by the coverage amount for both the employee coverage amount and employer coverage; amount Once the base premiums are calculated the System 1 calculates the administration fee based on the chosen method of calculating the administration fee in the administration fee tab (Screen in FIG. 30) and adds the fee to the base premium to store the final disability premium for both the employee coverage amount and the employer coverage amount.

The third type of computing is for calculating unearned premiums. To calculate unearned premiums for all insureds, the user dicks on the CALCULATE button in the UNEARNED PREMIUMS frame. The System 1 will calculate the number of days between the last plan anniversary date and divide that number by 365 to obtain the unearned ratio. The unearned ratio is multiplied by the employee annual premium and the employer annual premium to obtain the employee unearned premium and the employer unearned premium.

Figure 31:
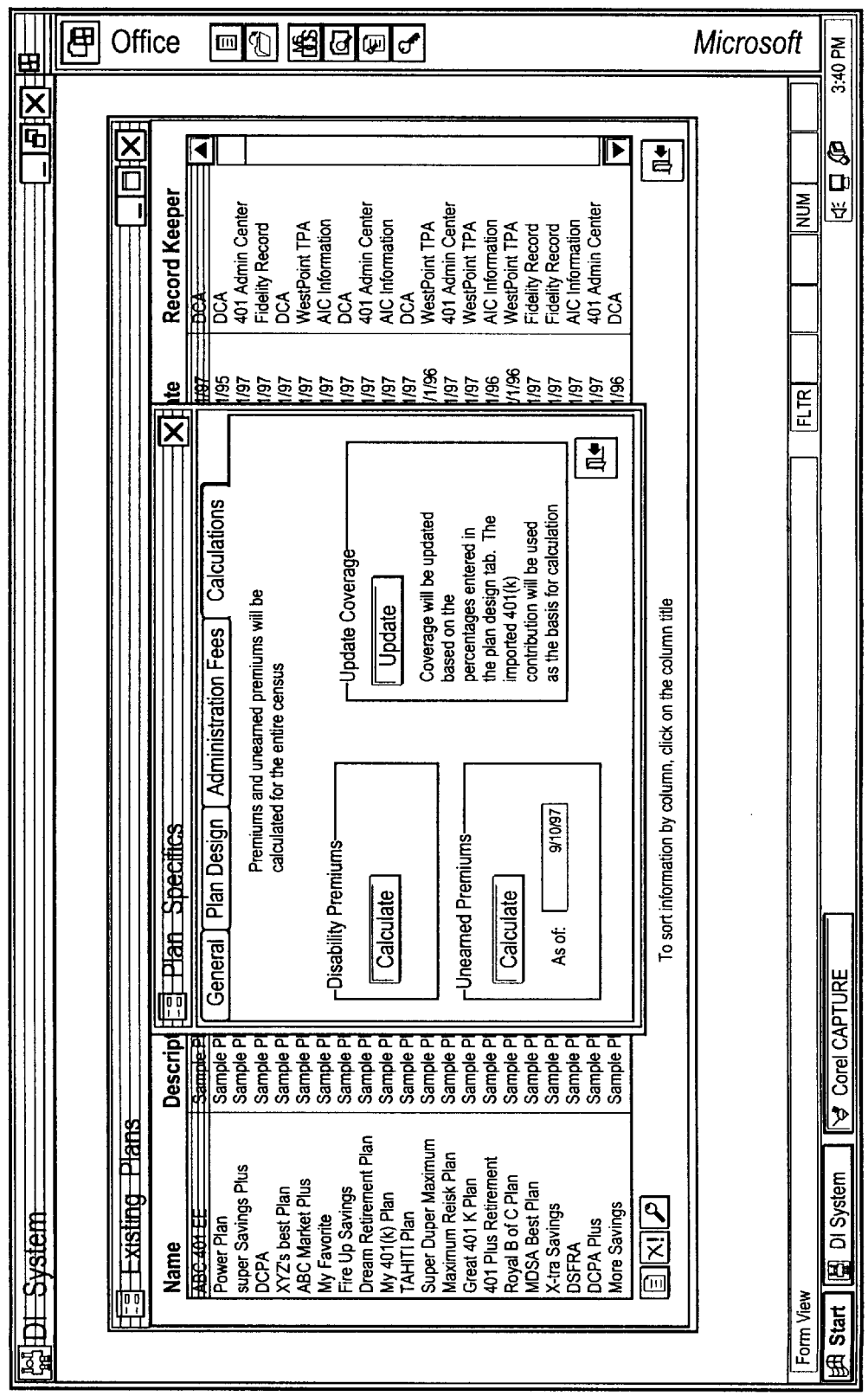
FIG. 31 is a representation of a screen produced on a visual output device in accordance with the present invention.

Now that the user has calculated the coverage amounts, the disability premium amounts and the unearned premium amounts, the user exits the PLAN EDIT Screen in FIG. 31 by clicking on the EXIT command button and returns to the PLAN LIST Screen in FIG. 25. The user exits the PLAN LIST screen by clicking on the EXIT command button and returns to the MAIN MENU Screen in FIG. 3.

The user next verifies newly calculated information for all insureds. Once premiums has been calculated, the user can check the premiums by printing reports or by editing insured's information. From the MAIN MENU Screen in FIG. 7, the user clicks on the LIBRARIES command button to open up the LIBRARIES Screen in FIG. 4. The user double clicks on the CENSUS Library and brings up the CENSUS LIST Screen in FIG. 16.

Figure 19:
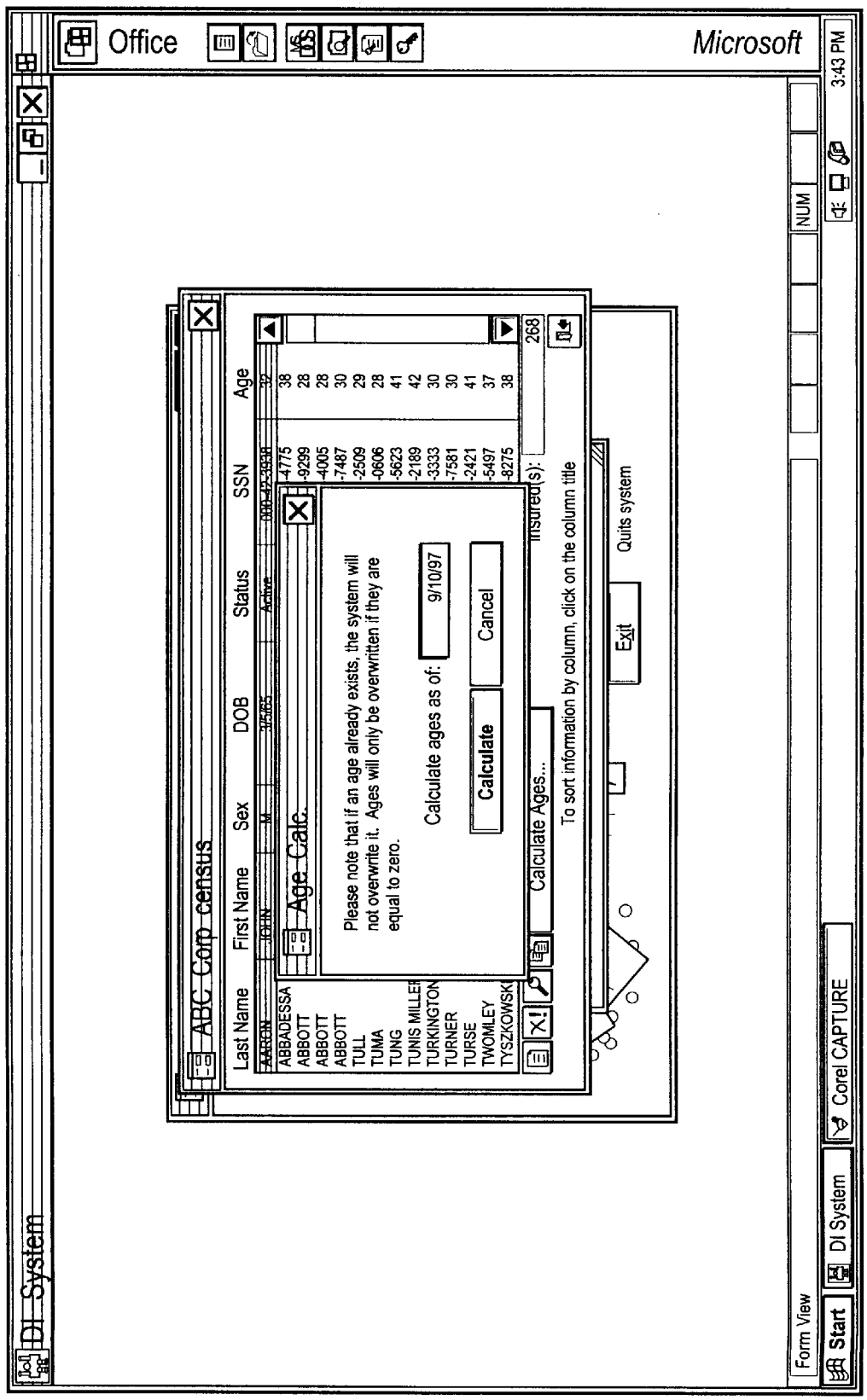
FIG. 19 is a representation of a screen produced on a visual output device in accordance with the present invention.

The user double dicks on the census that belongs to the plan he/she just created to open up the CENSUS EDIT Screen in FIG. 17. The use clicks on INSUREDS to access the INSURED LIST Screen in FIG. 18. To add a new insured by hand, The user clicks on the command button with the blank page icon and new screen opens up where the user enters a name for the new insured. The user then click on ADD button and the new insured is automatically added to the INSURED list box on the INSURED LIST Screen in FIG. 19.

Figure 32:
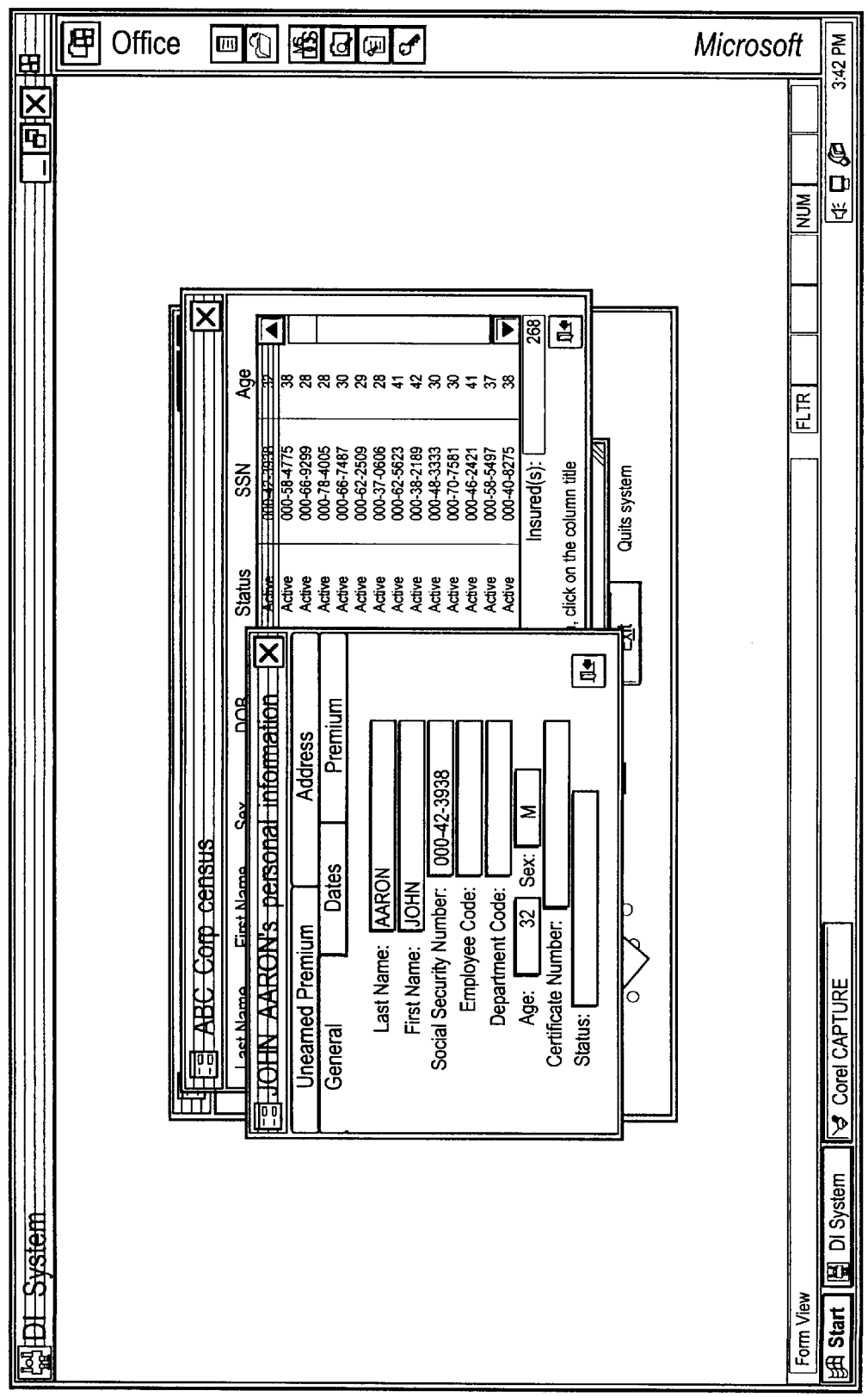
FIG. 32 is a representation of a screen produced on a visual output device in accordance with the present invention.

The user double dicks on any insured to open up the INSURED EDIT Screen in FIG. 32 and edits information about the selected insured. The INSURED EDIT Screen in FIG. 32 has 5 tabs:

The first tab is the GENERAL tab (Screen in FIG. 32), which contains standard information about the insured including last name, first name, social security number, employee code, department code, age, sex, certificate number and status.

Figure 33:
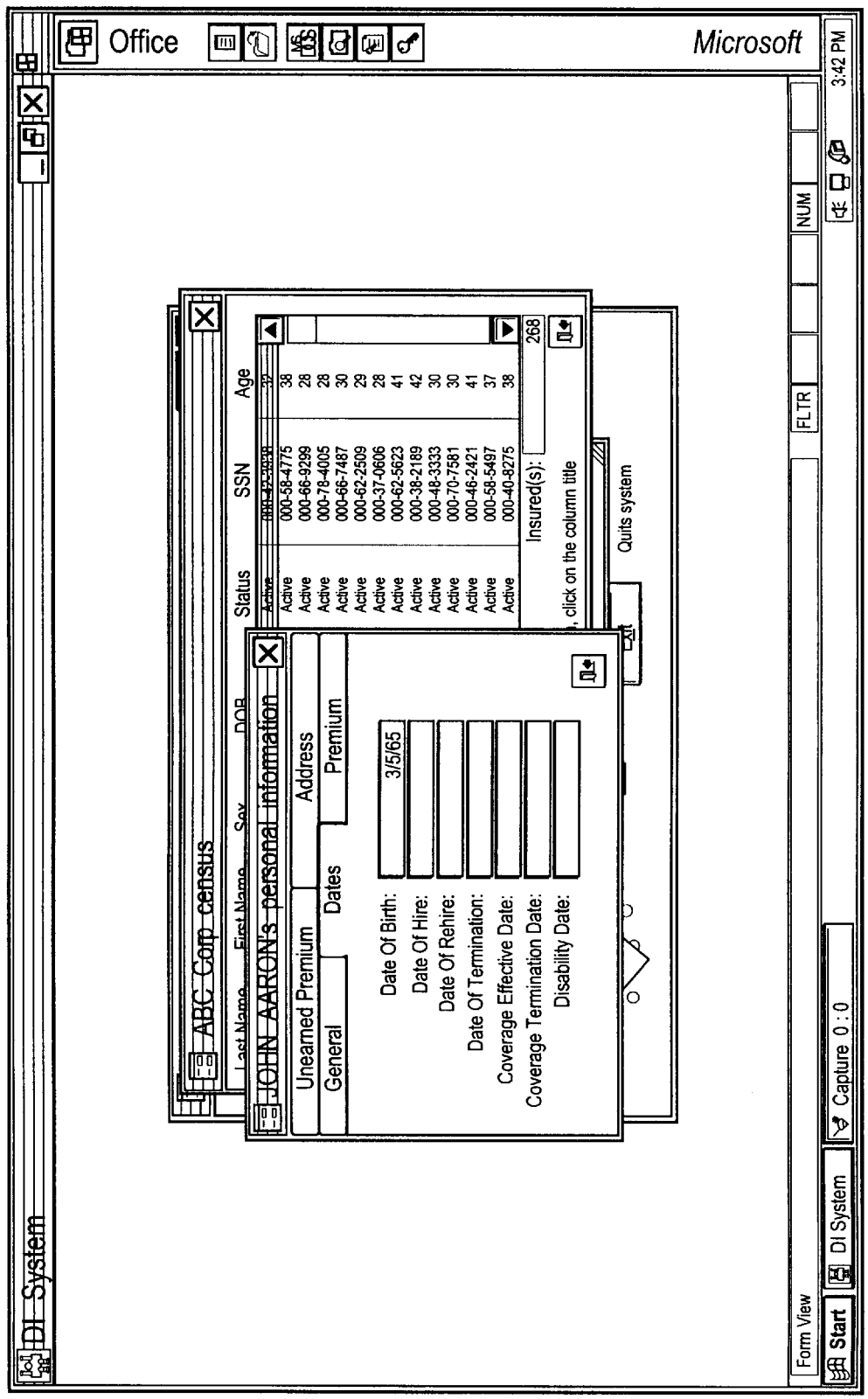
FIG. 33 is a representation of a screen produced on a visual output device in accordance with the present invention.

The second tab is the DATES tab (Screen in FIG. 33) contains all relevant dates to the status field of the insured. These dates include date of birth, date of hire, date of rehire, date of termination, coverage effective date, coverage termination date and disability date.

Figure 34:
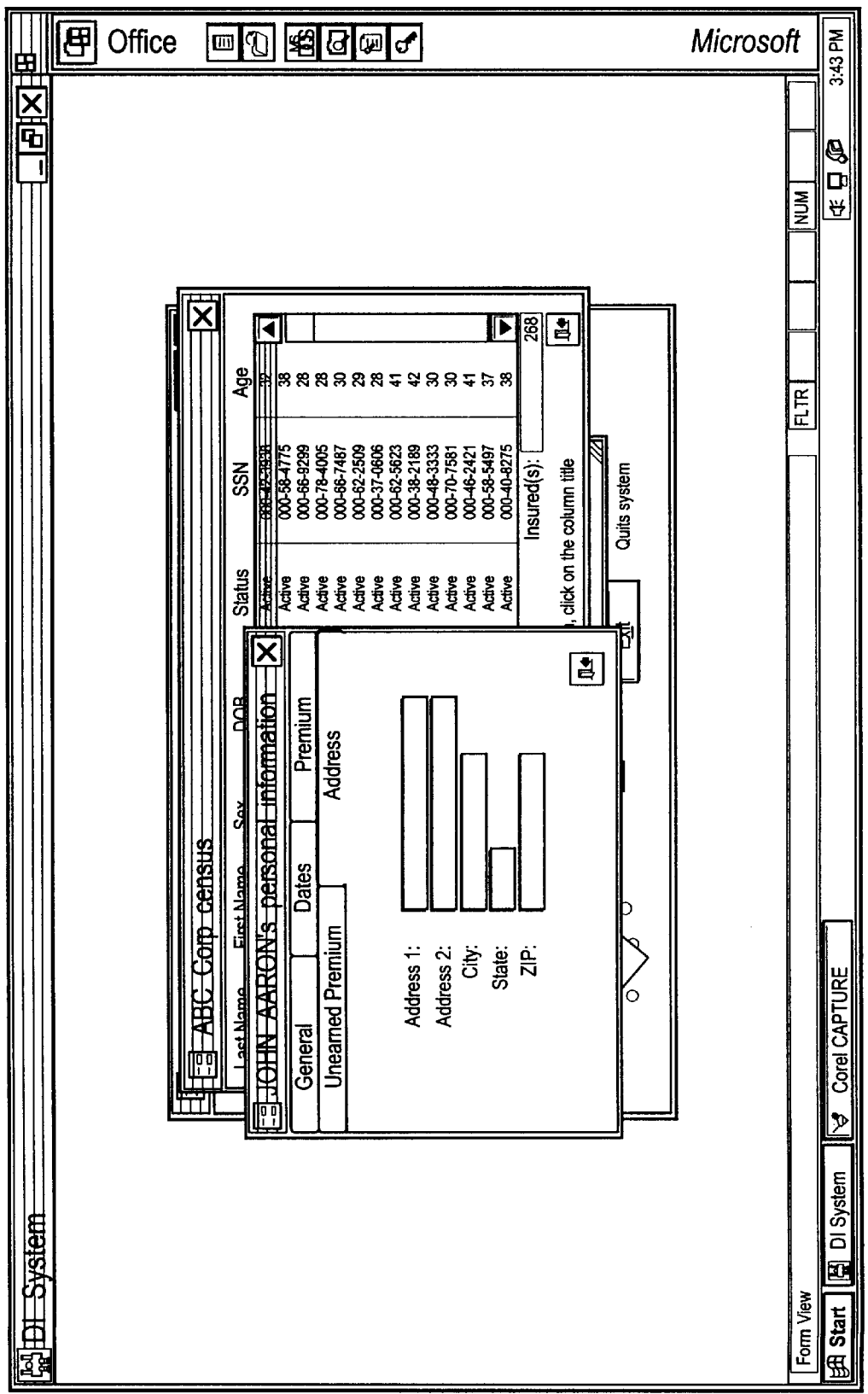
FIG. 34 is a representation of a screen produced on a visual output device in accordance with the present invention.

The third tab is the ADDRESS tab (Screen in FIG. 34), which contains address information including street address, city, state and ZIP.

Figure 35:
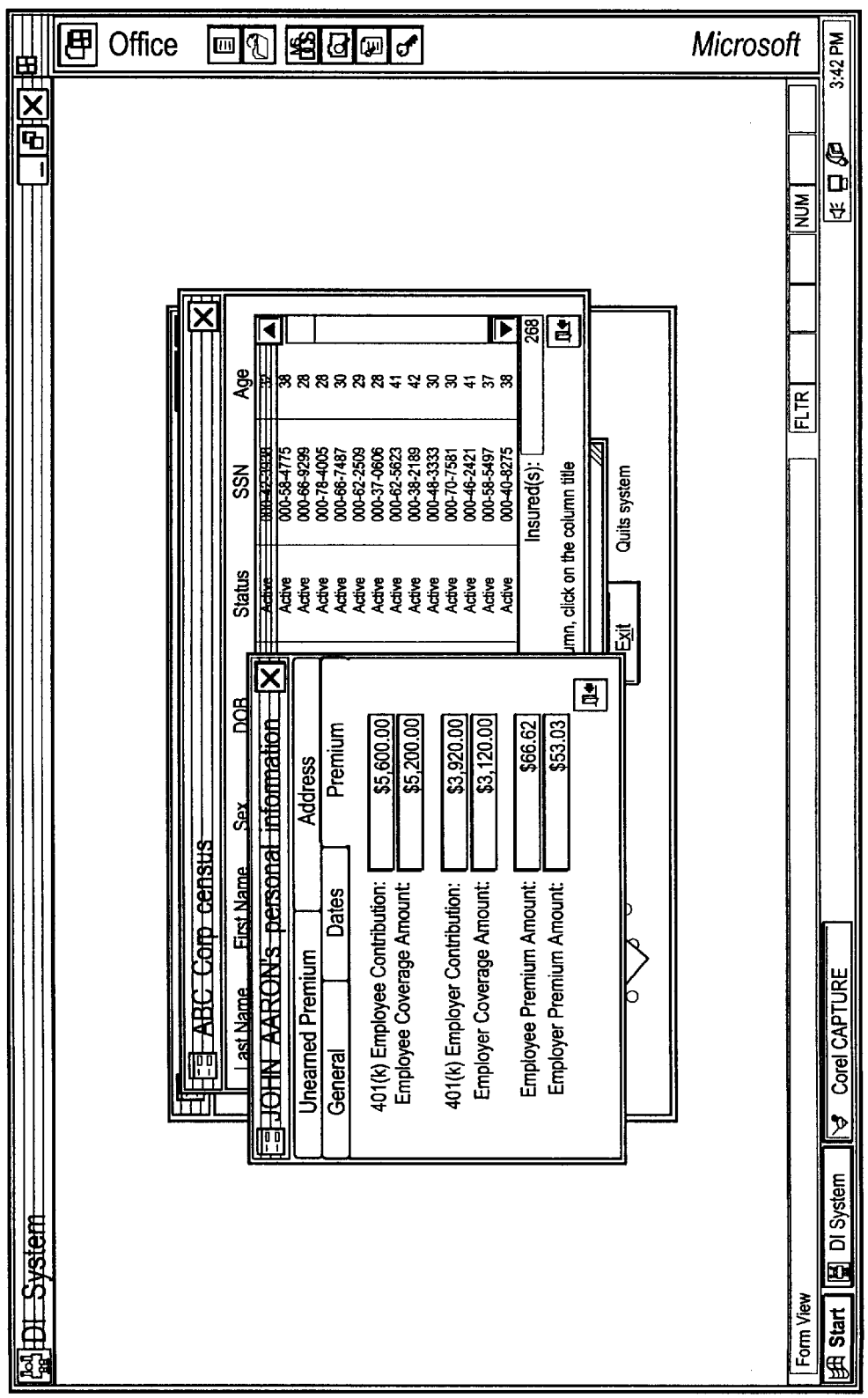
FIG. 35 is a representation of a screen produced on a visual output device in accordance with the present invention.

The fourth tab is the PREMIUM tab (Screen in FIG. 35), which contains the original employee and employer 401(k) contribution, the employee and employer coverage amounts just calculated and reflecting the plan design coverage ratios and the employee and employer premium amounts that were just calculated.

Figure 36:
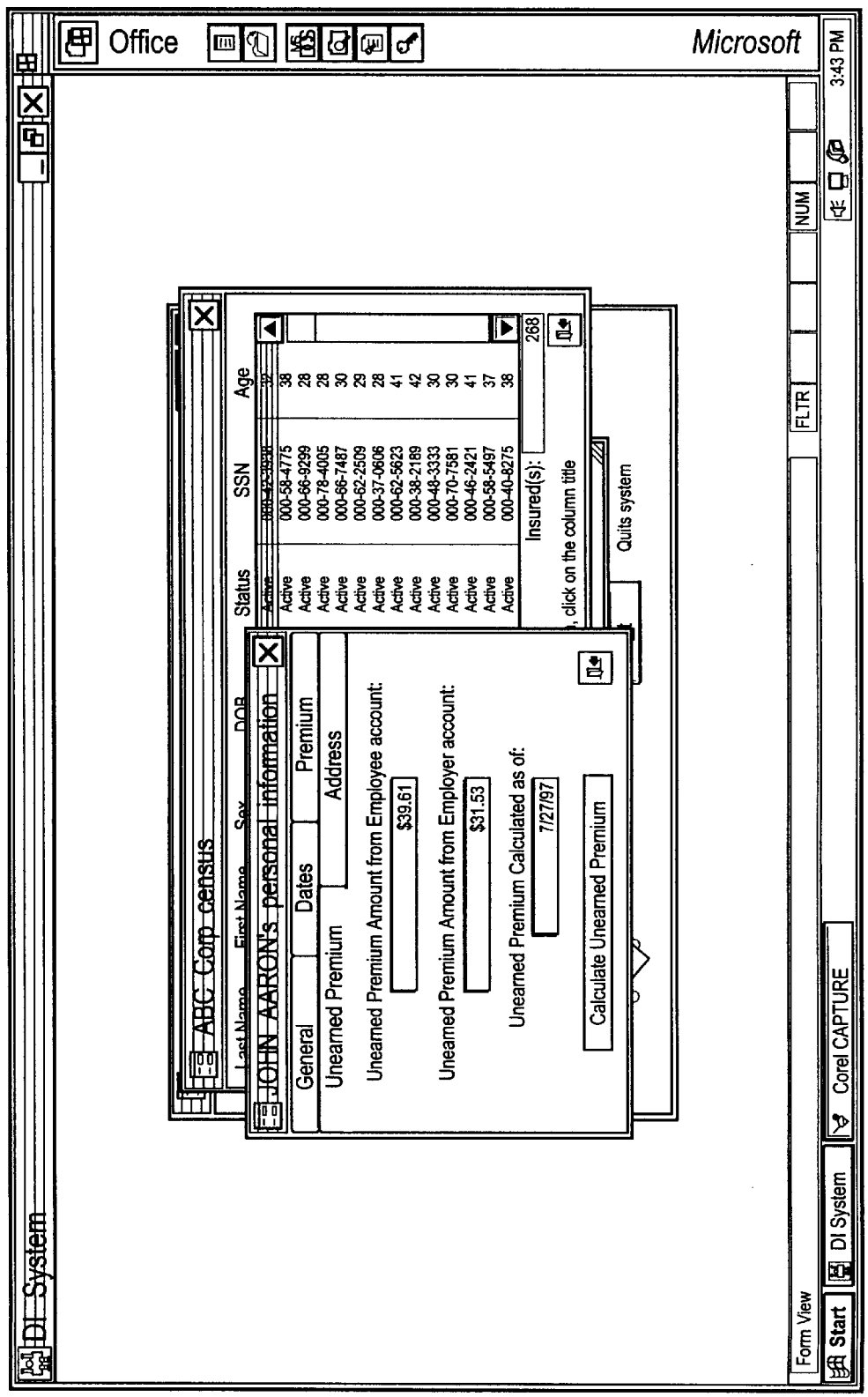
FIG. 36 is a representation of a screen produced on a visual output device in accordance with the present invention.

The fifth tab is the UNEARNED PREMIUM tab (Screen in FIG. 36), which contains the employee unearned premium amount, the employer unearned premium amount and the date as of which the unearned premium was calculated. The user can calculate unearned premiums for a specific insured by clicking on the CALCULATE UNEARNED PREMIUM command button.

The user exits the INSURED EDIT Screen in FIG. 32 by clicking on the EXIT command button and returns to the INSURED LIST Screen in FIG. 18. The user exits the INSURED LIST screen by clicking on the EXIT command button and returns to the CENSUS EDIT Screen in FIG. 17. The user exits the CENSUS EDIT screen by clicking on the EXIT command button and returns to the CENSUS LIST Screen in FIG. 16. The user exits the CENSUS LIST Screen in Figure by clicking on the EXIT command button and returns to the LIBRARIES Screen in FIG. 4. The user exits the LIBRARIES screen by clicking on the EXIT command button and returns to the MAIN MENU Screen in FIG. 3.

Figure 37:
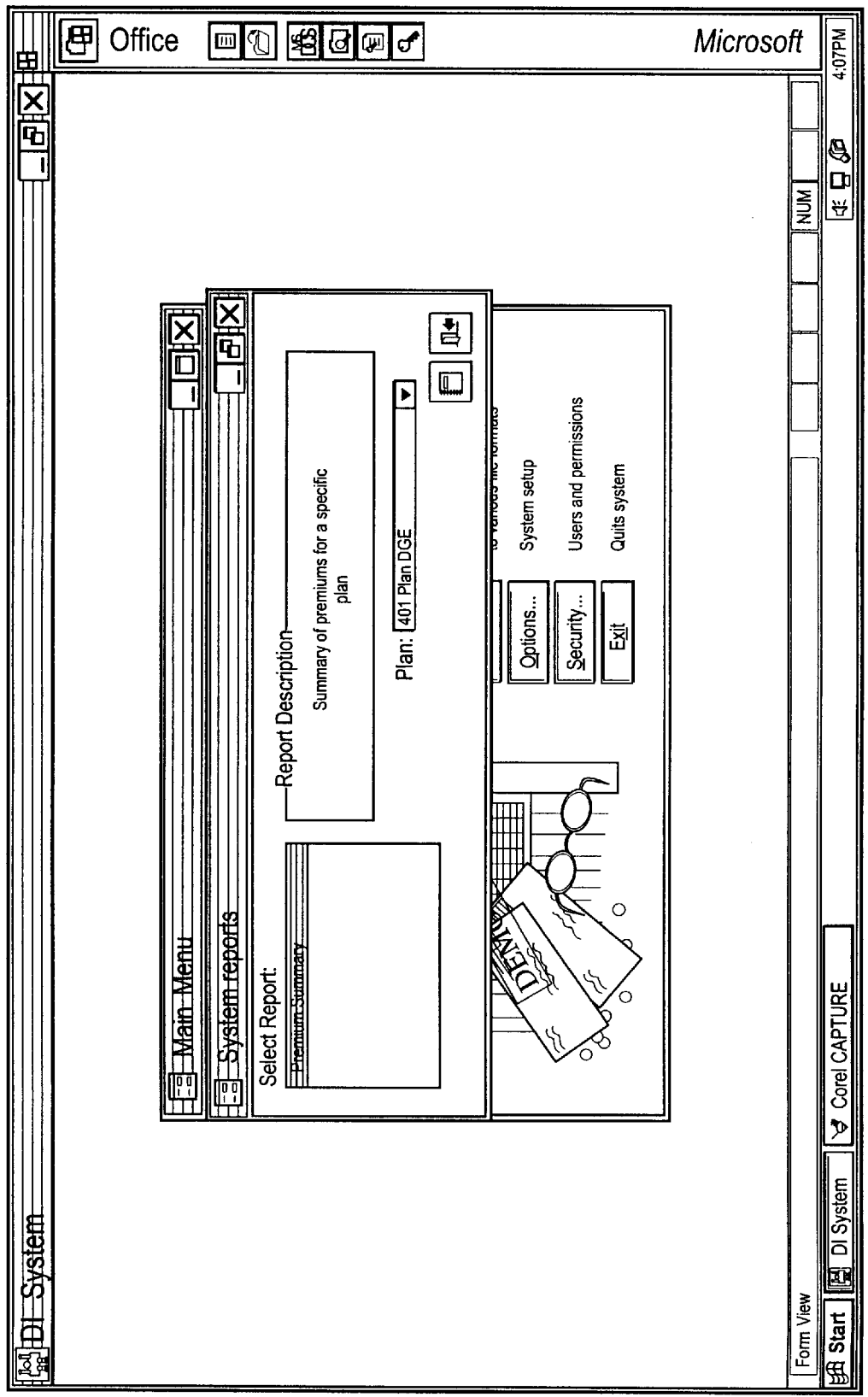
FIG. 37 is a representation of a screen produced on a visual output device in accordance with the present invention.

The user can then prepares reports and prints reports or creates print files. The System 1 can print custom designed reports for record keepers carriers and plan sponsors. The user clicks on the REPORTS command button to open up the REPORT Screen in FIG. 37. The user selects the report he/she wants to print in the SELECT REPORT list box and then selects which plan he/she wants the report based on in the PLAN pull down combo box. The user clicks on the REPORT command button (with a report icon) and the report is automatically sent to the Screen in FIG. 38. The user can then print to the printer, fax, or print the report to file to be e-mailed. The user exits the REPORT screen by clicking on the EXIT command button and returns to the MAIN MENU Screen in FIG. 3.

Additionally, the user can export data to external systems. This is one of the most critical features of the System 1. The System 1 can export data from its database to external systems. By creating custom exports, data can be very easily extracted from the System 1 and fed to external systems and report designers. The user has total control over the creation of the import: the user can export data in multiple available file formats, control the layout of the export (sequence of fields) and query the database for what data to extract.

Figure 39:
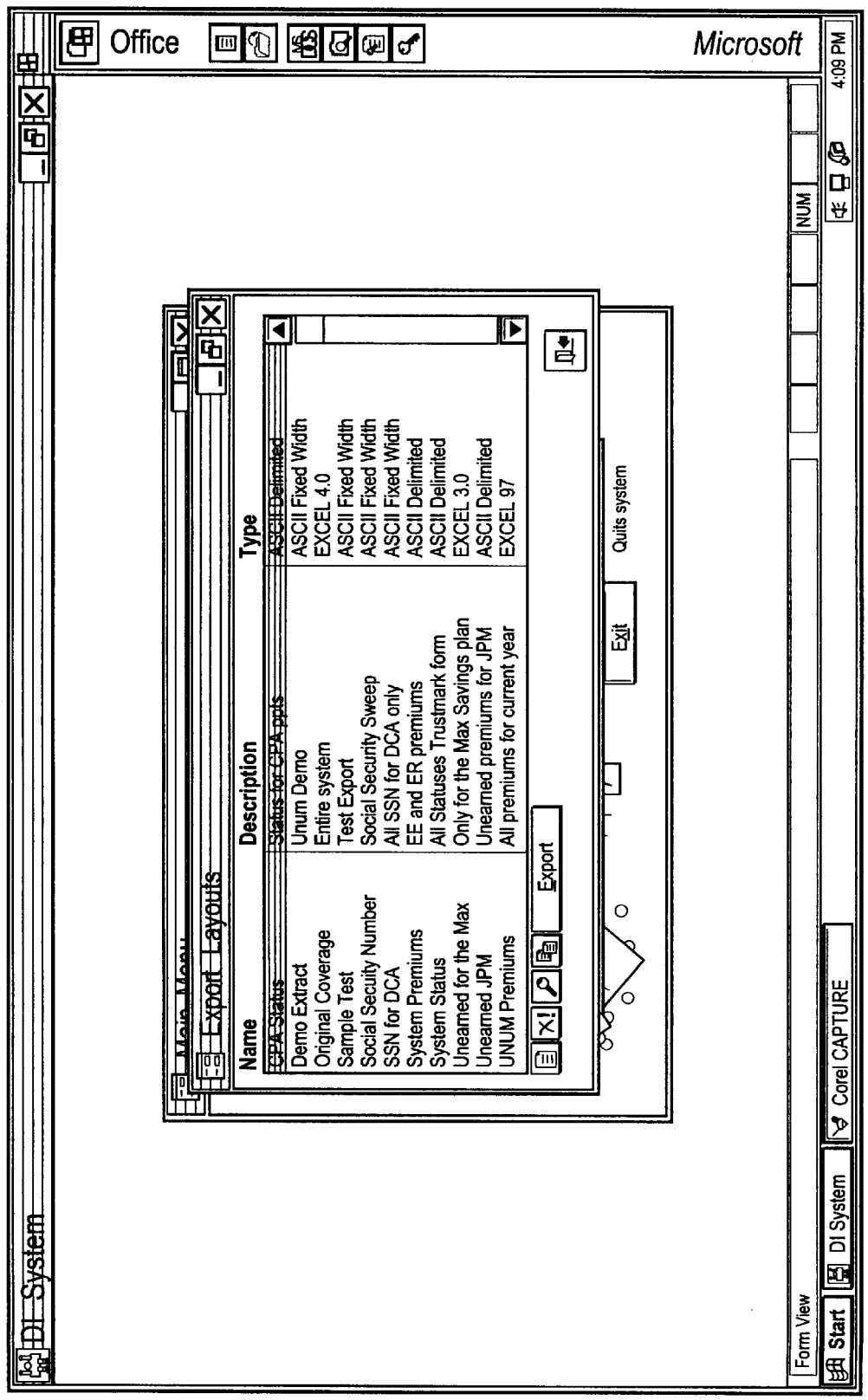
FIG. 39 is a representation of a screen produced on a visual output device in accordance with the present invention.
Figure 40:
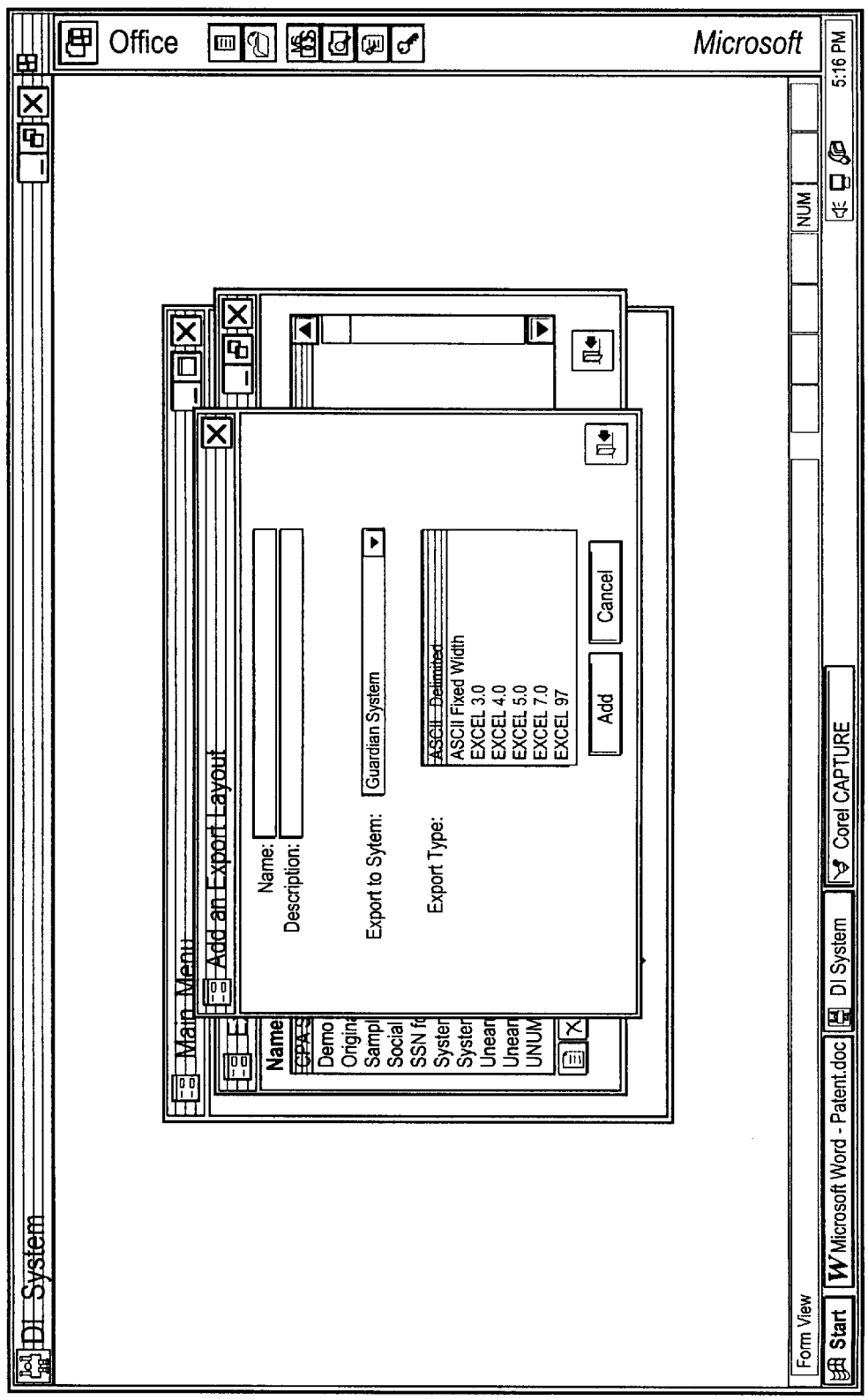
FIG. 40 is a representation of a screen produced on a visual output device in accordance with the present invention.

The insured dicks on the EXPORT command button to open up the EXPORT LIST Screen in FIG. 39. All exports are listed on this screen. The user adds a new EXPORT by clicking on the command button with the blank page icon and the ADD EXPORT Screen in FIG. 40 opens up. The user enters the following information to create a new export:

Export name

Export description

The name of the external system to which this export is directed.

The reason why the user has to specify the name of the external system is because of the conversion tables. For example the user may want to export the field SEX to an external system that only understands <0> for males and <1> for females. The System 1 is designed to make that conversion automatically on behalf of the external system.

Figure 41:
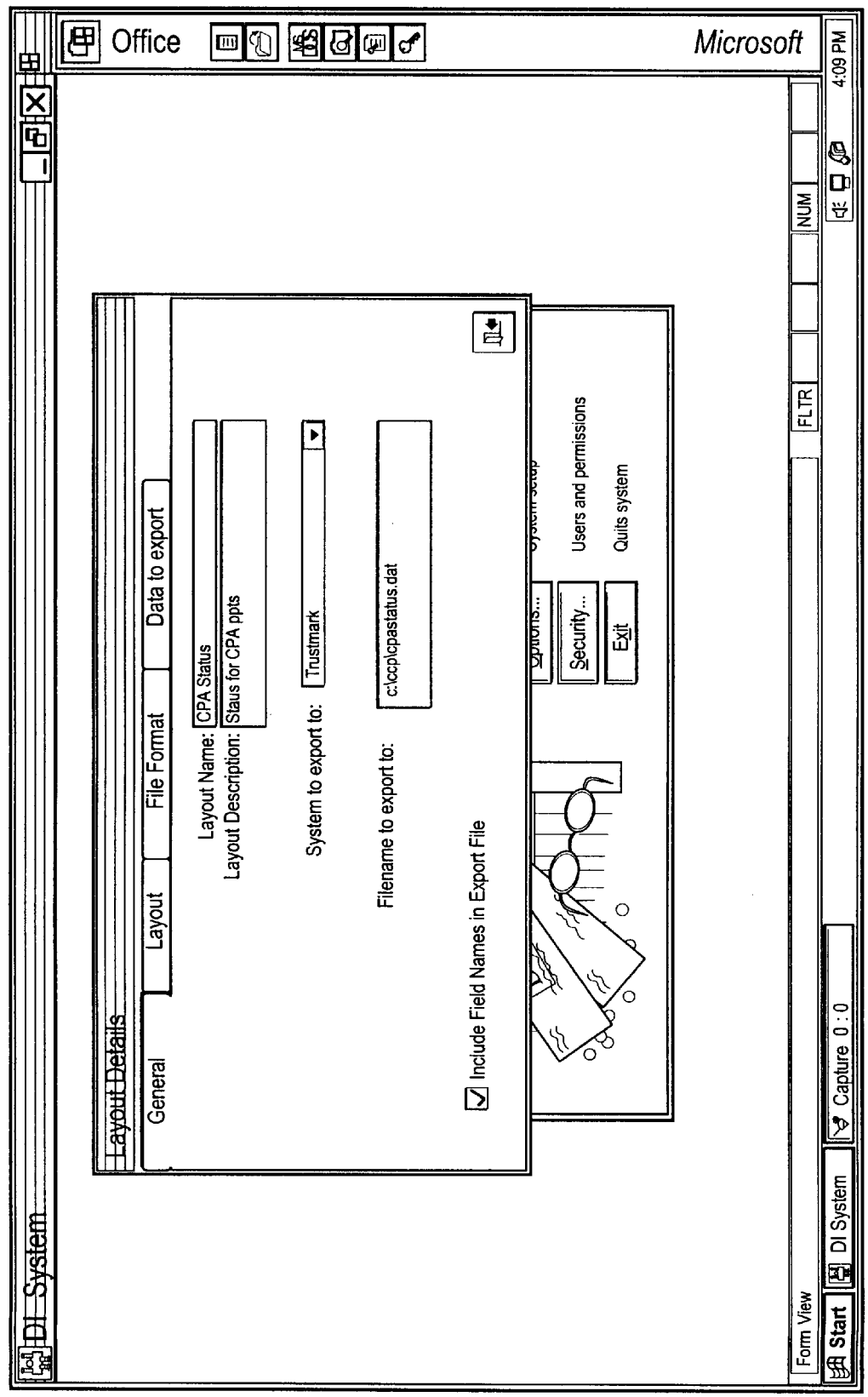
FIG. 41 is a representation of a screen produced on a visual output device in accordance with the present invention.

The export type which can be of the following types:
ASCII delimited
ASCII fixed width
EXCEL 3.0
EXCEL 4.0
EXCEL 5.0
EXCEL 7.0
EXCEL 97
LOTUS files The user then clicks on the ADD button and the new EXPORT is automatically added to EXPORT LIST list box on the EXPORT LIST Screen in FIG. 39. The user double clicks on the newly created EXPORT to open up the EXPORT EDIT Screen in FIG. 41.

The EXPORT EDIT screen contains 4 tabs, the first of which is the General tab (shown in Screen in FIG. 41) that contains the export name, the export description, the name of the external system to export to, the filename used to save the export and the option to save the field names at the top of the export file.

Figure 42:
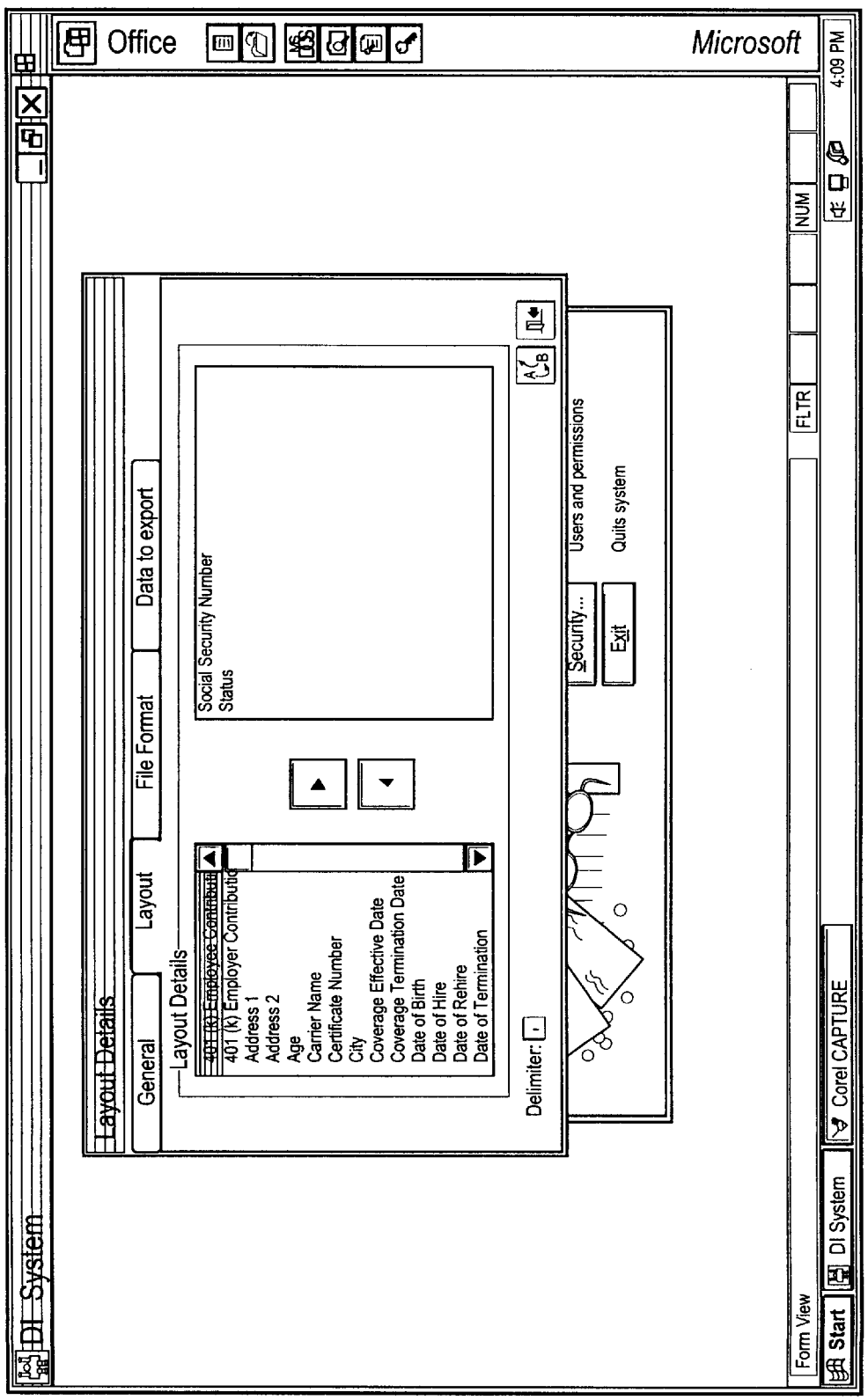
FIG. 42 is a representation of a screen produced on a visual output device in accordance with the present invention.

The second of the tabs is the Layout tab (Screen in FIG. 42) that allows the user to select which fields he/she would like to export and in what order. The user simply selects a field from the field library list box on the left and adds it by clicking on the ADD command button (button with arrow pointing towards right) to the list box on the right that contains the selected fields for export. To remove a field from the selected list box on the right, the user selects the field he/she wants to remove and clicks on the REMOVE command button (button with arrow pointing towards left). The user can virtually export any fields from the insured table in any sequence.

Figure 43:
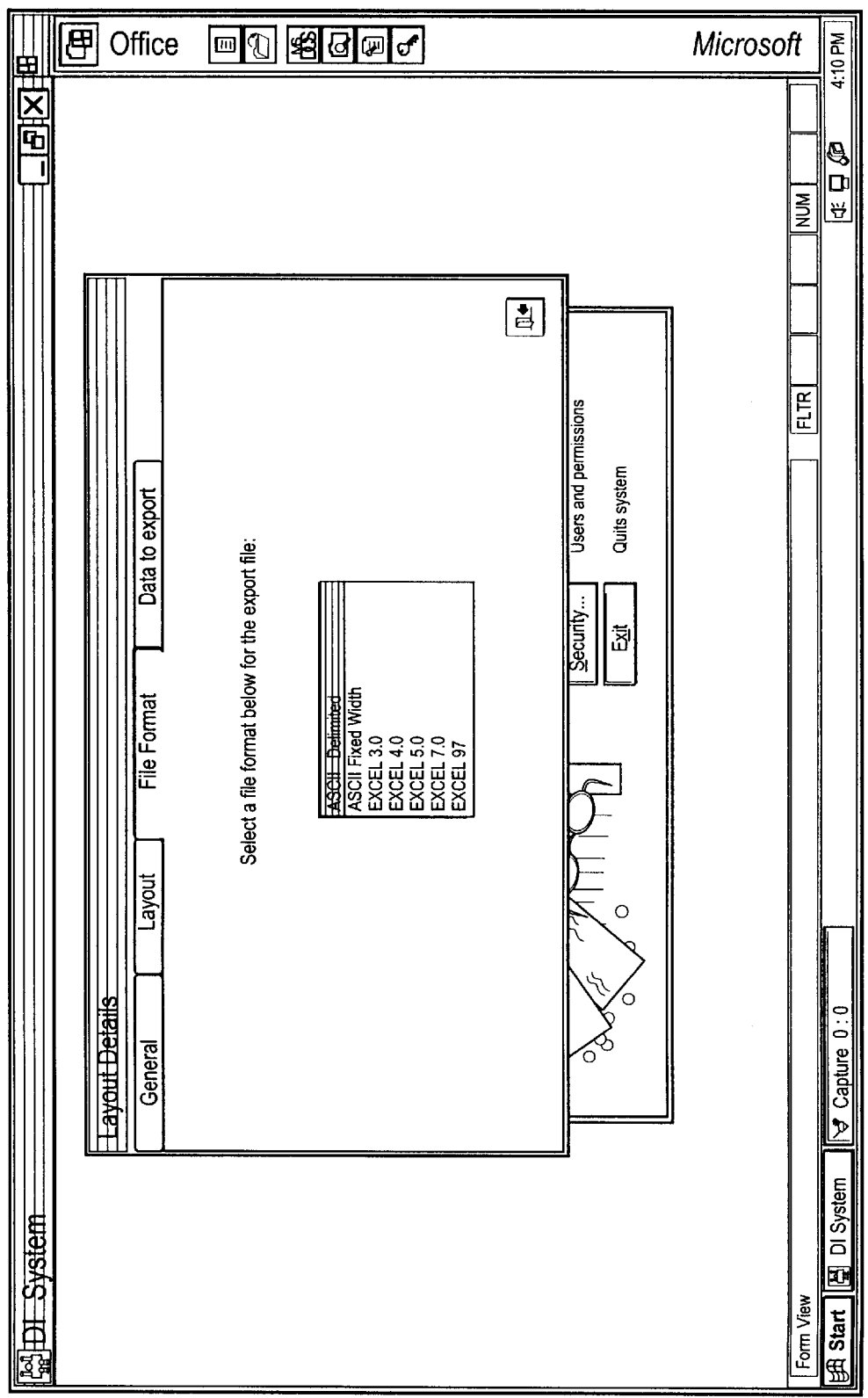
FIG. 43 is a representation of a screen produced on a visual output device in accordance with the present invention.

The third tab is the File Format tab (Screen in FIG. 43), which contains a list of available file formats to save the export file. Please refer to the above list.

The fourth tab is the Data to Export tab (Screen in FIG. 44), which contains the necessary variables to query the database as it relates to the data being exported. The user can select any combination of PLANS, CARRIERS, RECORD KEEPERS and SPONSORS.

Figure 3:
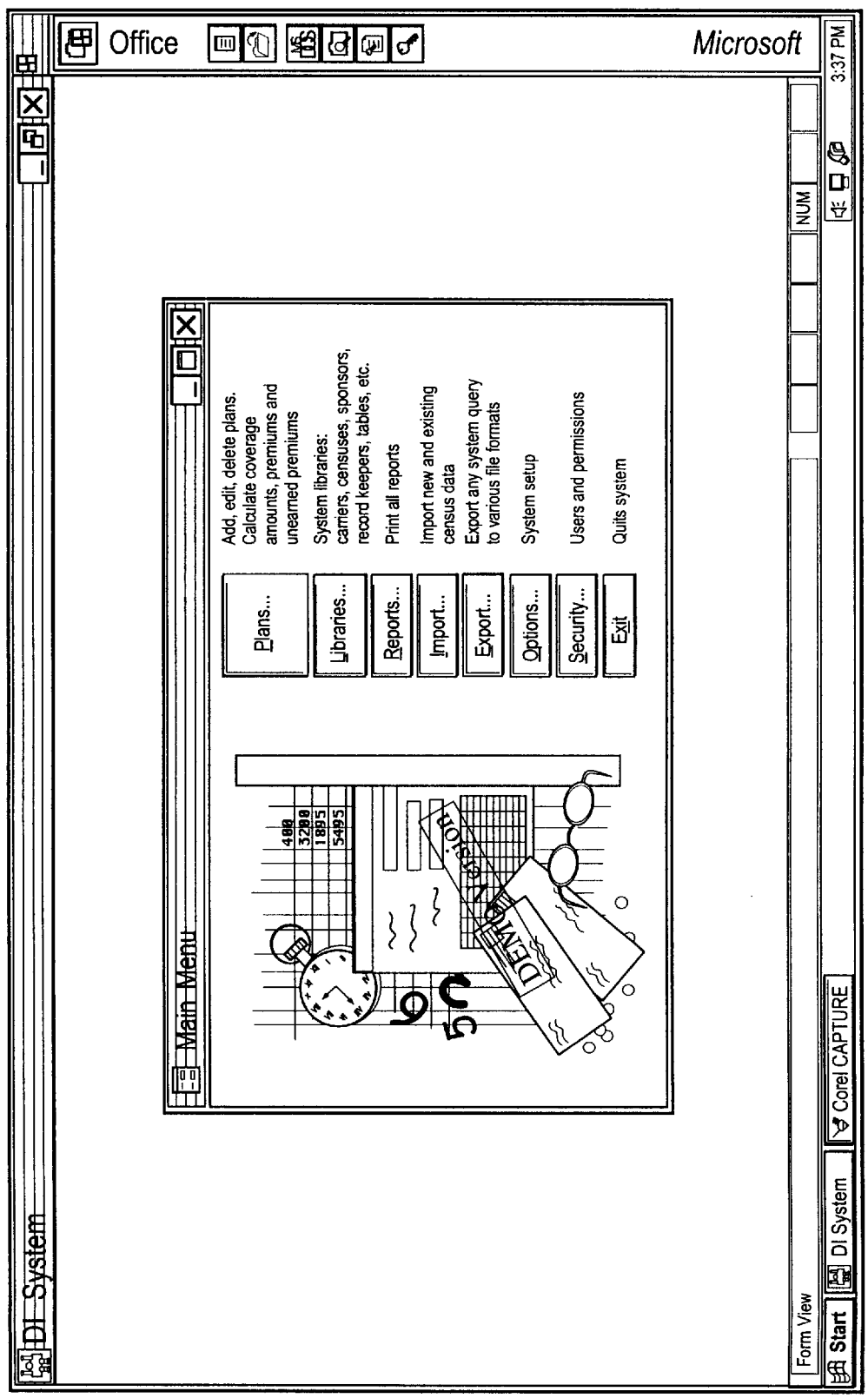
FIG. 3 is a representation of a screen produced on a visual output device in accordance with the present invention.
Figure 44:
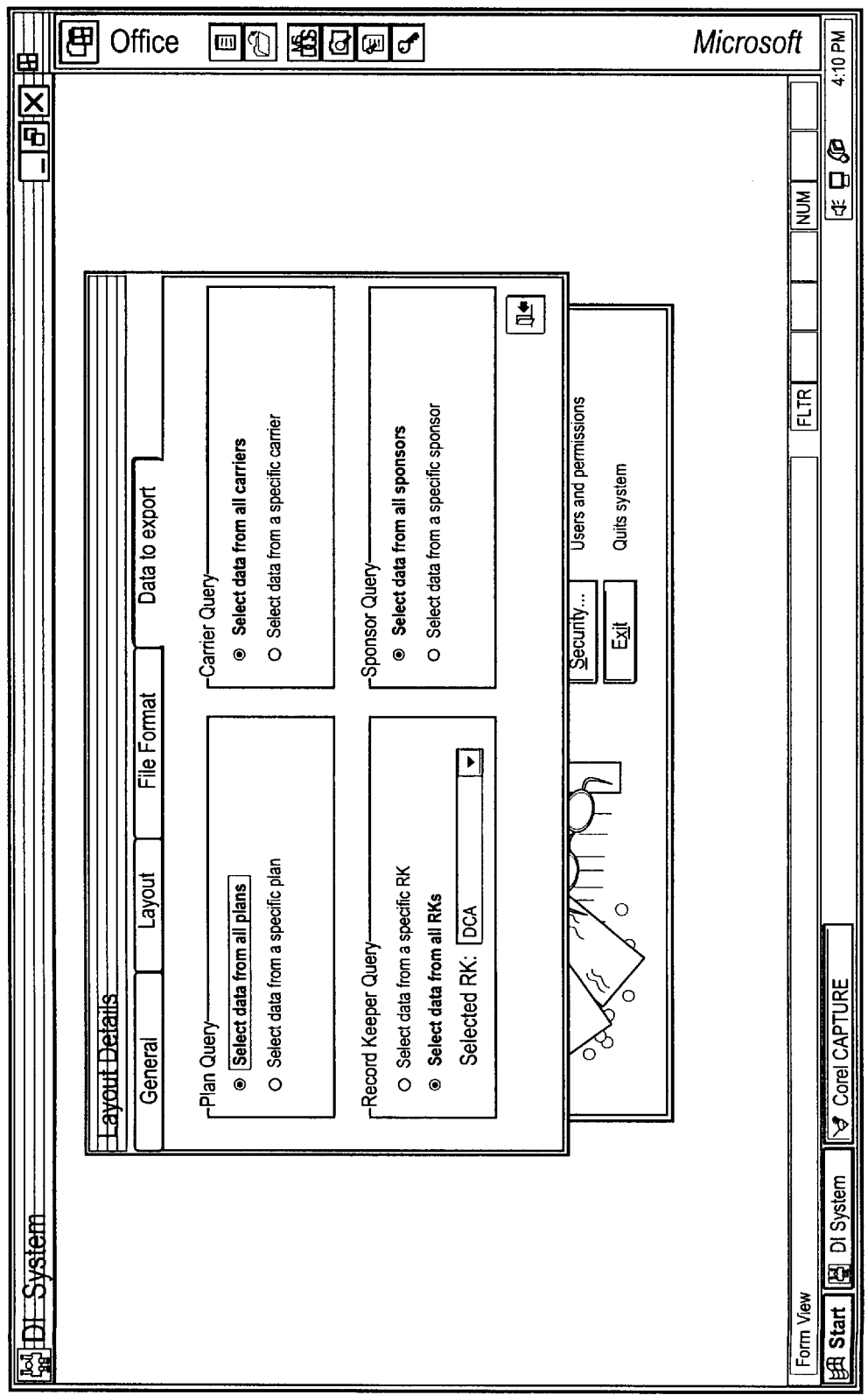
FIG. 44 is a representation of a screen produced on a visual output device in accordance with the present invention.

The user exits the EXPORT EDIT Screen in FIG. 44 by clicking on the EXIT command button and returns to the MAIN MENU Screen in FIG. 3.

The user can then create an export schedule. Export schedules automate the task of E-mailing exports on a regular basis to record keeper contacts, carrier contacts and sponsor contacts. This is extremely useful because it does not require human intervention and delivers electronically custom design exports to client over such diverse network structures as the Internet or a local server accessible on-line by the client.

Now that the user has created a new export, he/she can E-mail that EXPORT to specific recipients on a regular basis. The user clicks on the LIBRARIES command button and opens up the LIBRARIES Screen in FIG. 4. The user double clicks on the EXPORT SCHEDULE library and brings up the EXPORT SCHEDULE LIST Screen in FIG. 45. The user adds a new EXPORT SCHEDULE by clicking on the command button with the blank page icon and the SCHEDULE ADD Screen in FIG. 46 opens up. The user enters the following information:

Export schedule name
Export schedule description
Export name (name of the newly created EXPORT the user wants to create a SCHEDULE for)
Frequency (daily, weekly, monthly, quarterly, semi-annually and annually)
Export starting date.

Figure 45:
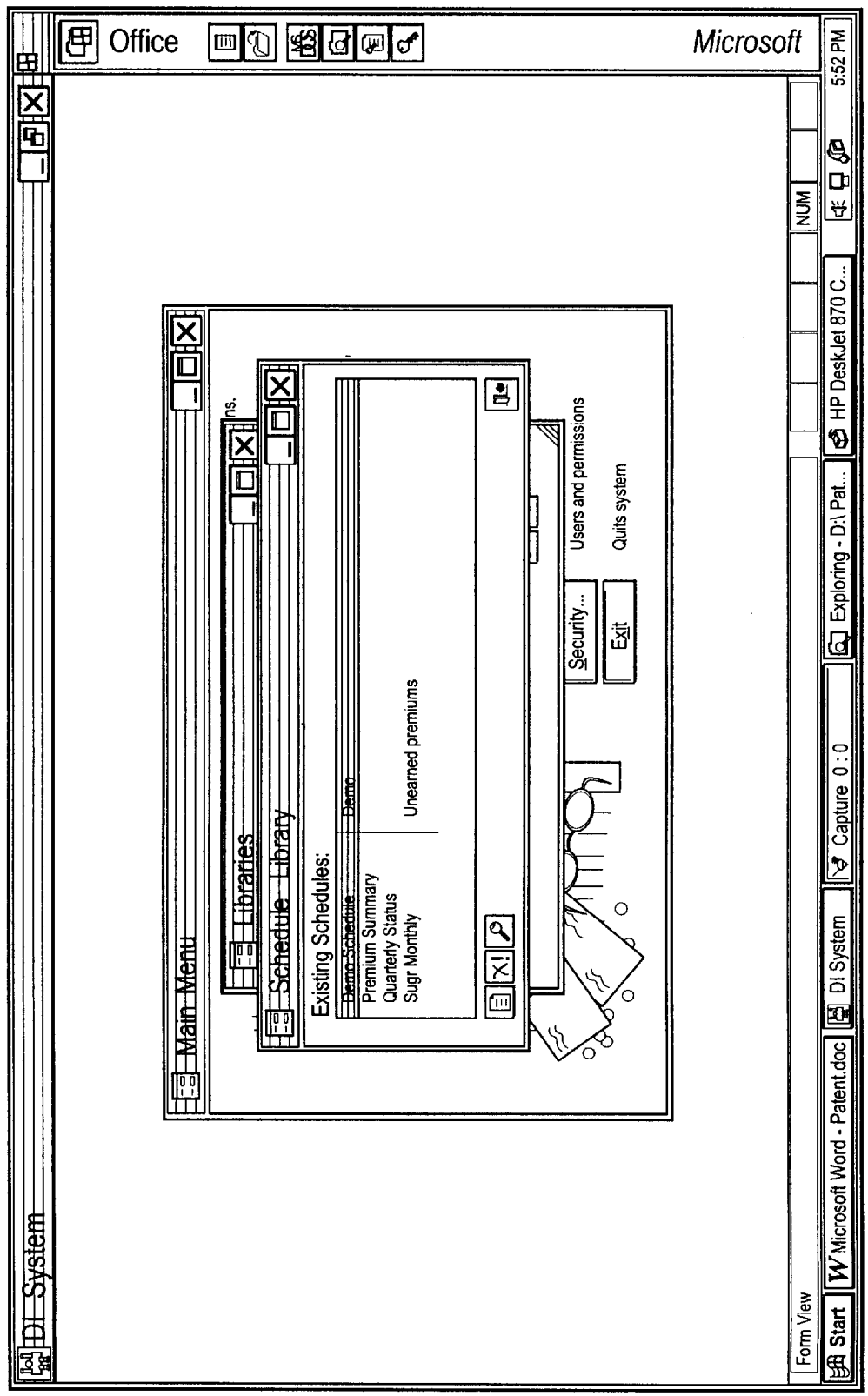
FIG. 45 is a representation of a screen produced on a visual output device in accordance with the present invention.
Figure 46:
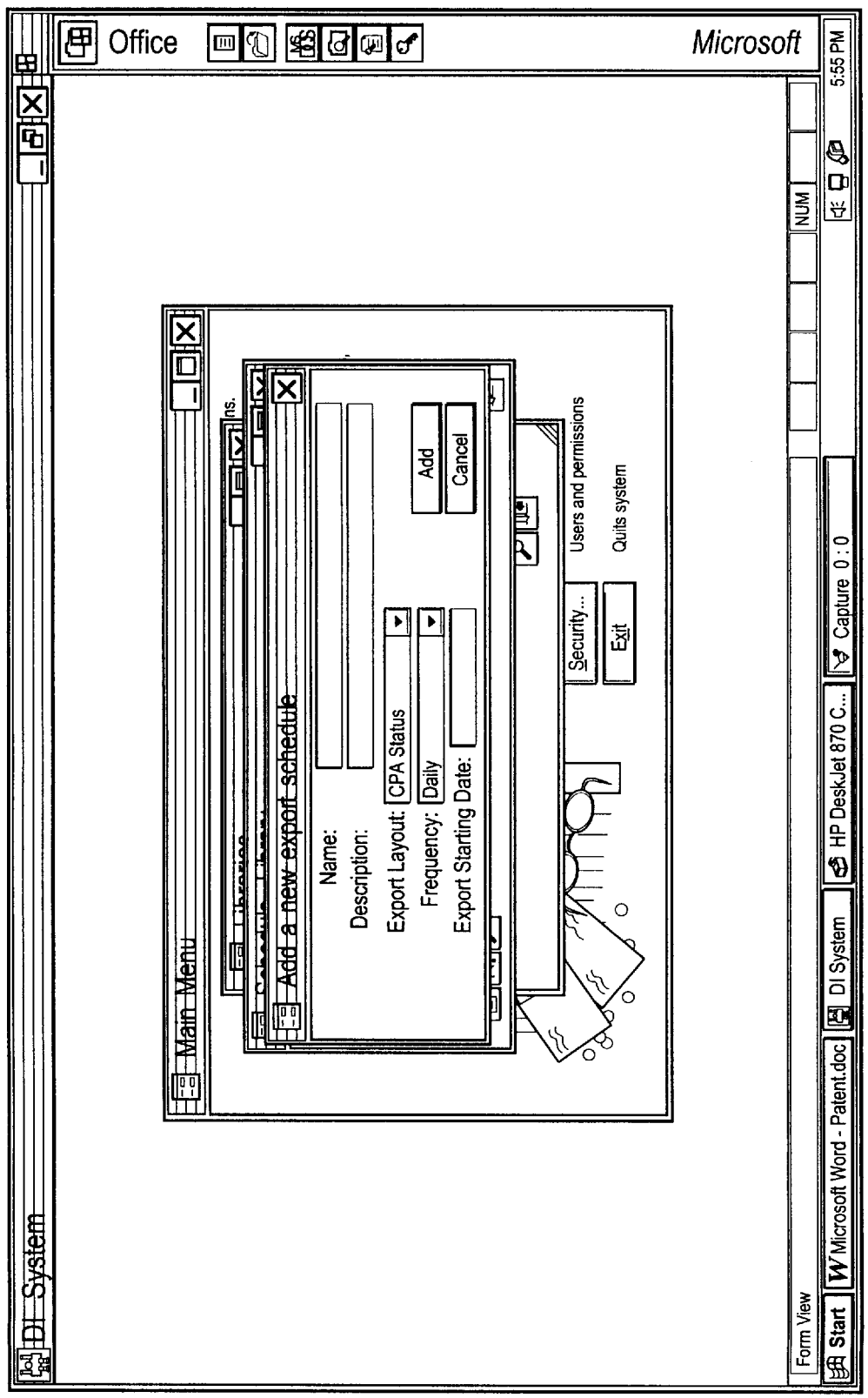
FIG. 46 is a representation of a screen produced on a visual output device in accordance with the present invention.
Figure 47:
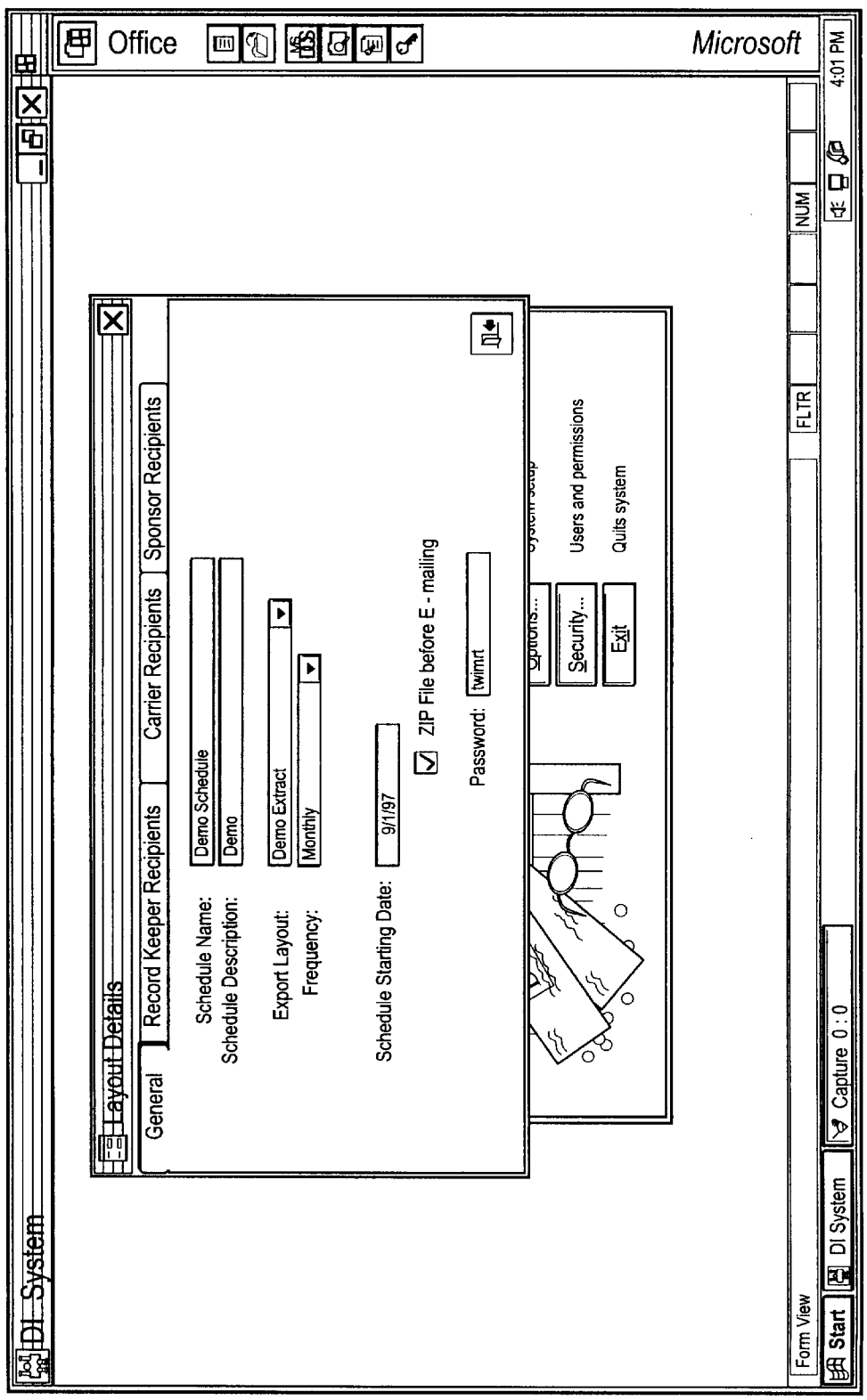
FIG. 47 is a representation of a screen produced on a visual output device in accordance with the present invention.

The user then clicks on the ADD button and the new EXPORT SCHEDULE is automatically added to EXPORT SCHEDULE LIST list box on the EXPORT SCHEDULE LIST Screen in FIG. 45. The user double dicks on the newly created EXPORT SCHEDULE to open up the EXPORT SCHEDULE EDIT Screen in FIG. 47. The EXPORT SCHEDULE EDIT screen contains 4 tabs:

The first tab is the General tab contains general information about the EXPORT SCHEDULE: the schedule name, the schedule description, the EXPORT, the frequency, the schedule starting date, the option to compress the file before sending and an optional password to protect the compressed file.

Figure 48:
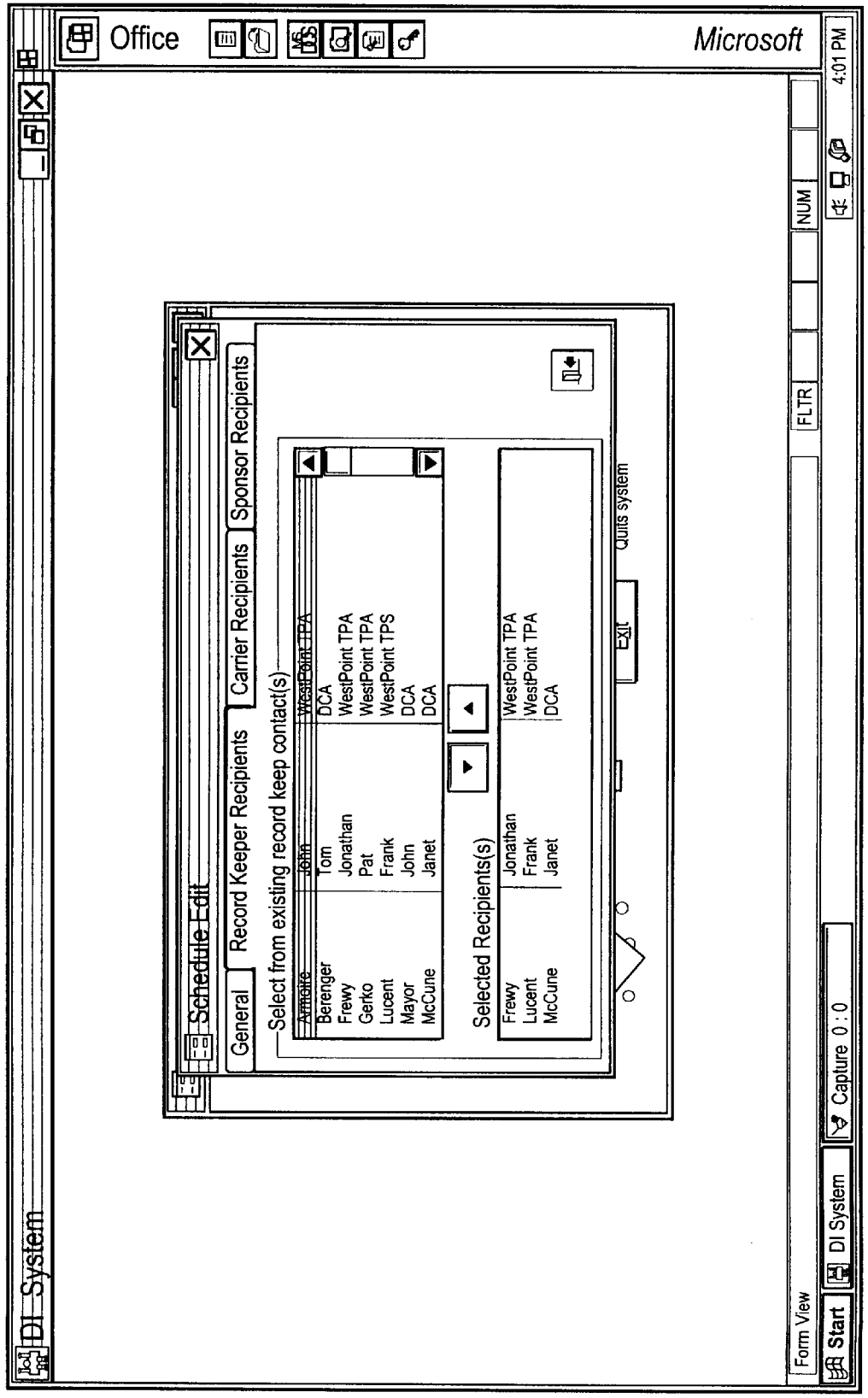
FIG. 48 is a representation of a screen produced on a visual output device in accordance with the present invention.

The second tab is the Record Keeper Recipients tab (Screen in FIG. 48), which allows the user to select among all record keeper contacts contained in the System 1 those to whom the file should be E-mailed to. The user selects from the upper list box a record keeper contact he/she would like to E-mail the export file to and dicks on the ADD command button (hand pointing down icon) to add the selected recipient to the SELECTED RECIPIENTS list box. The user can remove a selected record keeper recipient by selecting the recipient in the SELECTED RECIPIENT list box and clicking on the REMOVE command button (hand pointing up icon).

The third tab is the Carrier Recipients tab (essentially the same as Screen in FIG. 4), which allows the user to select among all carrier contacts contained in the system those to whom the file should be E-mailed to. The user selects from the upper list box a carrier contact he/she would like to E-mail the export file to and clicks on the ADD command button (hand pointing down icon) to add the selected recipient to the SELECTED RECIPIENTS list box. The user can remove a selected carrier recipient by selecting the recipient in the SELECTED RECIPIENT list box and clicking on the REMOVE command button (hand pointing up icon).

The fourth tab is the Sponsor Recipients tab (essentially the same as Screen in FIG. 50), which allows the user to select among all sponsor contacts contained in the system those to whom the file should be E-mailed to. The user selects from the upper list box a sponsor contact he/she would like to E-mail the export file to and dicks on the ADD command button (hand pointing down icon) to add the selected recipient to the SELECTED RECIPIENTS list box. The user can remove a sponsor recipient by selecting the recipient in the SELECTED RECIPIENT list box and clicking on the REMOVE command button (hand pointing up icon).

The user exits the EXPORT SCHEDULE EDIT Screen in FIG. 44 by clicking on the EXIT command button and returns to the EXPORT SCHEDULE LIST Screen in FIG. 45. The user exits the EXPORT SCHEDULE LIST Screen in FIG. 45 by clicking on the EXIT command button and returns to LIBRARIES Screen in FIG. 4. The user exits the LIBRARIES Screen in FIG. 4 by clicking on the EXIT command button and returns to the MAIN MENU Screen in FIG. 3.

The user can then select what back-end type to use in the options of System 1. The user clicks on the OPTIONS command button and opens up the SYSTEM OPTIONS Screen in FIG. 49. In the ATTACHMENT METHOD frame, the user can select the type of back-end he/she wants to use.

He/she can choose from Microsoft Access 97 (or latest version) and Microsoft SQL Server 6.5 (or latest version). Then the user clicks on the ATTACH command button and the system will connect to the proper back-end locally or on the network.

Figure 49:
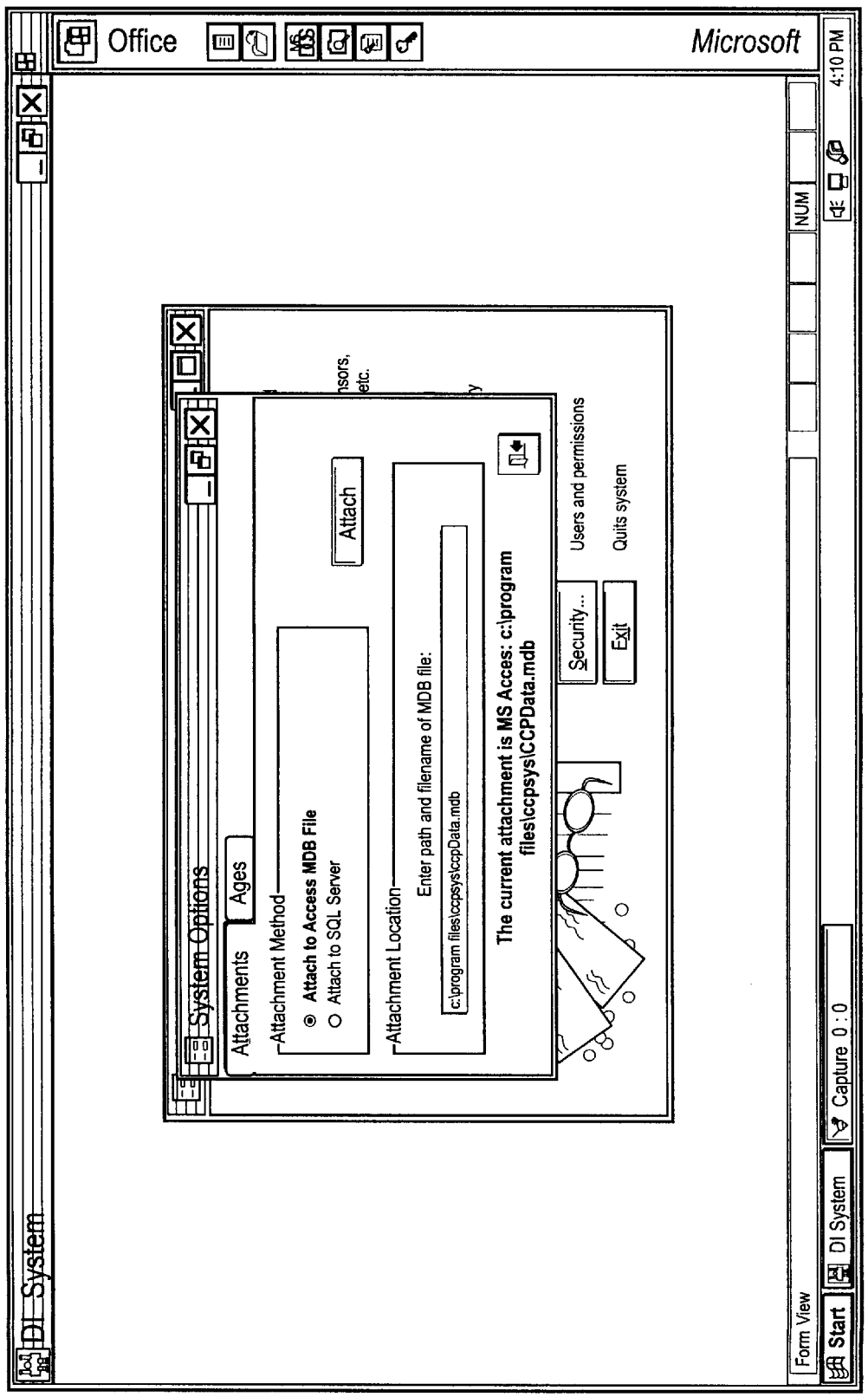
FIG. 49 is a representation of a screen produced on a visual output device in accordance with the present invention.

The user exits the SYSTEM OPTIONS Screen in FIG. 49 by clicking on the EXIT command button and returns to the MAIN MENU Screen in FIG. 3.

Figure 50:
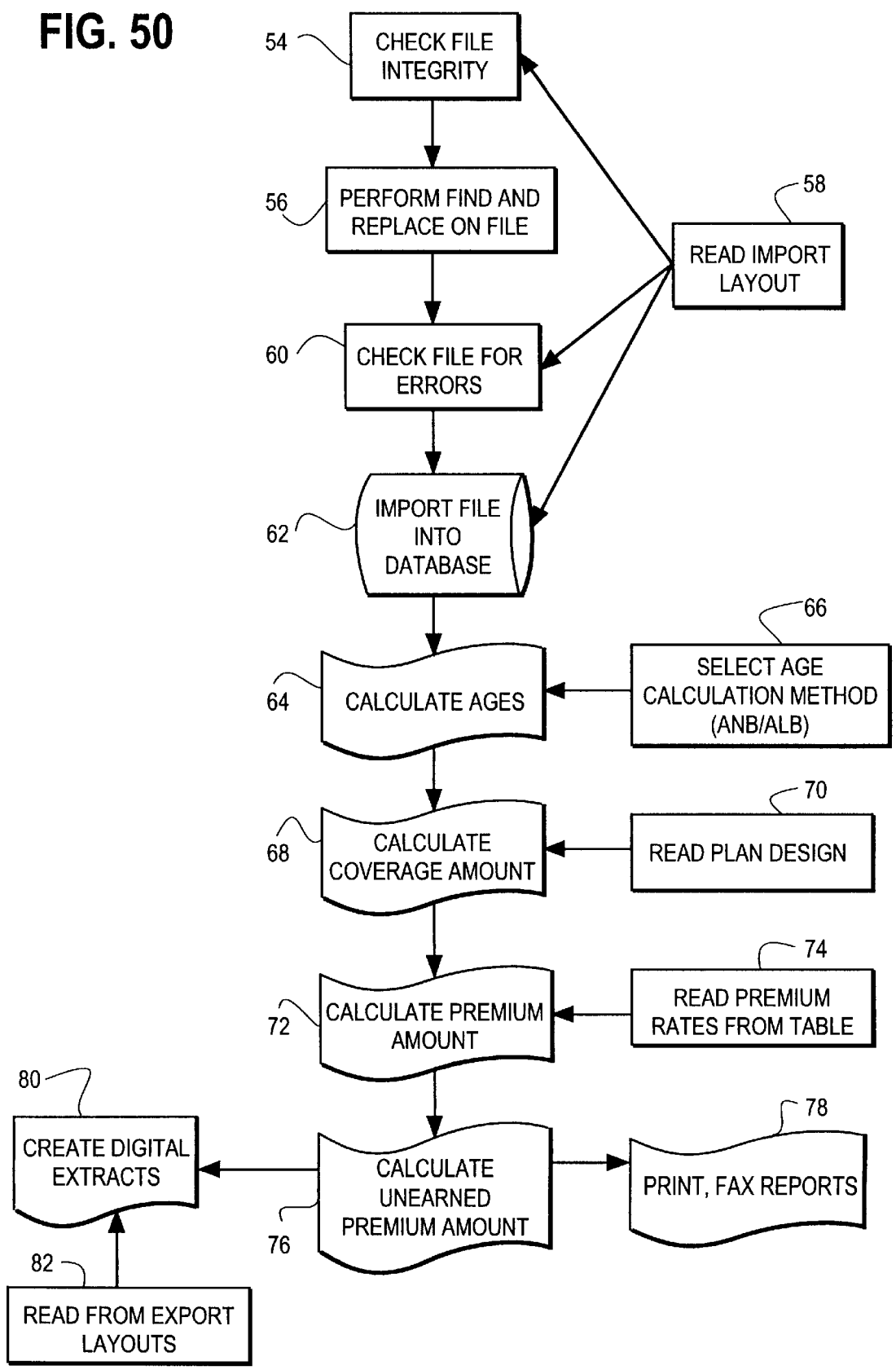
FIG. 50 is a flow chart for the method carried out by the apparatus of the present invention.

How to make the apparatus of FIG. 1 to carry out the method illustrated in FIGS. 2–49 is generally shown in FIG. 50 and more particularly disclosed in the copy of the computer program 6 code provided as an appendix hereto. Note that a portion of the disclosure of this patent document contains material which is subject to copyright protection. The copyright owner has no objection to a statutory fair use of this material, as it appears in the files of the files or records of the U.S. Patent and Trademark Office, but otherwise reserves all copyright rights whatsoever.

FIG. 50 commences at Block 54, wherein the computer 2 receives input data, such as the census data discussed above, including a list of insureds. The data can be received directly from any input device 12 or indirectly, e.g., via a diskette or E-mail; in either case, though, information is entered into some input device which converts the information into input digital electrical signals representing the input information for communication by the first digital electrical computer 4. The digital electrical signals can be formatted into ASCII fixed or ASCII delimited files. Preferably, the input digital electrical signals are received in a data file with known data structures from a second computer a record keeper, sponsor, carrier, etc.

At Block 54, the computer 4 checks the integrity of the data file to ensure that the data structures are consistent with an import layout predefined for recognition by computer 4.

At Block 56, computer 4 performs the above-described "find and replace" activities by reading specific data strings in the input data in accordance with the import layout, finding those strings that the user directs computer 4 to discard, and replacing those strings with other strings of data defined by the user.

At Block 60, computer 4 checks the input data in each field to ensure that the input data in accordance with the import layout. For example, if the computer 4 is expecting a STATE CODE data structure in a two-digit character code, the Computer will verify that the input data elements correspond to a state.

At Block 62, computer 4 completes the task of reading (i.e., importing) the input data, and writes a file containing the input data to the database 20.

At Block 58, logic is provided to specify the file format, data structures, and layout definitions for importing the input data, logic utilized in reading the imported data as discussed above.

At Block 64, logic is provided for calculating the ages of the insureds.

At Block 66, logic is provided for selecting a method for calculating te the ages of the insureds, e.g., nearest birthday or age at the last birthday.

At Block 68, logic is provided for determining coverage amount based on a portion of the 401(k) contribution.

At Block 70, logic is provided for reading the plan design to enable determining coverage amount based on a portion of the 401(k) contribution.

At Block 72, logic is provided for calculating premium amount.

At Block 74, logic is provided for reading premium rates from a table for a respective carriers policy to enable calculating the premium amount.

At Block 76, logic is provided for computing an unearned premium amount. This logic is carried out by determining the number of days remaining to the next plan anniversary date, the number then being divided by the number of days in the year, with the remainder then multiplied by the premium to obtain the amount of unearned premium.

At Block 78, computer 4 directs an output of an illustration, report, fax, documentation, or the like—produced optionally in hard copy or electronic media for E-mail to the computer 18 or 19 of the record keeper, carrier, or sponsor.

At Block 80, computer 4 directs creation of a customizable digital data extract based on the user-defined layouts (at Block 58) created for exporting output data from computer 4 to the external systems.

In sum, the present invention is quite robust. Thus, the scope of the invention should be determined by the appended claims and their legal equivalents, rather than by the principal embodiment and other examples described above.

We claim:

1. A method for using a digital electrical apparatus to compute coverage amounts and calculate coverage costs, individually, for participant accounts of a retirement plan qualified under Internal Revenue Code Section 401(a) for signal processing), the method including:

providing the digital electrical apparatus comprising a first digital electrical computer having a processor, the processor electrically connected to store and receive electrical signals at a memory device, to receive input electrical signals corresponding to input information from an input device, to convert output electrical signals into output information at an output device, the processor programmed to control the first digital electrical computer to receive the input electrical signals and to process the input electrical signals to produce the output electrical signals in computing coverage amounts and calculating coverage costs, individually, for participant accounts of a retirement plan qualified under Internal Revenue Code Section 401(a);

inputting information at the input device, the input information including respective amounts of contribution to the individual accounts of the participants in retirement plan qualified under said Internal Revenue Code Section 401(a);

computing with said processor a respective coverage amount for each of the accounts by using the amounts of contribution in accordance with terms of the retirement plan and in compliance with said Internal Revenue Code Section 401(a);

processing the input electrical signals to compute a corresponding coverage cost for each of the accounts by using the coverage amounts in accordance with terms of the retirement plan and in compliance with said Internal Revenue Code Section 401(a); and generating the output information at the output device, the output including the coverage amounts and the coverage costs.

2. The method of claim 1, wherein:

the apparatus includes a second digital electrical computer storing the electrical signals in a second memory, the electrical signals representing the input information in a second format exported to the input device connected to the first digital electrical computer;

the method further comprising the steps of:

converting the second format into the first format to enable the step of receiving the input information to be carried out by reading the exported electrical signals from the second digital electrical computer; and, wherein the step of storing is carried out by converting the first format into the second format for exporting the billing statement data to the second digital electrical computer for storage at a second memory electrically connected to the second digital electrical computer.

3. The method of claim 1, wherein the step of inputting the input information includes inputting respective amounts of contribution for a defined contribution plan—as the retirement plan.

4. The method of claim 1, wherein the step of inputting the input information includes inputting respective amounts of contribution for a profit sharing plan as the retirement plan.

5. The method of claim 1, wherein the step of inputting the input information includes outputting respective amounts of contribution for a pension plan as the retirement plan.

6. The method of claim 1, wherein the step of inputting the input information includes inputting respective amounts of contribution for a 401K plan as the retirement plan.

7. The method of claim 1, wherein the step of inputting the input information includes inputting respective amounts of contribution for an employee stock ownership plan as the retirement plan.

8. The method of claim 1, wherein the step of inputting the input information includes inputting respective amounts of contribution for a tax credit stock ownership plan as the retirement plan.

9. The method of claim 1, wherein the step of inputting the input information includes inputting respective amounts of contribution for a Savings Incentive Match Plan for Employees as the retirement plan.

10. The method of claim 1, wherein the step of inputting the input information includes inputting respective amounts of contribution for a cash balance plan as the retirement plan.

11. The method of any one of claims 1–10, wherein the step of processing includes calculating an amount from an ERISA-qualified trust for the retirement plan for payment of the coverage cost.

12. The method of claim 1, further including the steps of:
further processing the input electrical signals such that for each of the coverage costs generated, a corresponding insurance premium is calculated; and
wherein the output device includes a printer and the output includes the insurance premiums.

13. The method of claim 12, wherein the step of further processing includes:
further processing the input electrical signals such that for each of the insurance premiums generated, at least one corresponding fee is calculated, the fee from the group consisting of a commission fee and an administration fee, wherein the at least one of the fees is calculated from aggregate lives data input as part of the input information.

14. The method of claim 1, wherein the inputting includes:
inputting the information from an external file having a format; and
further comprising the steps of:
specifying how the format is to be read by the digital electrical computer apparatus by mapping the format and structure of the external file format; and
storing the input electrical signals corresponding to the external file into a relational database in the memory.

15. The method of claim 14, further comprising the steps of:
specifying how data from the relational database is to be exported by the digital electrical computer apparatus by specifying table fields to be exported, a format, field codes, a path, and a filename for an export file; and
exporting an export file including some of said output electrical signals to a second digital electrical computer apparatus.

16. A relational database storing data for access by a digital electrical computer programmed to access the database in computing coverage amounts and in calculating coverage costs for individual participant accounts of a retirement plan qualified under Internal Revenue Code Section 401(a) with the data from the database, the database including:
the data organized on a computer-readable data storage device in the relational database including multiple tables, each said table including either columns and rows or fields and records, the tables linked to one another using keys for data retrieval, each table including at least one category, the categories including plan data and at least two kinds of data from the group consisting of carrier data, record keeper data, census data, third party administrator data, plan sponsor data, and system data, the data being sufficient for carrying out the computing of the coverage amounts and the calculating of the coverage costs for the individual participant accounts of the retirement plan qualified under said Internal Revenue Code Section 401(a).

17. The database of claim 16, where in the categories of the data include a third of the kinds of data from the group consisting of carrier data, record keeper data, census data, third party administrator data, plan sponsor data, and system data.

18. The database of of claim 16, wherein the categories of the data include a fourth of the kinds of data from the group consisting of carrier data, record keeper data, census data, third party administrator data, plan sponsor data, and system data.

19. A database of data in combination with a digital electrical computer apparatus controlled by a program in computing coverage amounts and in calculating coverage costs for participant accounts of a retirement plan qualified under Internal Revenue Code Section 401(a) with the data from said database, the combination including:
the apparatus comprising a first digital electrical computer having a processor, the processor electrically connected to store and receive electrical signals at a storage device on which said data resides, to receive input electrical signals corresponding to input information from an input device, to control converting output electrical signals into printed documentation at a printer, the processor being programmed to control the first digital electrical computer to receive the input electrical signals and to process the input electrical signals to produce the output electrical signals in the computing of the coverage amounts and in the calculating of the coverage costs for participant accounts of the retirement plan qualified under said Internal Revenue Code Section 401(a) with the data from said database, the programmed processor being programmed with modules including:
a calculating module for processing contributions for all said participant accounts and for computing of the coverage amounts and the calculating of the coverage costs;

a reporting module for carrying out the printing; and a database management module for managing the database with applications that respectively retrieve data from, and store data to, the database.

20. The combination of claim 19, wherein the applications further include:

an import module for importing electrical signals corresponding to at least some of the members of the group; and an export module for making digital extracts from the data and into a user-defined format and layout; and wherein the categories of the data include six of the members from the group consisting of plan data, carrier data, record keeper data, census data, third party administrator data, plan sponsor data, and system data; and the export module is structured for making multiple digital extracts from the data and into multiple user-defined formats and layouts.

21. The combination of claim 20, further comprising:

an additional digital electrical computer connected to the first digital electrical computer by an Internet connection for carrying out the step of:

obtaining some contents of the relational database from the additional digital electrical computer apparatus.

22. The combination of claim 20, further comprising:

an additional digital electrical computer connected to the first digital electrical computer by a network for carrying out the step of:

obtaining some contents of the relational database from the additional digital electrical computer apparatus.

23. A digital electrical apparatus programmed to compute coverage amounts and calculate coverage costs, individually, for participant accounts of a retirement plan qualified under Internal Revenue Code Section 401(a) by transforming input digital electrical signals into output digital signals, the apparatus including:

a first digital electrical computer system comprising a processor, the processor electrically connected to a memory device for storing and receiving electrical signals, to an input device for receiving at least some of input information and converting the input information to input electrical signals corresponding to input information, to an output device for converting output electrical signals into documentation, wherein the processor is programmed to control the first digital electrical computer system to receive the input electrical signals and to transform the input electrical signals into the output electrical signals to compute coverage amounts and calculate coverage costs, individually for participant accounts of a retirement plan qualified under Internal Revenue Code Section 401(a) by steps including:

receiving at the processor the input electrical signals including electrical signals in a first format and corresponding to respective amounts of contribution to the individual accounts for all active participants in the retirement plan qualified under said Internal Revenue Code Section 401(a);

computing to produce electrical signals corresponding to a respective coverage amount for each of the amounts of contribution;

further computing to produce electrical signals corresponding to a coverage cost for each said coverage amount; and still further computing to produce electrical signals corresponding to a billing statement including the coverage costs;

storing the electrical signals corresponding to a billing statement at the memory device;

recalling the electrical signals corresponding to a billing statement from the memory device, and when one of the employees is terminated, computing to produce the output signals, including an amount of consideration to be given the one; and generating a record including the amount of the consideration at the output device.

24. The apparatus of claim 23, further comprising:

a relational database at the memory device for the storing, the database including multiple tables storing data, each said table including either columns and rows or fields and records, the tables linked to one another using keys for data retrieval, each table corresponding to at least one category, the categories of the data including at least plan data, census data, and carrier data.

25. The apparatus of claim 24, wherein the relational database further includes plan sponsor data and system data.

26. The apparatus of claim 24, wherein the input electrical signals include electrical signals corresponding to, from the first format, respective amounts of contribution for a defined contribution plan as the retirement plan.

27. The apparatus of claim 24, wherein the input electrical signals include electrical signals corresponding to, from the first format, respective amounts of contribution for a profit sharing plan as the retirement plan.

28. The apparatus of claim 24, wherein the input electrical signals include electrical signals corresponding to, from the first format, respective amounts of contribution for a pension plan as the retirement plan.

29. The apparatus of claim 24, wherein the input electrical signals include electrical signals corresponding to, from the first format, respective amounts of contribution for a 401K plan as the retirement plan.

30. The apparatus of claim 24, wherein the input electrical signals include electrical signals corresponding to, from the first format, respective amounts of contribution for an employee stock ownership plan as the retirement plan.

31. The apparatus of claim 24, wherein the input electrical signals include electrical signals corresponding to, from the first format, respective amounts of contribution for a tax credit stock ownership plan as the retirement plan.

32. The apparatus of claim 24, wherein the input electrical signals include electrical signals corresponding to, from the first format respective amounts of contribution for a Savings Incentive Match Plan for Employees as the retirement plan.

33. The apparatus of claim 24, wherein the input electrical signals include electrical signals corresponding to, from the first format, respective amounts of contribution for a cash balance plan as the retirement plan.

34. The apparatus of any one of claims 23–33, wherein said generating the output includes generating a billing statement as the output, and further comprising:

storing the billing statement data;

recalling the stored billing statement data, and for each of the employees computing, from the stored billing statement data, an amount of consideration to be given one of the employees when the one is terminated;

and generating a record at the printer from the further output electrical signals corresponding to a confirmation of the consideration;

a second digital electrical computer electrically connected to the first digital electrical computer, and wherein the first format is an external file format; and the processor is programmed to control the first digital electrical computer system to carry out the steps of:

specifying, by input information entered at the input device, how the first format is to be read by the first digital electrical computer apparatus, including mapping a format and specifying a structure of the external file format;

receiving some of the input electrical signals in the first format from the additional digital electrical computer apparatus; and storing the input electrical signals from the second digital electrical computer apparatus at the memory device.

35. The apparatus of claim 24, further comprising:

a second digital electrical computer electrically connected to the first digital electrical computer, and wherein the first format is an external file format; and the processor is programmed to control the first digital electrical computer system to carry out the steps of:

specifying how some electrical signals obtained from the relational database are to be exported by the first digital electrical computer apparatus, including specifying table fields to be exported, a format, field codes, a path, and, a filename for an export file; and exporting the export file to the second digital electrical computer apparatus.

36. The apparatus of claim 35, wherein the processor is programmed to control the first digital electrical computer system to carry out the steps of:

still yet further computing to produce electrical signals representing an insurance premium as part of the coverage cost for each said coverage amount.

37. The apparatus of claim 35, wherein the processor is programmed to control the first digital electrical computer system to carry out the steps of:

still yet further computing to produce electrical signals representing an insurance premium as part of the coverage cost for each said coverage amount.

38. The apparatus of claim 37, wherein the processor is programmed to control the first digital electrical computer system to carry out the steps of:

still yet additional computing to produce electrical signals representing at least one corresponding fee is calculated, the fee from the group consisting of a commission fee and an administration fee, wherein the at least one of the fees is calculated from a representation of aggregate lives input as part of the input electrical signals.

39. A method for making a computer apparatus for computing coverage amounts and determining coverage costs, individually, for participant accounts of a retirement plan qualified under Internal Revenue Code Section 401(a), the method including the steps of:

providing a first digital electrical computer having a processor;

electrically connecting the processor to store and receive electrical signals at a memory device, to receive electrical signals corresponding to input information from an input device, to convert output electrical signals into output information at an output device;

programming the processor to control the first digital electrical computer to receive the input electrical signals and to process the input electrical signals tar produce the output electrical signals by computing coverage amounts and determining coverage costs, individually, for participant accounts of a retirement plan qualified under Internal Revenue Code Section 401(a) by sub-steps including:

importing some of the input electrical signals corresponding to at least one member of a group consisting of plan data, carrier data, record keeper data, census data, third party administrator data, plan sponsor data, and system data; and calculating the contributions, individually for participant accounts of a retirement plan qualified under Internal Revenue Code Section 401(a); and determining the corresponding coverage amounts, individually, for participant accounts of a retirement plan qualified under Internal Revenue Code Section 401(a).

40. The method of claim 39, wherein the sub-step of importing includes importing some of the input electrical signals corresponding to at least two members of the group.

41. The method of claim 40, wherein the sub-steps include:

printing the output information in at report generated by the apparatus at the output device.

42. The method of claim 39, further comprising the steps of:

storing data at the memory device corresponding to at least five of the members from the group; and wherein the sub-steps include exporting a digital extract from the data at the memory device in a format and layout specified at the input device.

43. The method of claim 42, wherein the step of storing includes storing the data in a relational database.

44. The method of claim 42, wherein the sub-steps include:

calculating an amount from an ERISA-qualified trust for the retirement plan for the payment of the coverage cost.

* * * * *

UNITED STATES PATENT AND TRADEMARK OFFICE
CERTIFICATE OF CORRECTION

PATENT NO. : 6,235,176 B1
APPLICATION NO. : 08/936037
DATED : May 22, 2001
INVENTOR(S) : Matthew Bernard Schoen et al.

It is certified that error appears in the above-identified patent and that said Letters Patent is hereby corrected as shown below:

Column 15
Line 2, change "dicks" to --clicks--.

Column 16
Line 47, change "dicks" to --clicks--.

Column 17
Line 58, change "dicks" to --clicks--.

Column 20
Lines 13, 16, and 28, change "dicks" to --clicks--.

Column 22
Line 42, change "dicks" to --clicks--.
Line 59, change "dick" to --click--.

Column 23
Line 67, change "dicks" to --clicks--.

Column 24
Line 38, change "dick" to --click--.

Column 25
Lines 24, 47, and 57, change "dicks" to --clicks--.

Column 26
Line 55, change "dicks" to --clicks--.

UNITED STATES PATENT AND TRADEMARK OFFICE
CERTIFICATE OF CORRECTION

PATENT NO. : 6,235,176 B1
APPLICATION NO. : 08/936037
DATED : May 22, 2001
INVENTOR(S) : Matthew Bernard Schoen et al.

It is certified that error appears in the above-identified patent and that said Letters Patent is hereby corrected as shown below:

<u>Column 28</u>
Lines 9, 24, and 47, change "dicks" to --clicks--.

Signed and Sealed this

Twenty-seventh Day of March, 2007

JON W. DUDAS
*Director of the United States Patent and Trademark Office*